(12) United States Patent
Wilenski et al.

(10) Patent No.: US 10,618,222 B2
(45) Date of Patent: *Apr. 14, 2020

(54) SYSTEMS AND METHODS FOR ADDITIVELY MANUFACTURING AN OBJECT

(71) Applicant: The Boeing Company, Chicago, IL (US)

(72) Inventors: Mark Stewart Wilenski, Mercer Island, WA (US); Michael Patrick Kozar, Mercer Island, WA (US); Samuel F. Harrison, Lynnwood, WA (US); Nick Shadbeh Evans, Lynnwood, WA (US); Faraón Torres, Everett, WA (US)

(73) Assignee: The Boeing Company, Chicago, IL (US)

( * ) Notice: Subject to any disclaimer, the term of this patent is extended or adjusted under 35 U.S.C. 154(b) by 246 days.

This patent is subject to a terminal disclaimer.

(21) Appl. No.: 15/706,546

(22) Filed: Sep. 15, 2017

(65) Prior Publication Data

US 2019/0084243 A1  Mar. 21, 2019

(51) Int. Cl.
*B29C 64/40* (2017.01)
*B33Y 10/00* (2015.01)
(Continued)

(52) U.S. Cl.
CPC ............ *B29C 64/40* (2017.08); *B29C 64/118* (2017.08); *B29C 64/264* (2017.08);
(Continued)

(58) Field of Classification Search
CPC ..... B29C 64/40; B29C 64/264; B29C 64/118; B29C 70/88; B29C 70/025
See application file for complete search history.

(56) References Cited

U.S. PATENT DOCUMENTS 3,600,272 A  8/1971  Cortigene et al.
3,813,976 A  6/1974  Greer
(Continued)

FOREIGN PATENT DOCUMENTS

CN  102516866  6/2012
DE  201310103973  10/2014
(Continued)

OTHER PUBLICATIONS

Machine-generated English abstract of WO 0207918, downloaded from Espacenet.com on Mar. 18, 2019.
(Continued)

*Primary Examiner* — Mathieu D Vargot
(74) *Attorney, Agent, or Firm* — DASCENZO Intellectual Property Law, P.C.

(57) ABSTRACT

A system for additively manufacturing an object comprises feedstock-line supply, delivery guide, and curing mechanism. The feedstock-line supply dispenses a feedstock line that comprises elongate filaments, a resin that covers the elongate filaments, and at least one optical modifier that is interspersed among the elongate filaments. The delivery guide is movable relative to a surface, receives the feedstock line, and deposits it along a print path. The curing mechanism is directs electromagnetic radiation at the exterior surface of the feedstock line after it is deposited along the print path. When the electromagnetic radiation strikes the outer surface of at least one optical modifier, the optical modifier causes the electromagnetic radiation to irradiate, in the interior volume of the feedstock line, the resin that, due at least in part to the elongate filaments, is not directly accessible to the electromagnetic radiation, incident on the exterior surface of the feedstock line.

91 Claims, 29 Drawing Sheets

(51) Int. Cl.
*B33Y 30/00* (2015.01)
*B29C 64/264* (2017.01)
*B29C 70/02* (2006.01)
*B29C 64/118* (2017.01)
*B29C 70/88* (2006.01)
*C08G 63/91* (2006.01)
*B29C 64/336* (2017.01)
*B29C 64/295* (2017.01)
*C08K 3/04* (2006.01)
*B29C 64/129* (2017.01)
*B33Y 70/00* (2020.01)

(52) U.S. Cl.
CPC ............ *B29C 70/025* (2013.01); *B29C 70/88* (2013.01); *B33Y 10/00* (2014.12); *B33Y 30/00* (2014.12); *B29C 64/129* (2017.08); *B29C 64/295* (2017.08); *B29C 64/336* (2017.08); *B33Y 70/00* (2014.12); *C08G 63/91* (2013.01); *C08K 3/04* (2013.01)

(56) References Cited

U.S. PATENT DOCUMENTS

| | | | |
|---|---|---|---|
| 4,378,343 | A | 3/1983 | Sugiura et al. |
| 4,435,246 | A | 3/1984 | Green |
| 4,973,503 | A | 11/1990 | Hotchkiss |
| 5,204,124 | A | 4/1993 | Secretan et al. |
| 5,294,461 | A | 3/1994 | Ishida |
| 5,398,193 | A | 3/1995 | deAngelis |
| 5,495,328 | A | 2/1996 | Spence et al. |
| 5,594,652 | A | 1/1997 | Penn et al. |
| 5,936,861 | A | 8/1999 | Jang et al. |
| 6,129,872 | A | 10/2000 | Jang |
| 6,169,605 | B1 | 1/2001 | Penn et al. |
| 6,214,279 | B1 | 4/2001 | Yang et al. |
| 6,722,872 | B1 | 4/2004 | Swanson et al. |
| 8,133,537 | B2 | 3/2012 | Nair et al. |
| 8,801,990 | B2 | 8/2014 | Mikulak et al. |
| 8,920,697 | B2 | 12/2014 | Mikulak et al. |
| 9,102,099 | B1 | 8/2015 | Karpas et al. |
| 9,126,365 | B1 | 9/2015 | Mark et al. |
| 9,149,988 | B2 | 10/2015 | Mark et al. |
| 9,149,989 | B2 | 10/2015 | Uckelmann |
| 9,186,848 | B2 | 11/2015 | Mark et al. |
| 10,105,893 | B1 * | 10/2018 | Wilenski .............. B29C 64/118 |
| 2003/0044593 | A1 | 3/2003 | Vaidyanathan et al. |
| 2004/0119188 | A1 | 6/2004 | Lowe |
| 2005/0004282 | A1 | 1/2005 | Priedman, Jr. et al. |
| 2005/0038222 | A1 | 2/2005 | Joshi et al. |
| 2005/0104241 | A1 | 5/2005 | Kritchman et al. |
| 2005/0116391 | A1 | 6/2005 | Lindemann et al. |
| 2006/0255486 | A1 | 11/2006 | Benson, Jr. et al. |
| 2008/0315462 | A1 | 12/2008 | Batzinger et al. |
| 2009/0095410 | A1 | 4/2009 | Oldani |
| 2010/0024964 | A1 | 2/2010 | Ingram, Jr. et al. |
| 2010/0084087 | A1 | 4/2010 | McCowin et al. |
| 2010/0190005 | A1 | 7/2010 | Nair et al. |
| 2011/0147993 | A1 | 6/2011 | Eshed et al. |
| 2013/0136890 | A1 | 5/2013 | Maliszewski et al. |
| 2013/0337256 | A1 | 12/2013 | Farmer et al. |
| 2014/0061974 | A1 | 3/2014 | Tyler |
| 2014/0263534 | A1 | 9/2014 | Post et al. |
| 2014/0265040 | A1 | 9/2014 | Batchelder |
| 2014/0287139 | A1 | 9/2014 | Farmer et al. |
| 2014/0291886 | A1 | 10/2014 | Mark et al. |
| 2015/0008422 | A1 | 1/2015 | Lee et al. |
| 2015/0037599 | A1 | 2/2015 | Blackmore |
| 2015/0048553 | A1 | 2/2015 | Dietrich et al. |
| 2015/0072293 | A1 | 3/2015 | DeSimone et al. |
| 2015/0140230 | A1 | 5/2015 | Jones et al. |
| 2015/0174824 | A1 | 6/2015 | Gifford et al. |
| 2015/0217517 | A1 | 8/2015 | Karpas et al. |
| 2015/0291833 | A1 | 10/2015 | Kunc et al. |
| 2015/0321420 | A1 | 11/2015 | Karpas et al. |
| 2016/0136897 | A1 | 5/2016 | Nielsen-Cole et al. |
| 2016/0159009 | A1 | 6/2016 | Canale |
| 2016/0281267 | A1 | 9/2016 | Wetzel et al. |
| 2016/0297104 | A1 | 10/2016 | Guillemette et al. |
| 2016/0303793 | A1 | 10/2016 | Ermoshkin et al. |
| 2017/0028623 | A1 | 2/2017 | Evans et al. |
| 2017/0028628 | A1 | 2/2017 | Evans et al. |
| 2017/0028633 | A1 | 2/2017 | Evans et al. |
| 2017/0028635 | A1 | 2/2017 | Evans et al. |
| 2017/0028638 | A1 | 2/2017 | Evans et al. |
| 2017/0028644 | A1 | 2/2017 | Evans et al. |
| 2017/0129180 | A1 | 5/2017 | Coates et al. |
| 2017/0151733 | A1 | 6/2017 | Lewis et al. |
| 2017/0157855 | A1 | 6/2017 | Larson et al. |
| 2017/0174932 | A1 | 6/2017 | Granlund et al. |
| 2017/0225394 | A9 | 8/2017 | Rodgers et al. |
| 2017/0252967 | A9 | 9/2017 | Guillemette et al. |
| 2018/0126667 | A1 | 5/2018 | Wilenski et al. |
| 2018/0126671 | A1 | 5/2018 | Wilenski et al. |
| 2018/0141274 | A1 | 5/2018 | Fink et al. |
| 2018/0141284 | A1 | 5/2018 | Wilenski et al. |
| 2018/0154588 | A1 | 6/2018 | Wilenski et al. |
| 2018/0207863 | A1 | 7/2018 | Porter et al. |
| 2018/0345597 | A1 | 12/2018 | Wilenski et al. |
| 2019/0009462 | A1 | 1/2019 | Wilenski et al. |
| 2019/0009471 | A1 | 1/2019 | Wilenski et al. |

FOREIGN PATENT DOCUMENTS

| | | |
|---|---|---|
| EP | 3124213 | 2/2017 |
| WO | WO 0207918 | 1/2002 |
| WO | WO 2006/020685 | 2/2006 |
| WO | WO 2012/039956 | 3/2012 |
| WO | WO 2013/086577 | 6/2013 |
| WO | WO 2014/153535 | 9/2014 |
| WO | WO 2015/009938 | 1/2015 |
| WO | WO 2016/053681 | 4/2016 |
| WO | WO 2018/094276 | 5/2018 |

OTHER PUBLICATIONS

European Patent Office, Extended European Search Report for European Patent Application No. 18189427, dated Jan. 29, 2019.

European Patent Office, Extended European Search Report for European Patent Application No. 18189423, dated Feb. 7, 2019.

Machine generated English translation of abstract for DE 201310103973 downloaded from Espacenet.com on Nov. 1, 2017.

Website screenshots showing Stratonics ThermaViz® Sensor Systems, from Stratonics.com website, downloaded on Nov. 4, 2016.

Printout of online article, "Improving Additive Manufacturing (3D Printing) using Infrared Imaging," Aug. 10, 2016, from AZoM.com website, downloaded on Nov. 4, 2016.

Website screenshots of online article, Evan Milberg, "Arevo Labs Introduces First Robot-Based Platform for 3-D Printing Composite Parts," Nov. 23, 2015, from CompositesManufacturingMagazine.com website, downloaded on Jan. 12, 2016.

Printout of online article, Jeff Sloan, "Arevo Labs launches 3D printing platform for composite parts fabrication," Nov. 16, 2015, from CompositesWorld.com website, downloaded on Dec. 9, 2015.

Website screenshots of online how-to article, "Fiber Composite 3D Printing (The Bug)," from Instructables.com website, downloaded on Aug. 20, 2015.

Printout of website showing FormLabs, Frequently Asked Questions (re the Form1+ SLA 3D Printer), from FormLabs.com website, downloaded on Aug. 19, 2015.

Website screenshots showing The Form 1+ SLA 3D Printer, from FormLabs.com website, downloaded on Aug. 20, 2015.

Printout of online article "Carbon3D Introduces Breakthrough Clip Technology for Layerless 3D Printing, 25-100x Faster," Mar. 17, 2015, from 3Ders.org website, downloaded on Aug. 19, 2015.

Website screenshots showing online article, Krassenstein "Orbital Composites to Make 3D Printing 100 Times Faster Using Carbon Fiber, Fiber Optics, Injection & More," Apr. 28, 2015, from 3DPrint.com website, downloaded on Aug. 19, 2015.

(56) References Cited

OTHER PUBLICATIONS

Printout of online article "Carbon-Fiber Epoxy Honeycombs Mimic the Material Performance of Balsa Wood," Jun. 27, 2014, downloaded from redorbit.com/news/science/1113180114/carbon-fiber-epoxy-honeycombs-mimic-the-material-performance-of-balsa-wood/, Aug. 19, 2015.
Website screenshots showing The Mark One Composite 3D Printer, from MarkForged.com website, downloaded on Aug. 19, 2015.
Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, from ScienceDirect.com website, downloaded on Aug. 19, 2015.
Printout of online article "Automated Fiber Placement," from AutomatedDynamics.com website downloaded on Aug. 19, 2015.
User Manual for 3Doodler 2.0, from The3Doodler.com website, downloaded on Aug. 19, 2015.
Website screenshots showing "Fiber Composite 3D Printing," from MakeZine.com website, downloaded on Jun. 2, 2015.
Farshidianfar et al., "Real-Time Control of Microstructure in Laser Additive Manufacturing," International Journal of Advanced Manufacturing Technology (2016), vol. 82, pp. 1173-1186, published online Jul. 1, 2015.
Hu et al., "Sensing, Modeling and Control for Laser-Based Additive Manufacturing," International Journal of Machine Tools and Manufacture, No. 43, pp. 51-60, 2003.
Gupta et al., "Dual Curing of Carbon Fiber Reinforced Photoresins for Rapid Prototyping," Polymer Composites, vol. 23, No. 6, pp. 1162-1170, Dec. 2002.
Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.
Ogale et al., "3-Dimensional Composite Photolithography," Proceedings of the American Society for Composites, Eleventh Technical Conference, pp. 822-828, Oct. 7-9, 1996.
Ogale et al., "Fabrication of Fiber Reinforced Plates with Curvilinear Layout by 3-D Photolithography," $26^{th}$ International SAMPE Technical Conference, vol. 26, pp. 54-61, Oct. 17-20, 1994.
Machine-generated English translation of the abstract for CN 102516866, downloaded from Espacenet.com on May 17, 2018.
Vaezi et al., A Review on 3D Micro-Additive Manufacturing Technologies, Int J Adv Manuf Technol, vol. 67, pp. 1721-1754, Nov. 25, 2012.
Stansbury et al., 3D Printing with Polymers: Challenges Among Expanding Options and Opportunities, Dental Materials, vol. 32, pp. 54-64, 2016.
Volyanskii et al., Laser-Assisted 3D Printing of Functional Graded Structures from Polymer Covered Nanocomposites: A Self-Review, New Trends in 3D Printing, InTech, DOI:10.5772/63565, 2016.
Lewicki et al., 3D-Printing of Meso-Structurally Ordered Carbon Fiber/Polymer Composites with Unprecedented Orthotropic Physical Properties, Sci. Rep. 7, 43401; DOI:10.1038/srep43401, 2017.
Ligon et al., Polymers for 3D Printing and Customized Additive Manufacturing, ACS Publications, Chem. Rev. 117, pp. 10212-10290, 2017.

\* cited by examiner

SYSTEMS AND METHODS FOR ADDITIVELY MANUFACTURING AN OBJECT

FIELD

The present disclosure relates to additive manufacturing.

BACKGROUND

A 3D printing process may use a feedstock material, extruded from a print head, to additively manufacture a part by layering the feedstock material. The feedstock material may comprise a polymer and reinforcing fibers, such as carbon fibers, which are opaque to visible and ultra-violet light. When the polymer in the feedstock material is a photopolymer, a source of curing energy may be directed at the feedstock material, dispensed by the print head, to solidify the feedstock material. However, when the reinforcing fibers are opaque to the curing energy, they cast shadows and prevent the curing energy, originating directly from the source of curing energy, from irradiating and curing the photopolymer in the shadows.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to a system for additively manufacturing an object. The system comprises a feedstock-line supply, a delivery guide, and a curing mechanism. The feedstock-line supply is configured to dispense a feedstock line. The feedstock line has a feedstock-line length and an exterior surface, defining an interior volume of the feedstock line. The feedstock line comprises elongate fibers, a resin, and at least one optical modifier. The elongate filaments extend along at least a portion of the feedstock-line length. The resin covers the elongate filaments. At least the one optical modifier has an outer surface, covered by the resin. At least the one optical modifier is interspersed among the elongate filaments. The delivery guide is movable relative to a surface, and is configured to receive the feedstock line from the feedstock-line supply and to deposit the feedstock line along a print path. The curing mechanism is configured to direct electromagnetic radiation at the exterior surface of the feedstock line after the feedstock line is deposited by the delivery guide along the print path, such that when the electromagnetic radiation strikes the outer surface of at least the one optical modifier, at least the one optical modifier causes the electromagnetic radiation to irradiate, in the interior volume of the feedstock line, the resin that, due at least in part to the elongate filaments, is not directly accessible to the electromagnetic radiation, incident on the exterior surface of the feedstock line.

The system therefore may be used to manufacture the object from a fiber reinforced composite material that facilitates in situ curing of the resin. More specifically, inclusion of at least one optical modifier in the feedstock line facilitates penetration of the electromagnetic radiation into the interior volume of the feedstock line for irradiation of the resin, despite regions of the resin being in the shadows of the elongate filaments cast by the direct (i.e., line-of-sight) application of the electromagnetic radiation. In other words, even when the electromagnetic radiation is shielded from directly reaching all regions of the resin, at least the one optical modifier will redirect the electromagnetic radiation to indirectly reach regions of the resin. As a result, the feedstock line may be more easily cured in situ with the electromagnetic radiation, may be more evenly cured in situ with the electromagnetic radiation, may be more thoroughly cured in situ with the electromagnetic radiation, and/or may be more quickly cured in situ with the electromagnetic radiation.

Another example of the subject matter according to the invention relates to a method of additively manufacturing an object. The method comprises depositing a feedstock line along a print path, using a delivery guide. The feedstock line has a feedstock-line length and an exterior surface, defining an interior volume of the feedstock line. The feedstock line comprises elongate filaments, a resin, and at least one optical modifier. The elongate filaments extend along at least a portion of the feedstock-line length. The resin covers the elongate filaments. At least the one optical modifier has an outer surface, covered by the resin. At least the one optical modifier is interspersed among the elongate filaments. The method also comprises a step of directing electromagnetic radiation at the exterior surface of the feedstock line after the feedstock line is deposited by the delivery guide along the print path. The step of directing electromagnetic radiation at the exterior surface of the feedstock line after the feedstock line is deposited by the delivery guide along the print path causes the electromagnetic radiation to strike the outer surface of at least the one optical modifier, which in turn causes the electromagnetic radiation to irradiate, in the interior volume of the feedstock line, the resin that, due at least in part to the elongate filaments, is not directly accessible to the electromagnetic radiation, incident on the exterior surface of the feedstock line.

The method therefore may be implemented to manufacture the object from a fiber reinforced composite material that facilitates in situ curing of the resin. Moreover, the method may be implemented to manufacture the object with the elongate filaments being oriented in desired and/or predetermined orientations throughout the object, such as to define desired properties of the object. In addition and as discussed in connection with the system above, inclusion of at least one optical modifier in the feedstock line facilitates penetration of the electromagnetic radiation into the interior volume of the feedstock line for irradiation of the resin, despite regions of the resin being in the shadows of the elongate filaments cast by the direct (i.e., line-of-sight) application of the electromagnetic radiation. In other words, even when the electromagnetic radiation is shielded from directly reaching all regions of the resin, at least one the optical modifier will redirect the electromagnetic radiation to indirectly reach regions of the resin. As a result, the feedstock line may be more easily cured in situ with the electromagnetic radiation, may be more evenly cured in situ with the electromagnetic radiation, may be more thoroughly cured in situ with the electromagnetic radiation, and/or may be more quickly cured in situ with the electromagnetic radiation.

BRIEF DESCRIPTION OF THE DRAWINGS

Figure 1:
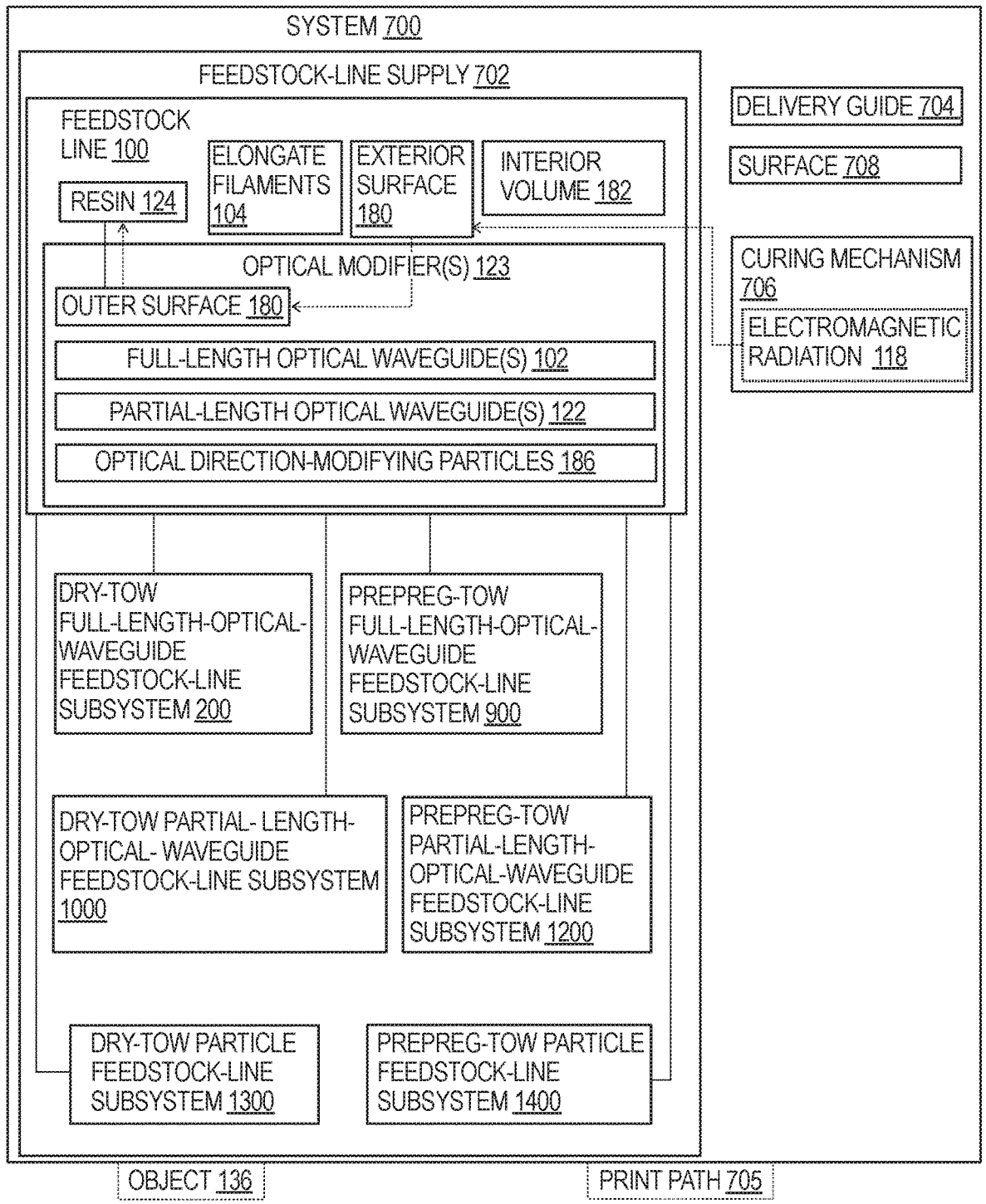
Figure 2:
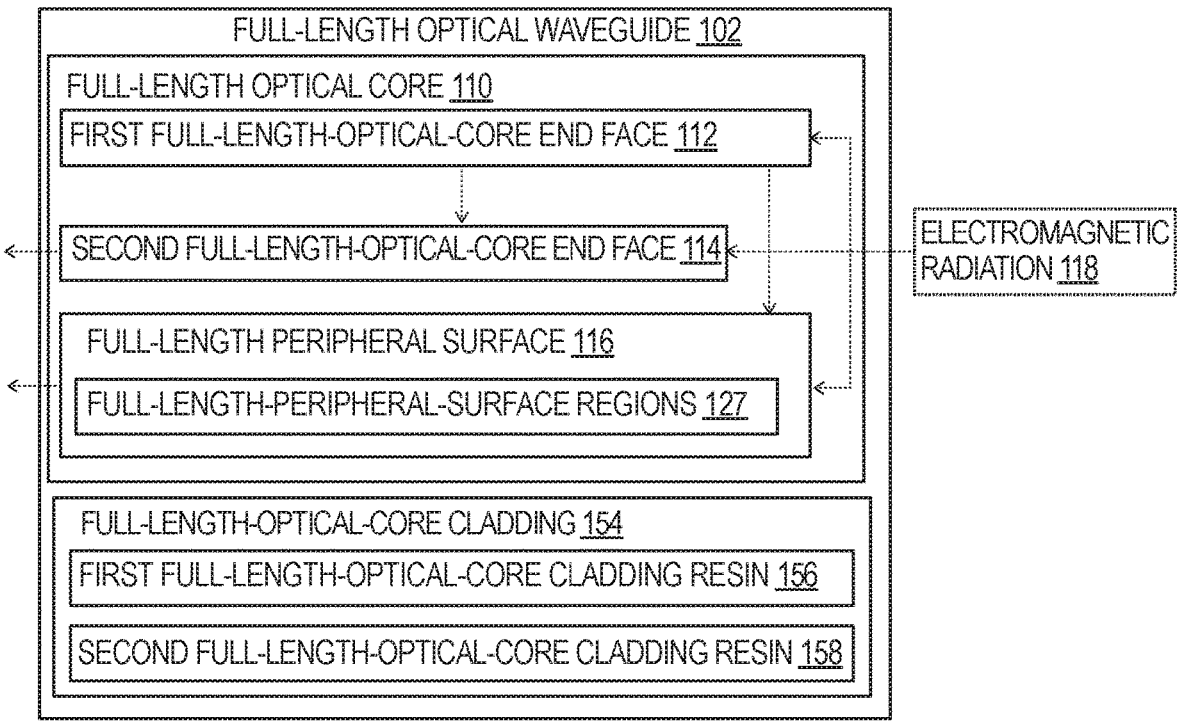
Figure 3:
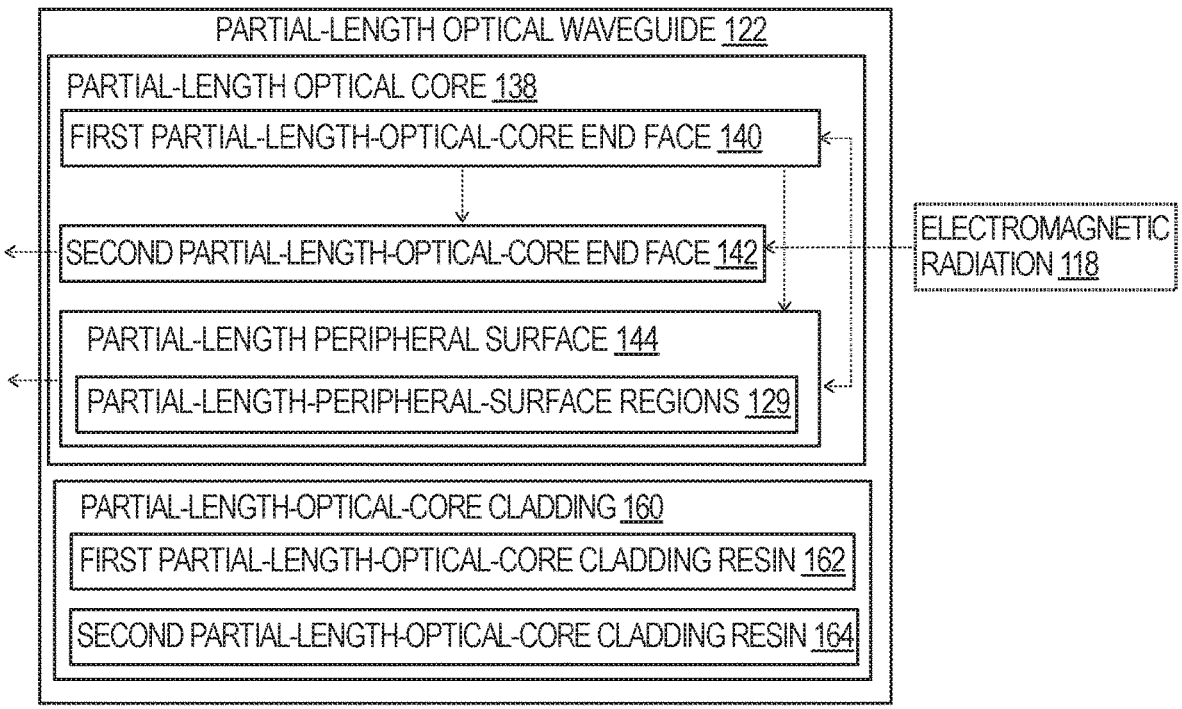
Figure 4:
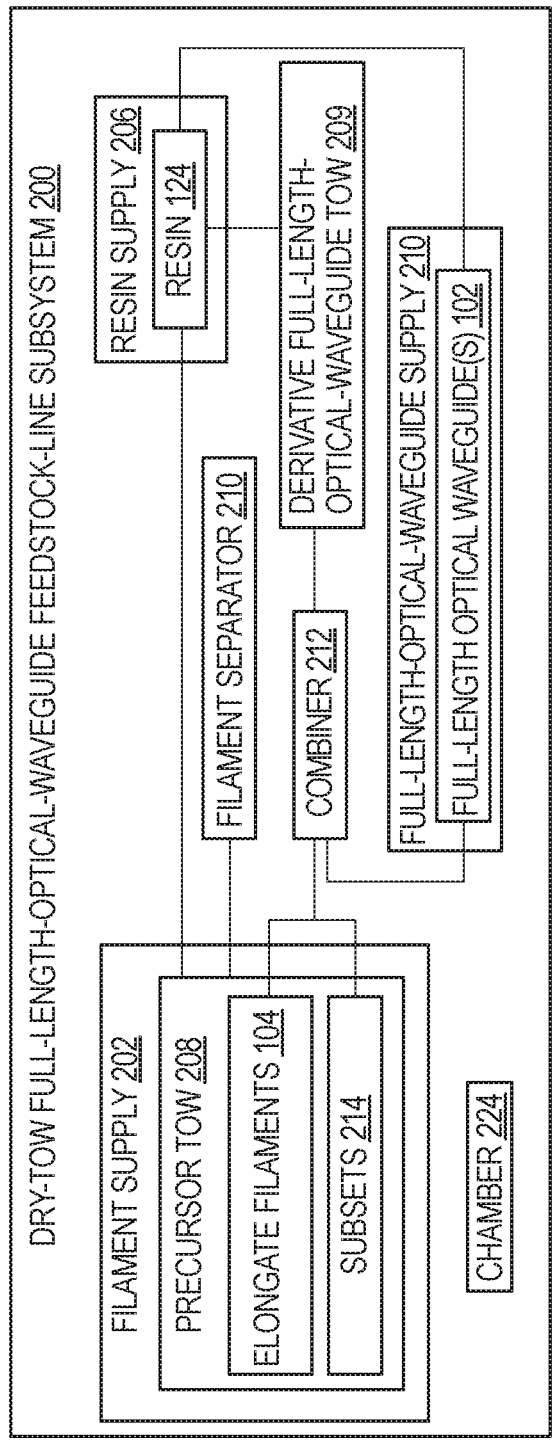
Figure 5:
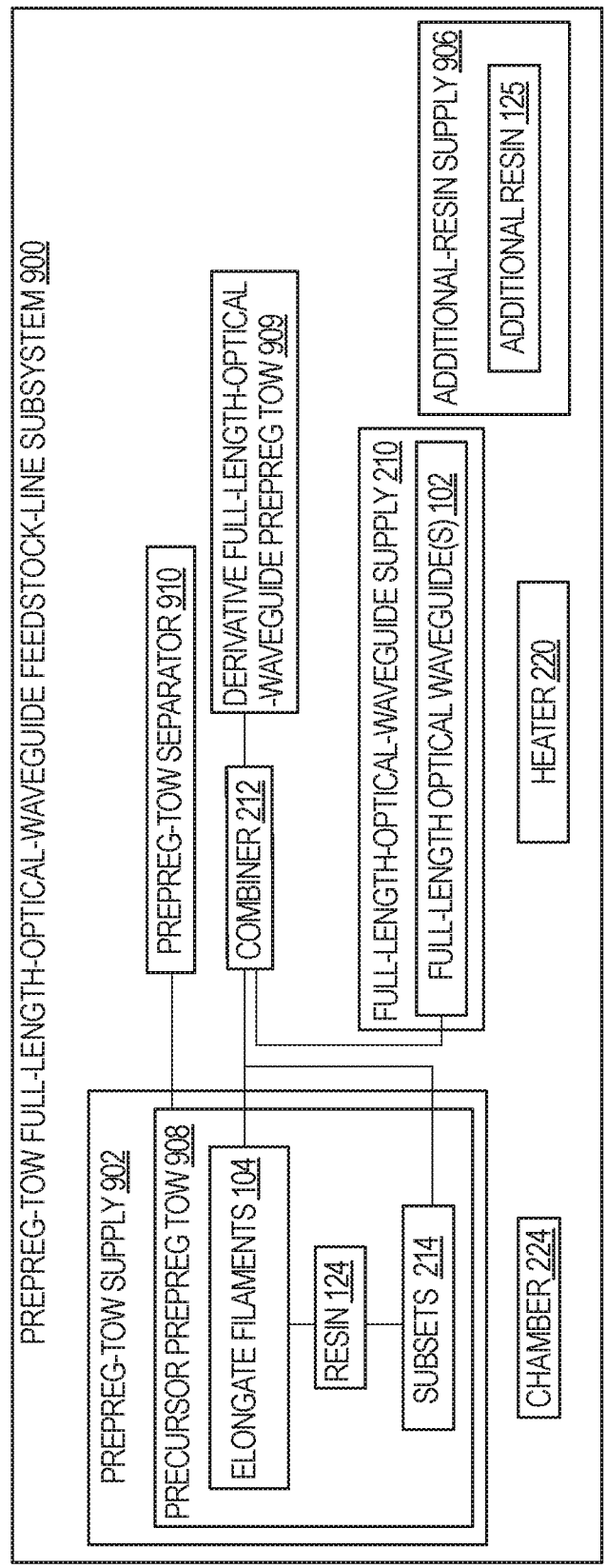
Figure 6:
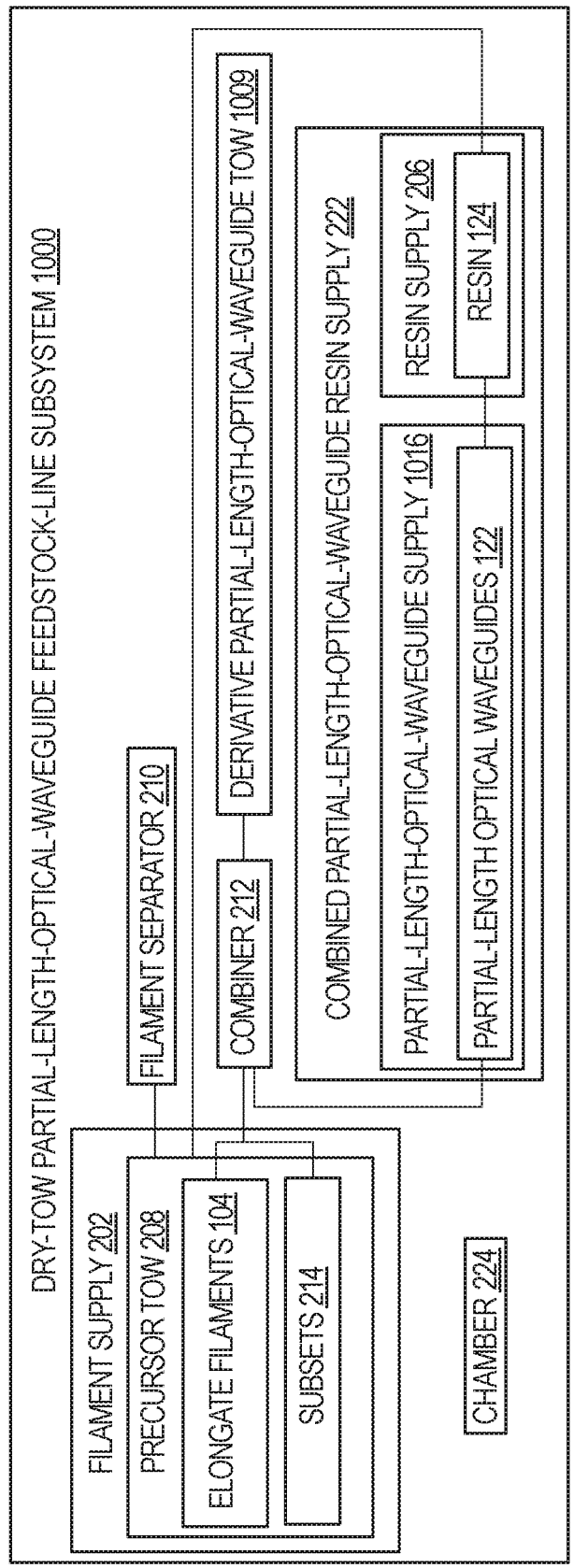
Figure 7:
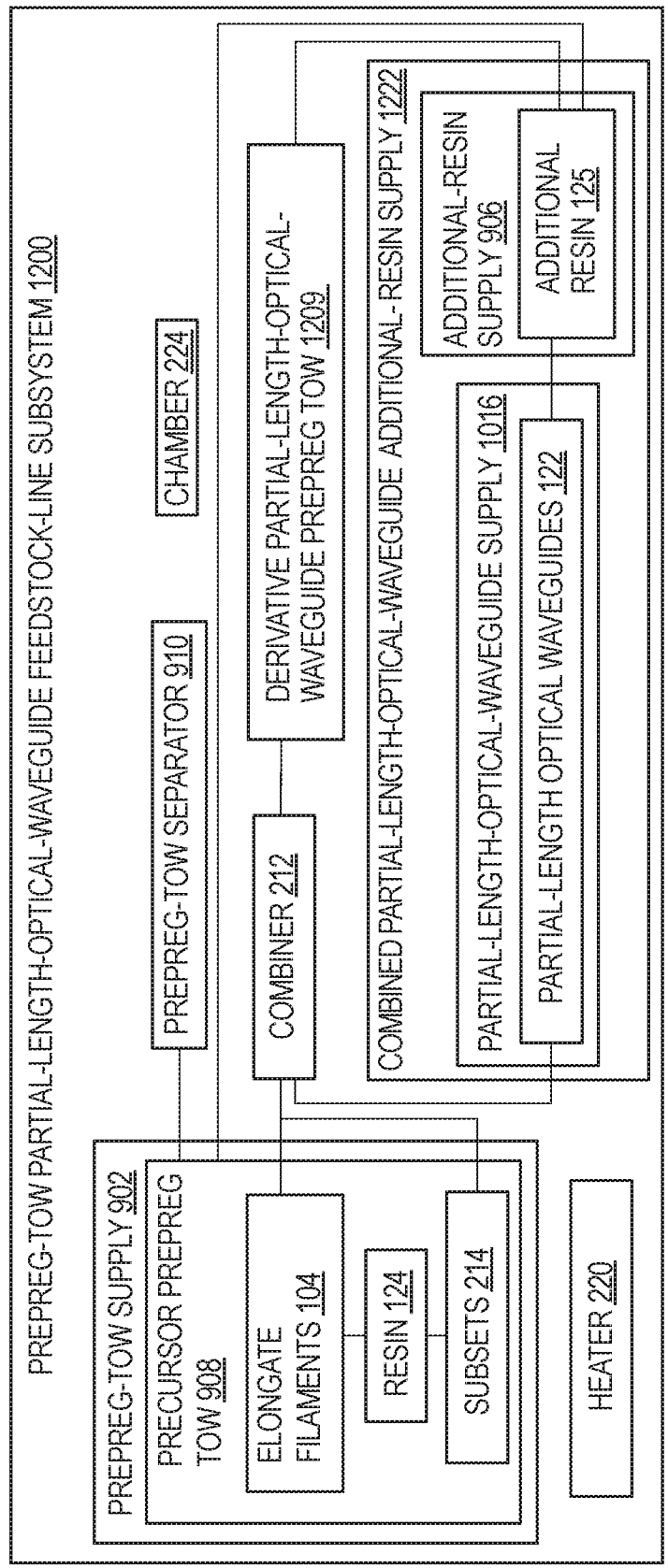
Figure 8:
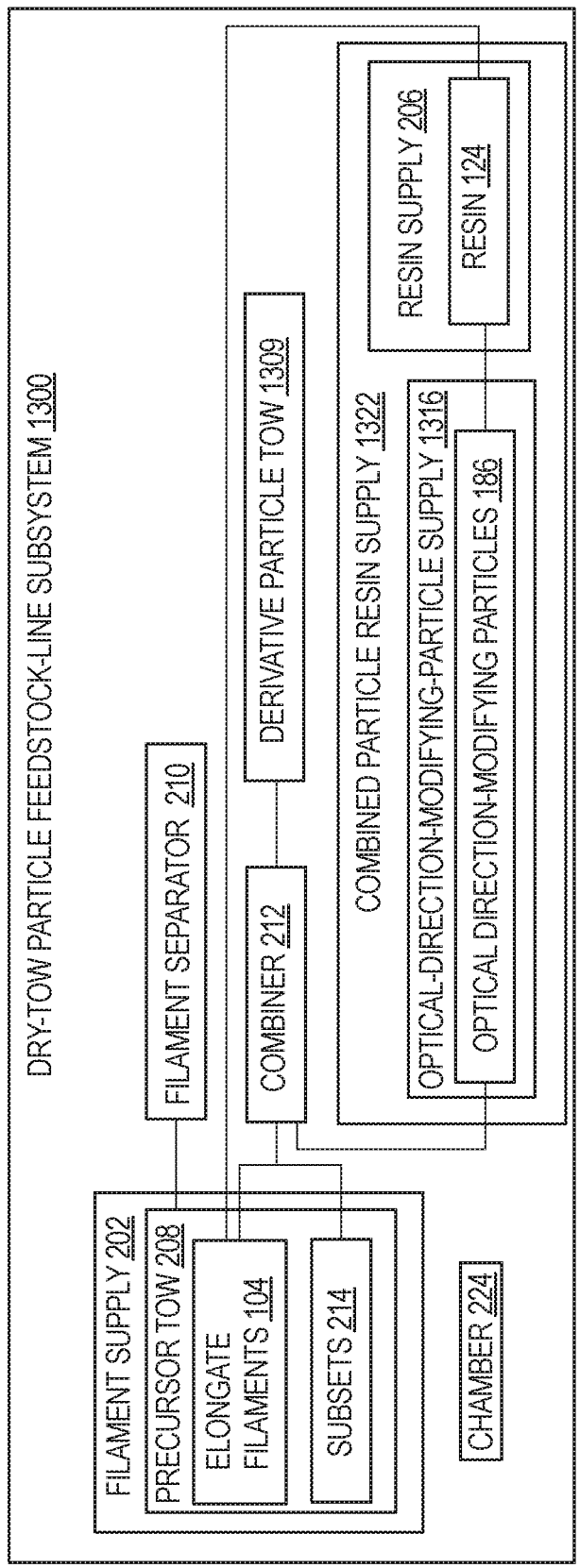
Figure 9:
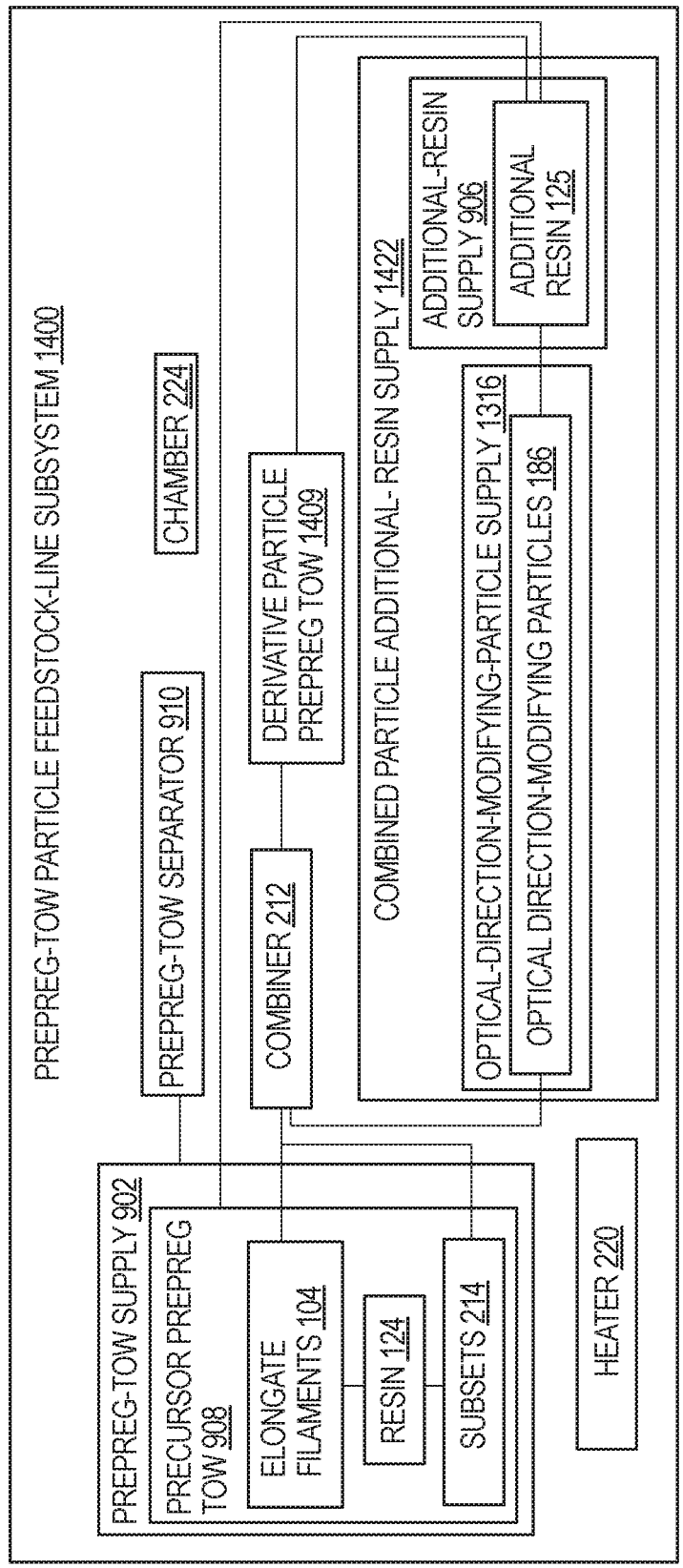
Figure 10:
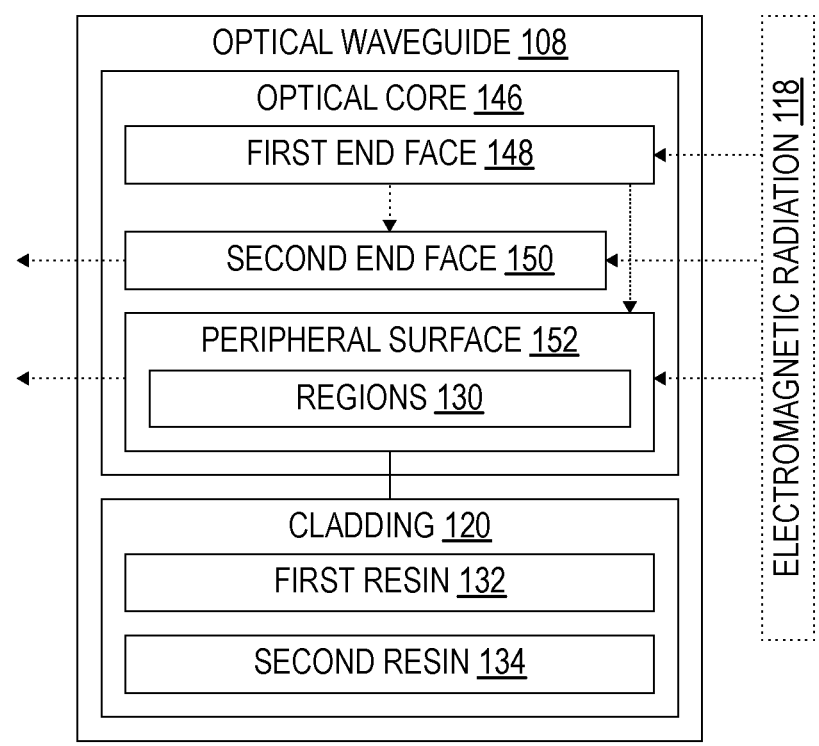
Figure 11:
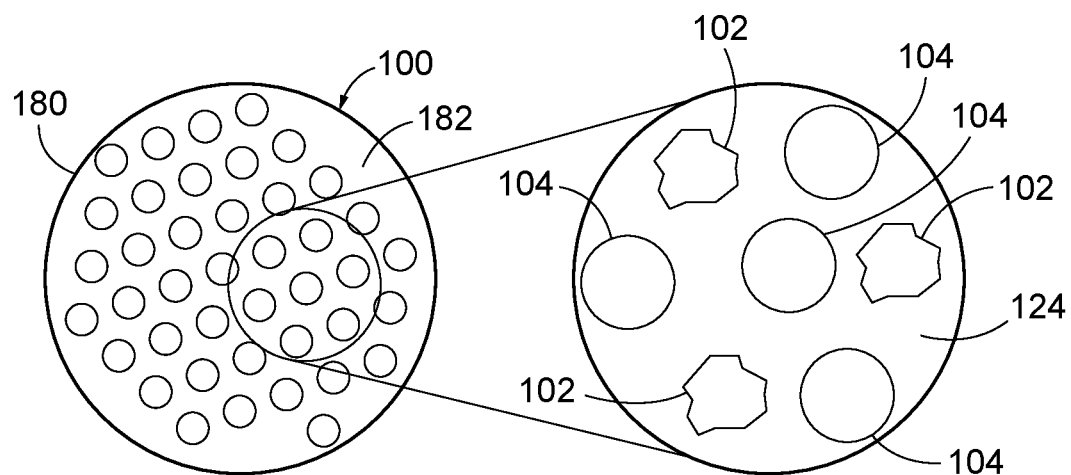
Figure 12:
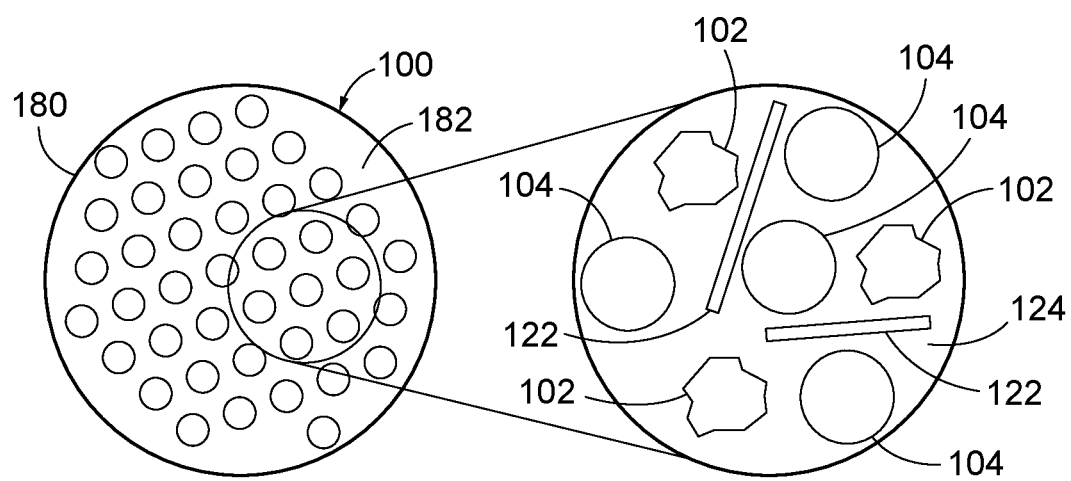
Figure 13:
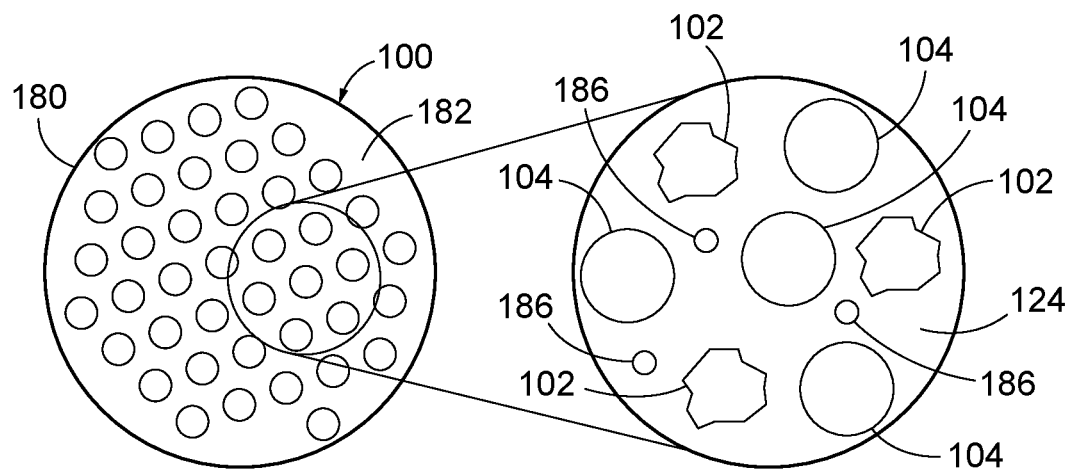
Figure 14:
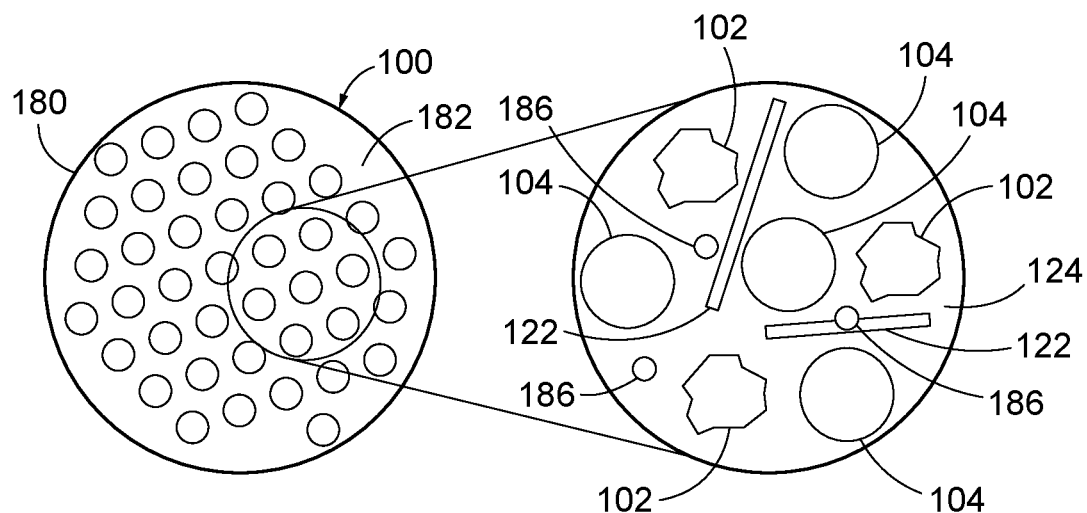
Figure 15:
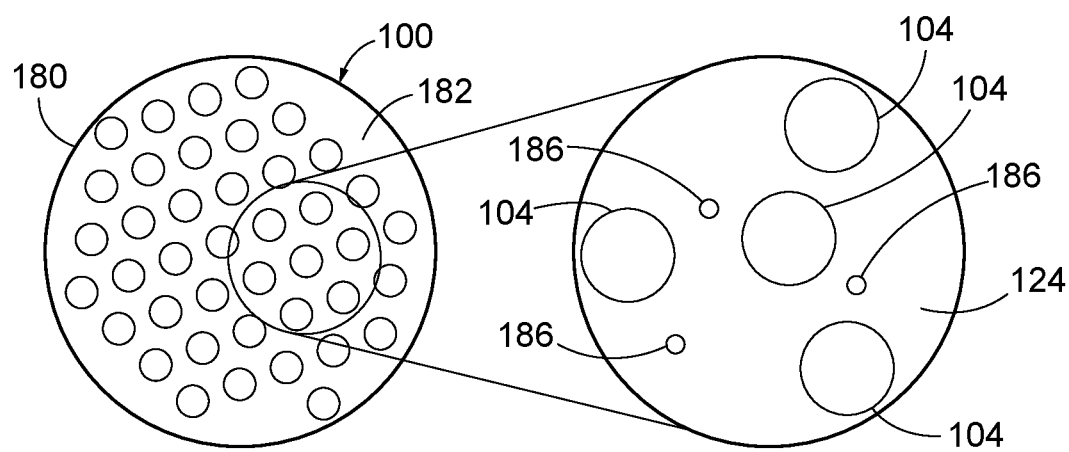
Figure 16:
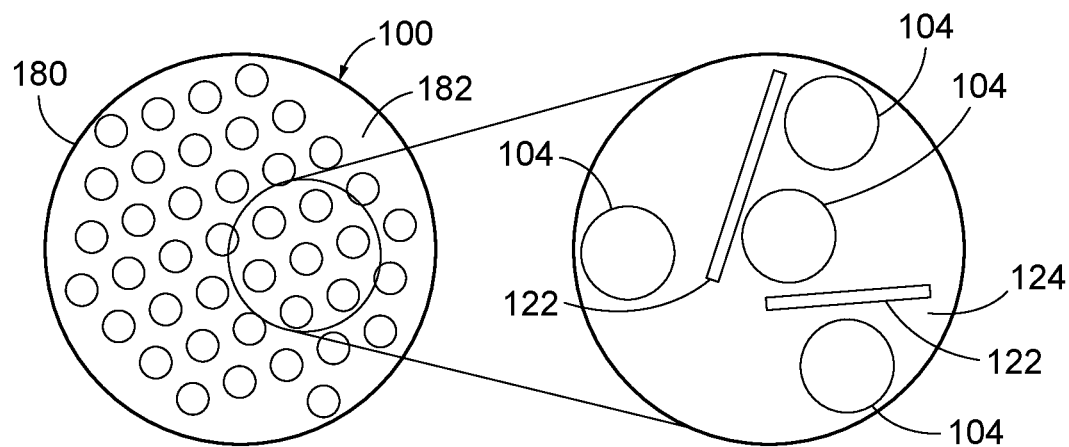
Figure 17:
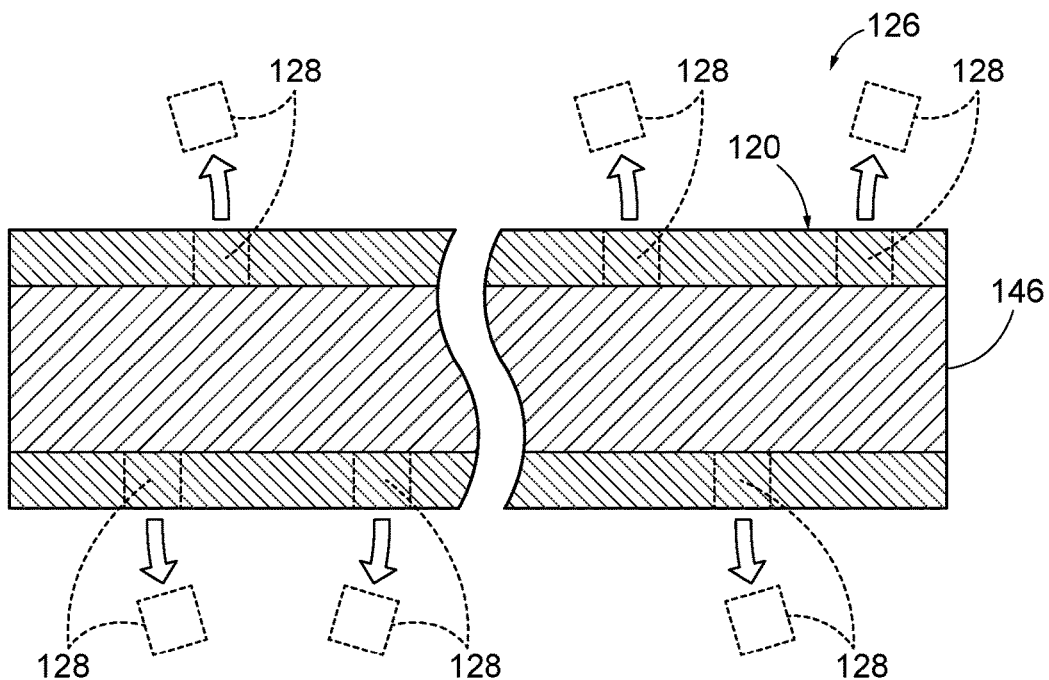
Figure 18:
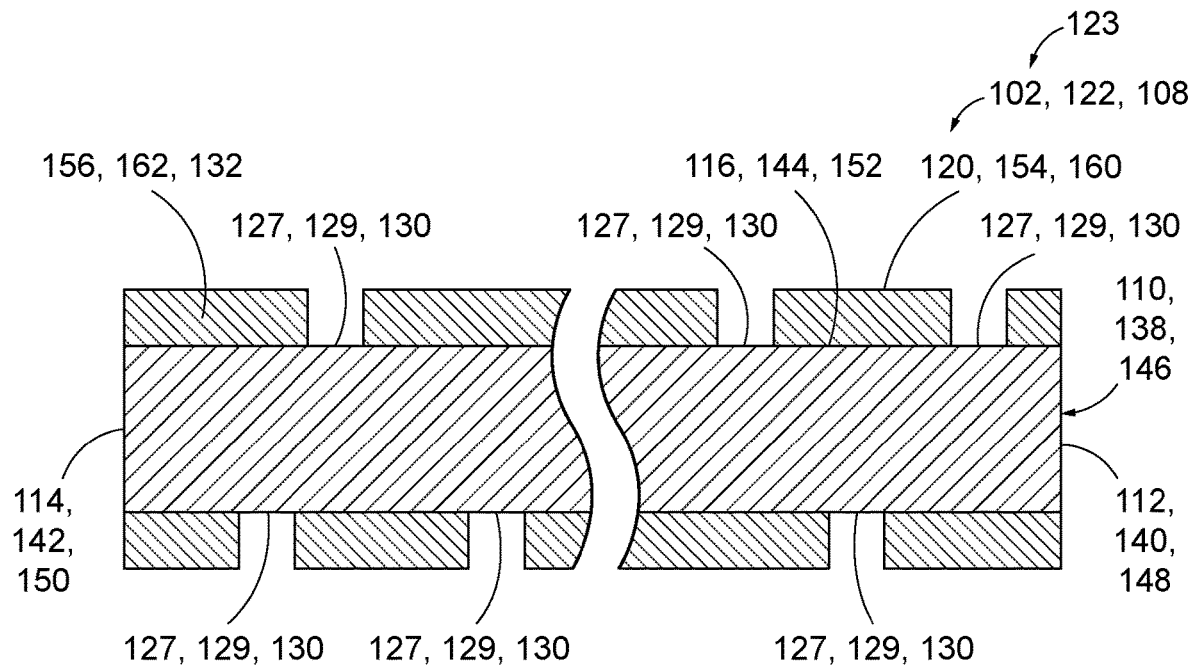
Figure 19:
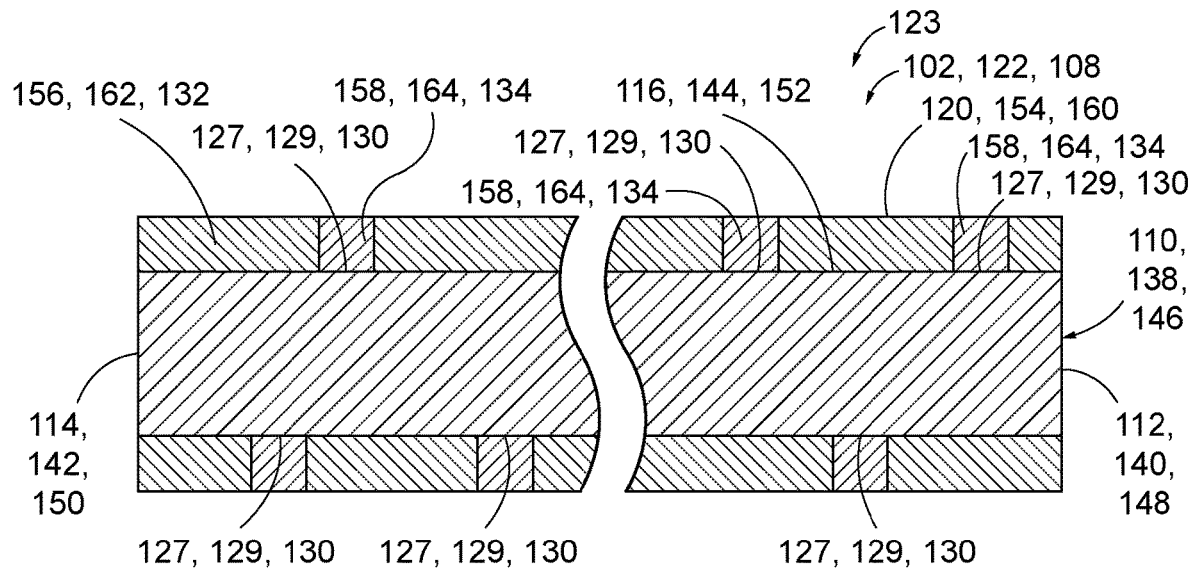
Figure 20:
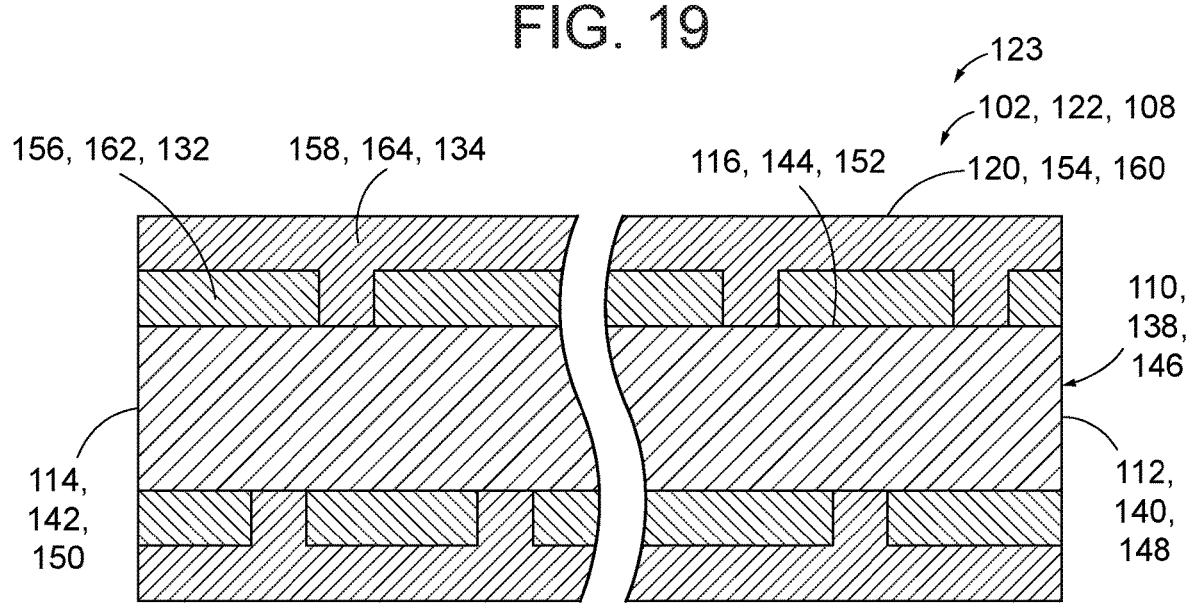
Figure 21:
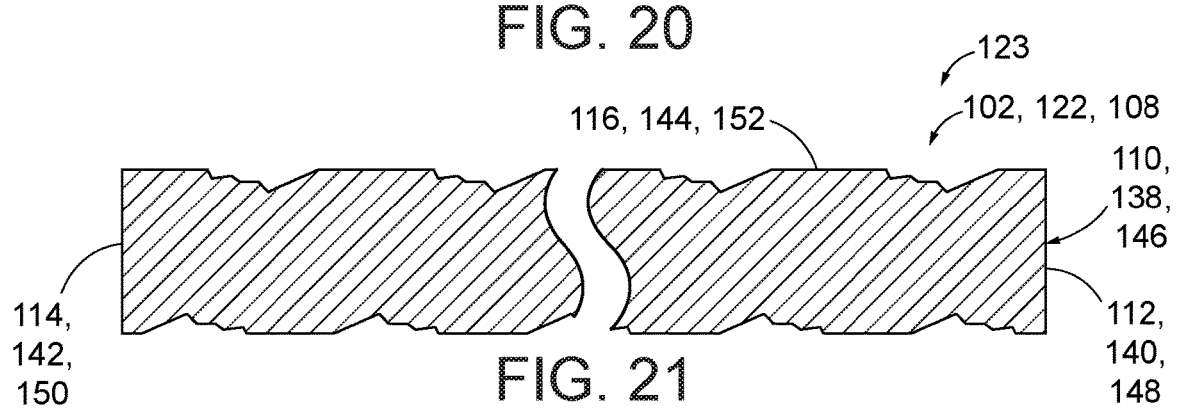
Figure 22:
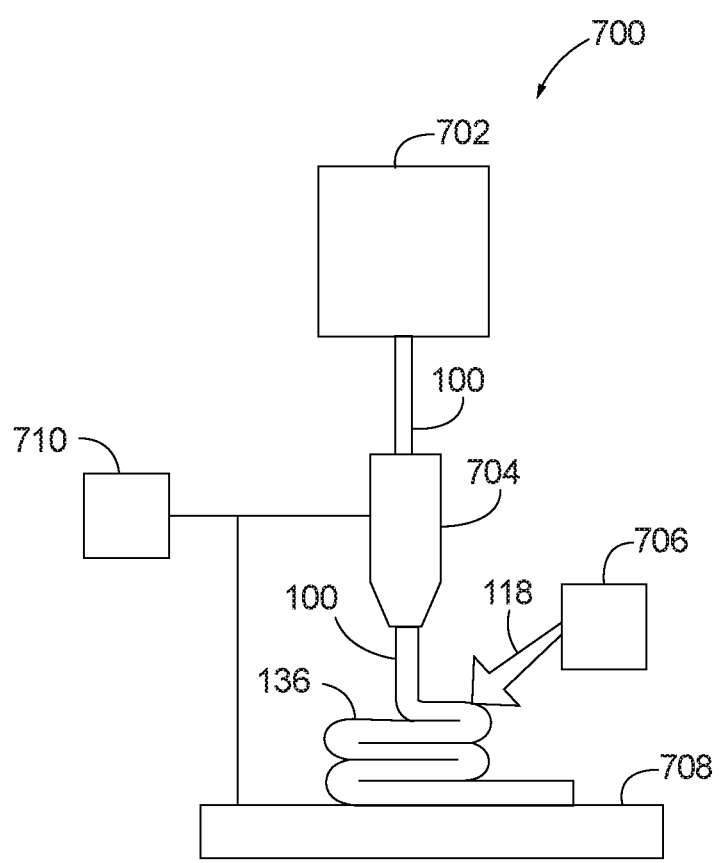
Figure 23:
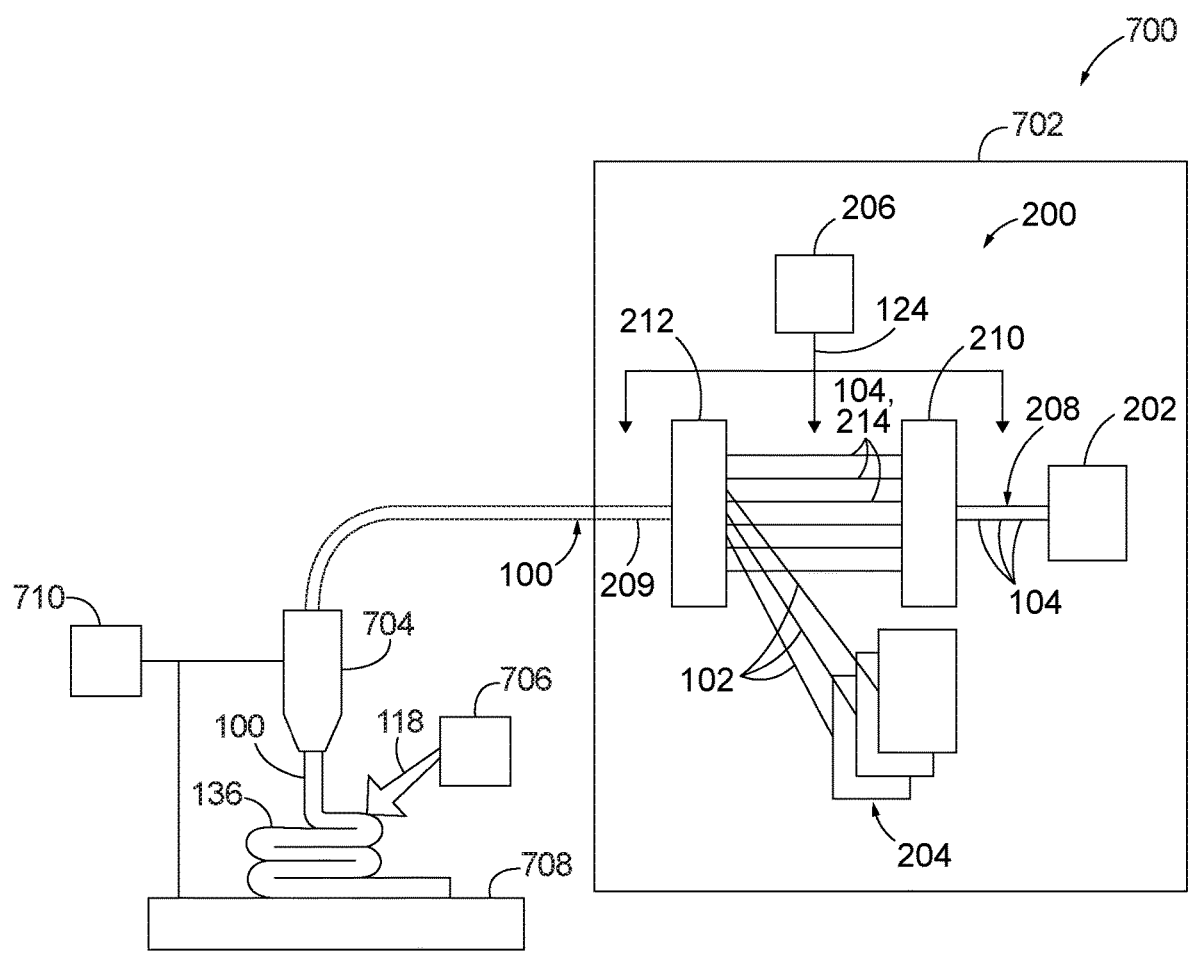
Figure 24:
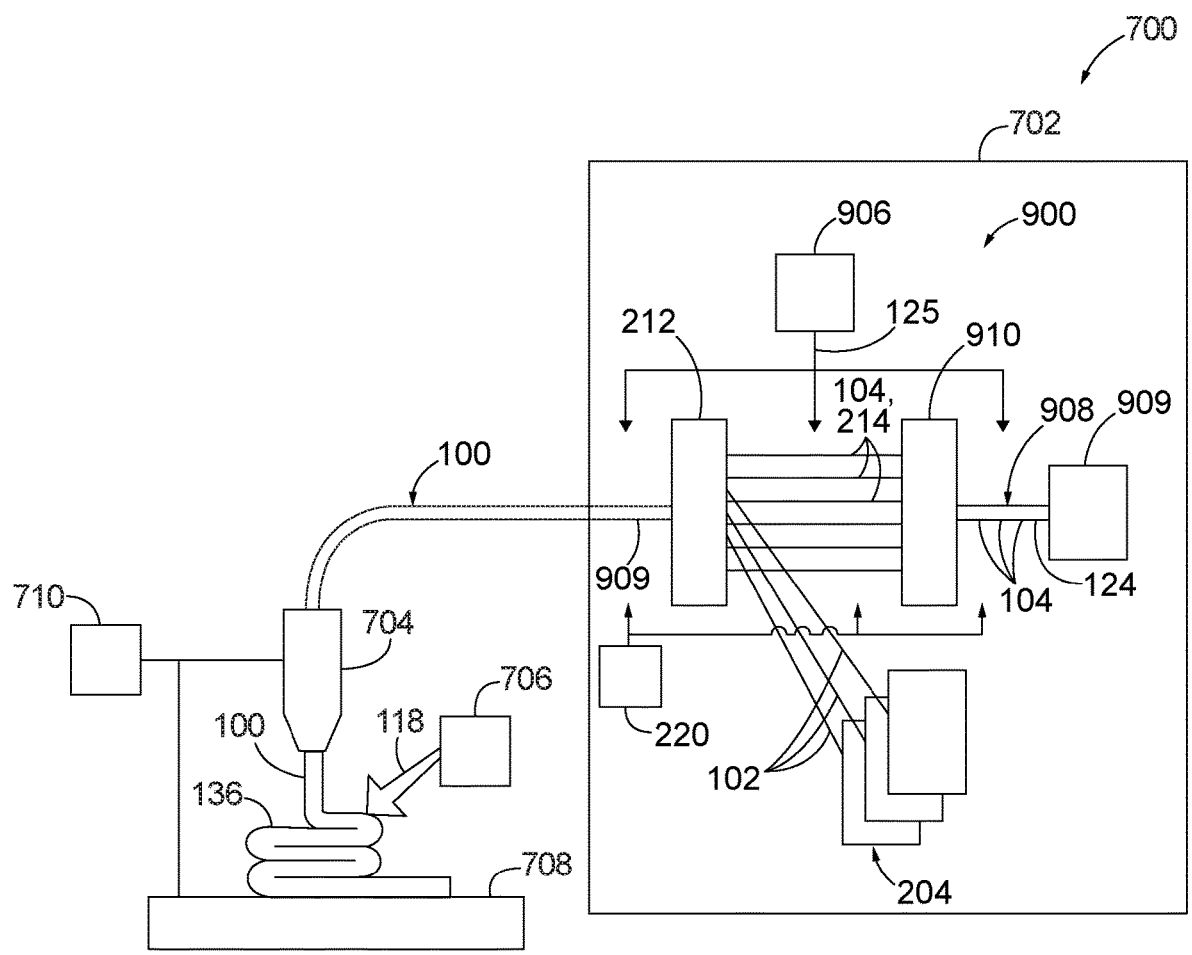
Figure 25:
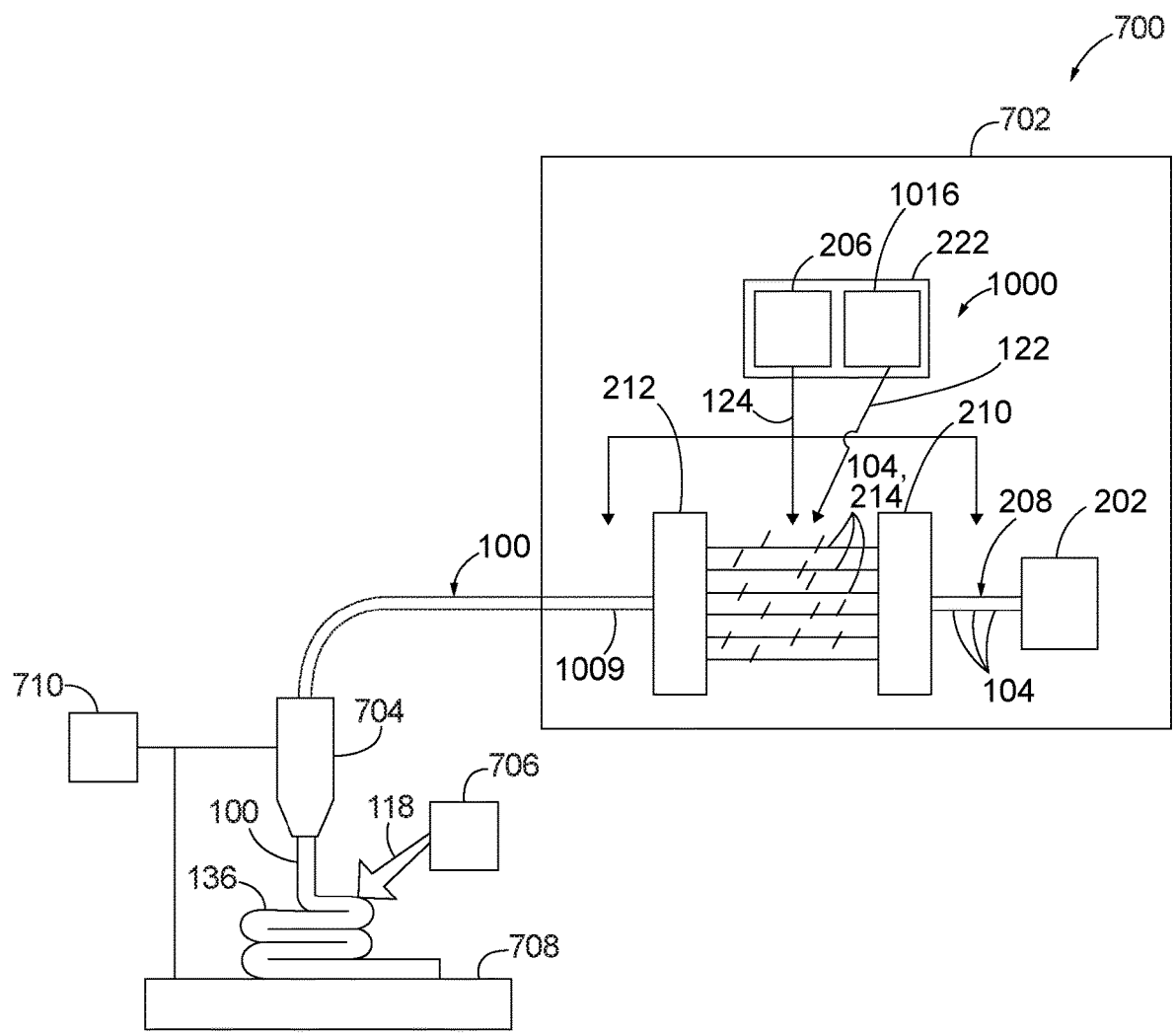
Figure 26:
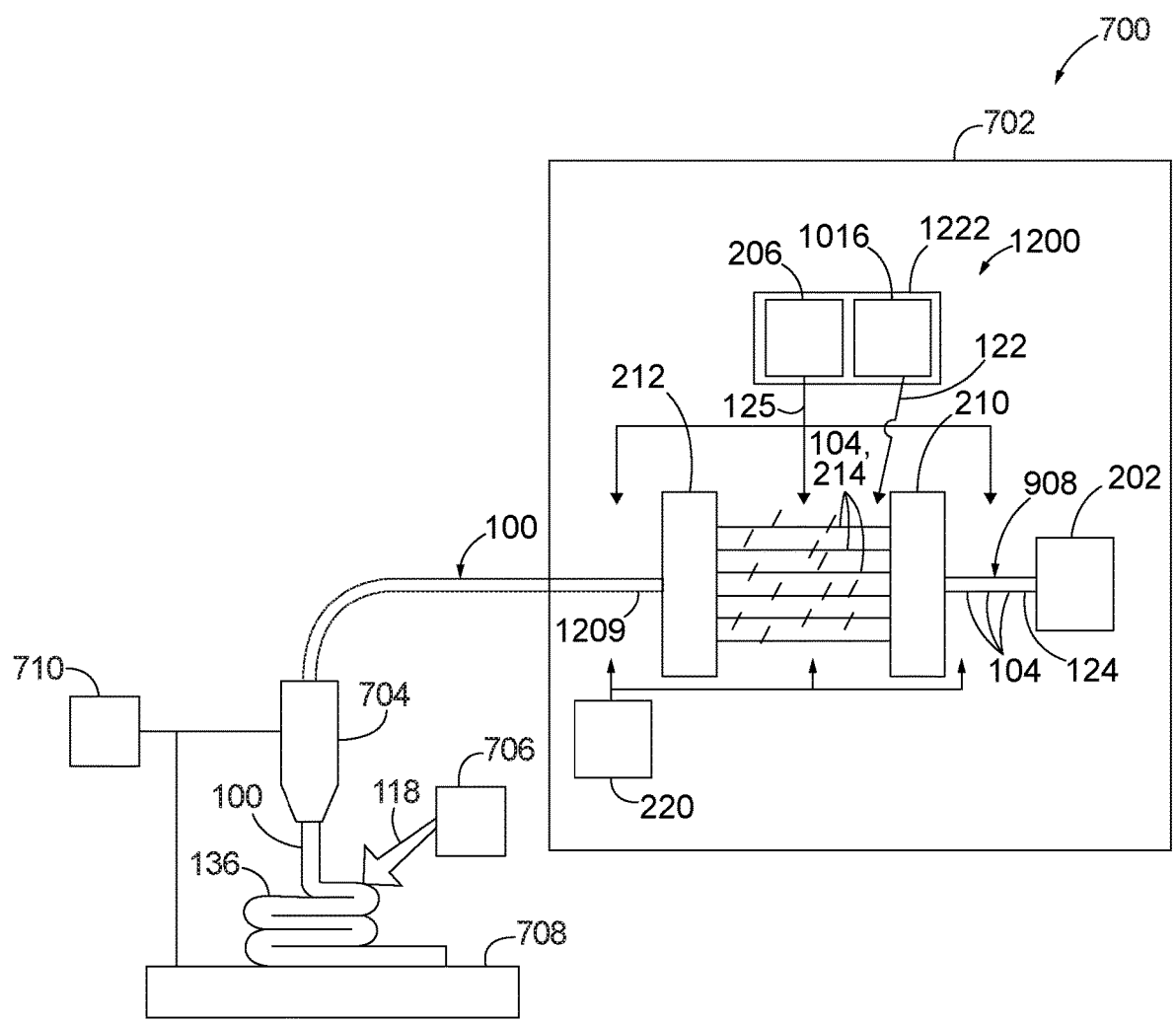
Figure 27:
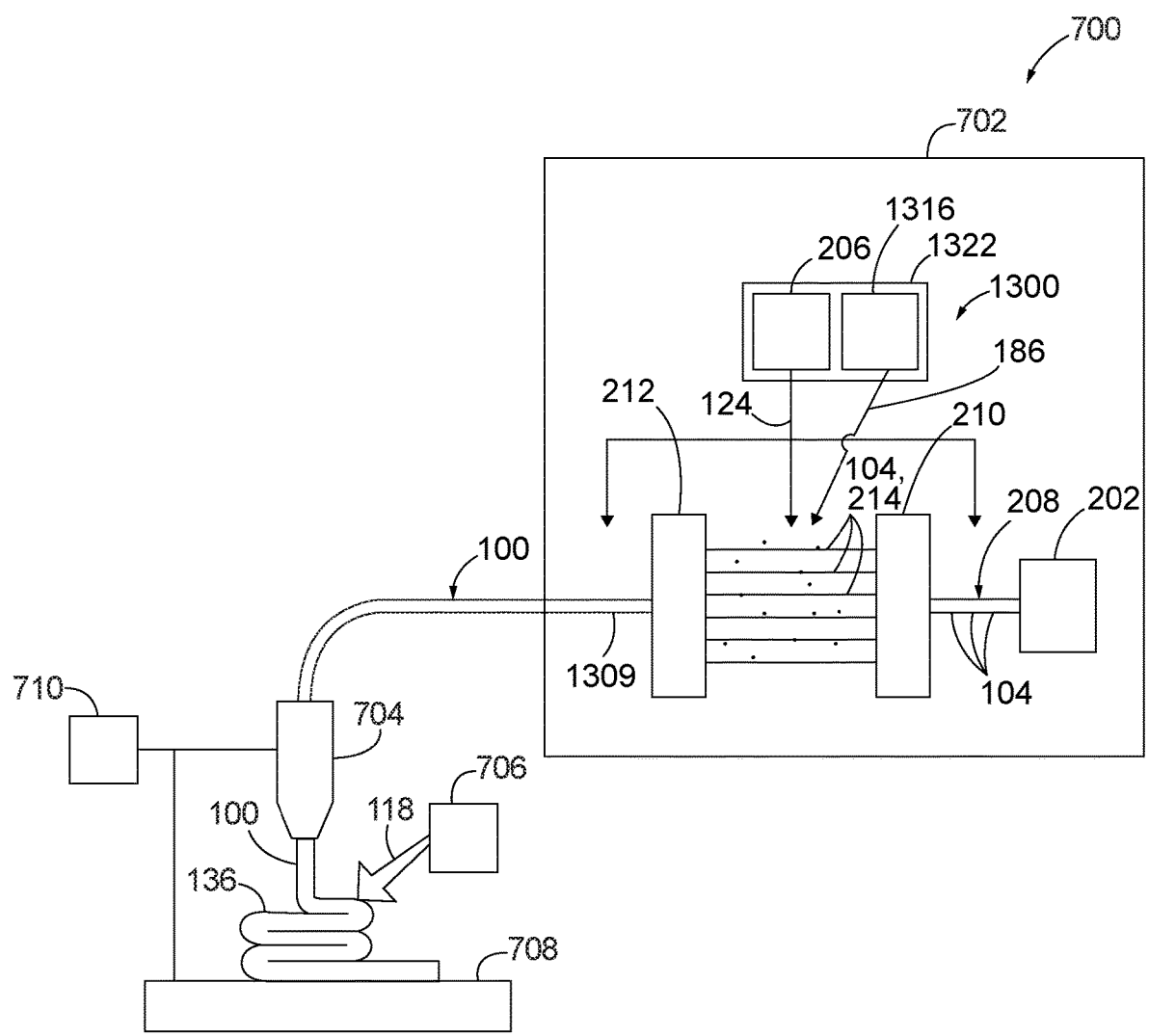
Figure 28:
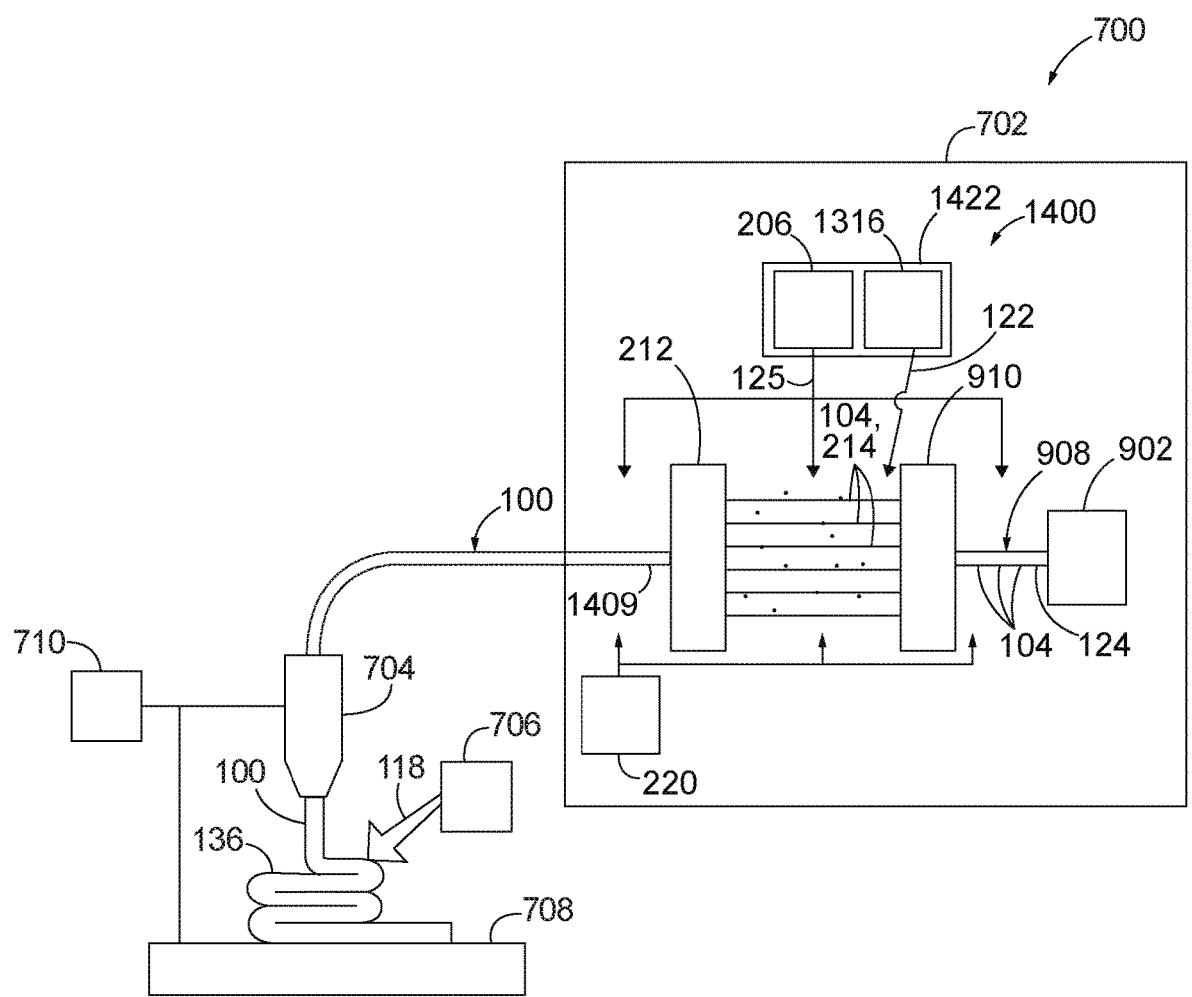
Figure 29:
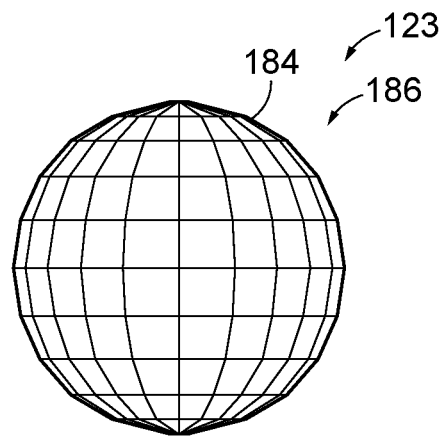
Figure 30:
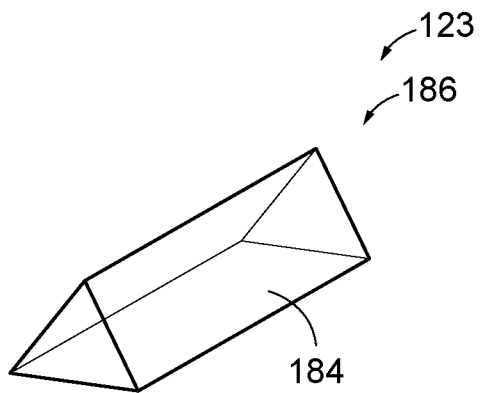
Figure 31:
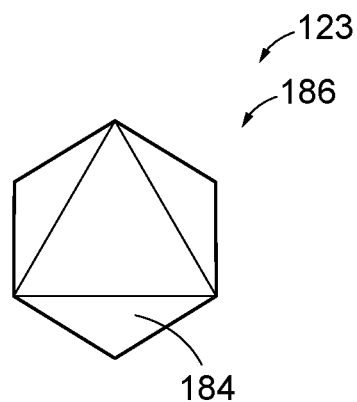
Figure 32A:
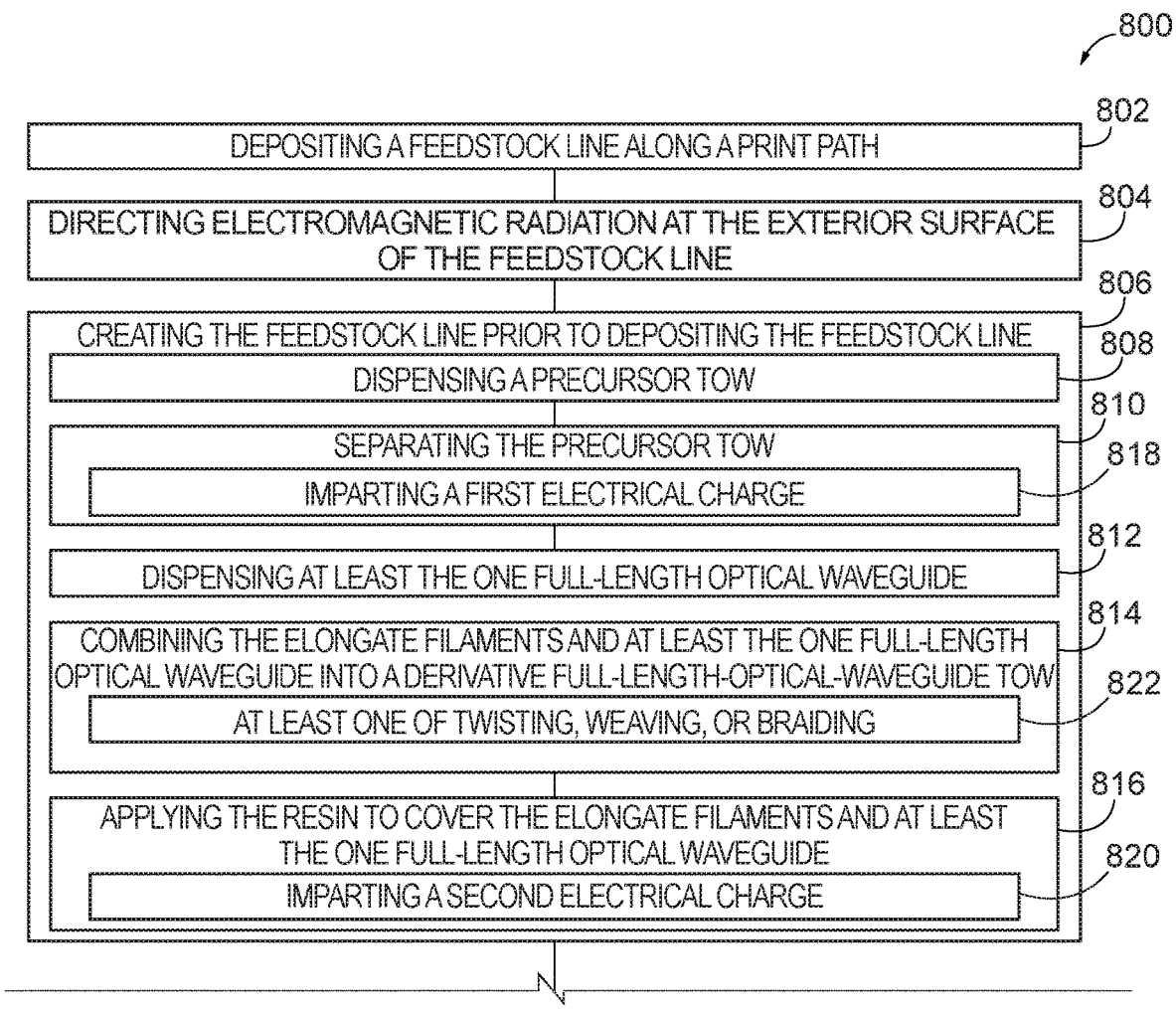
Figure 32B:
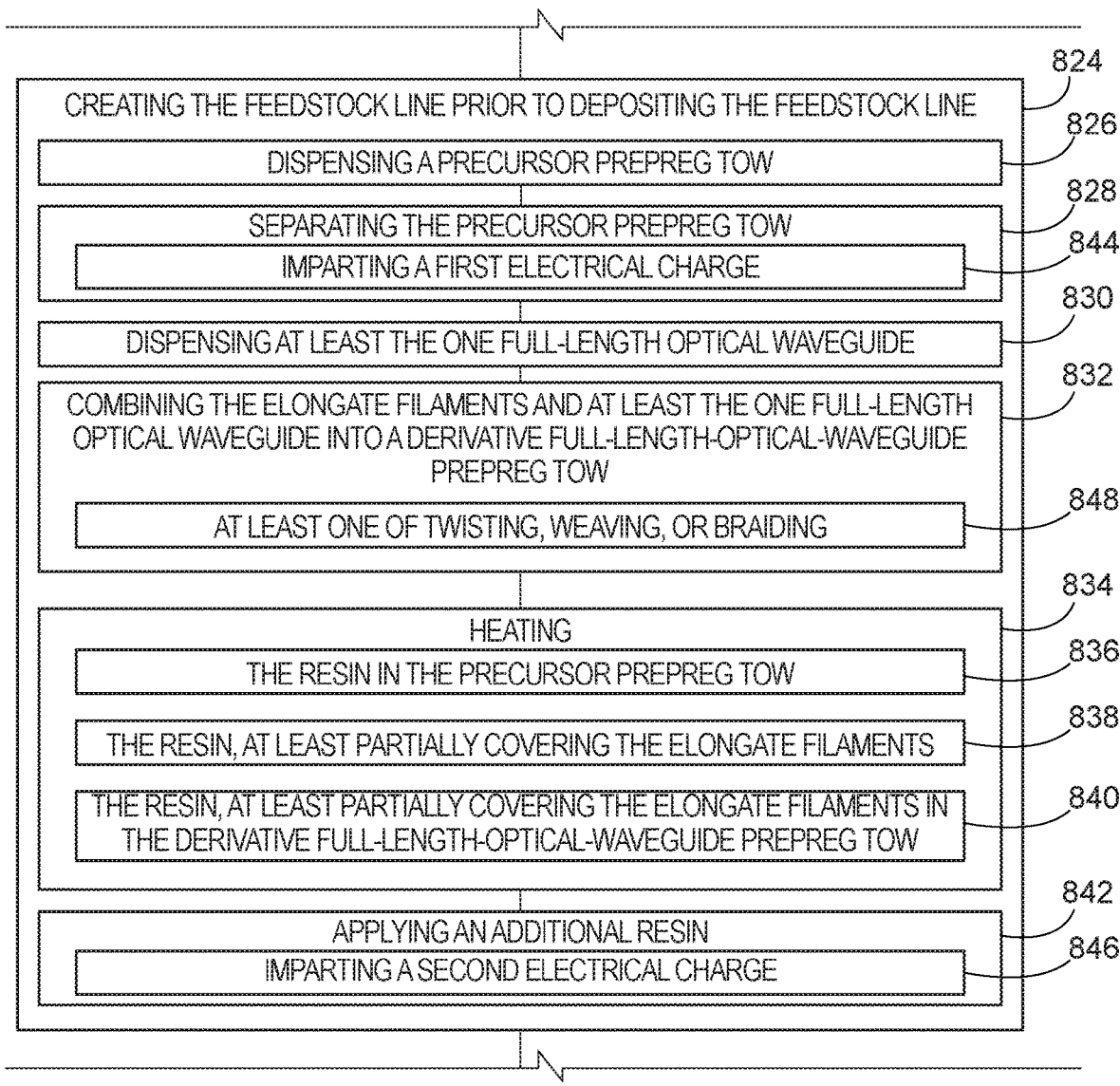
Figure 32C:
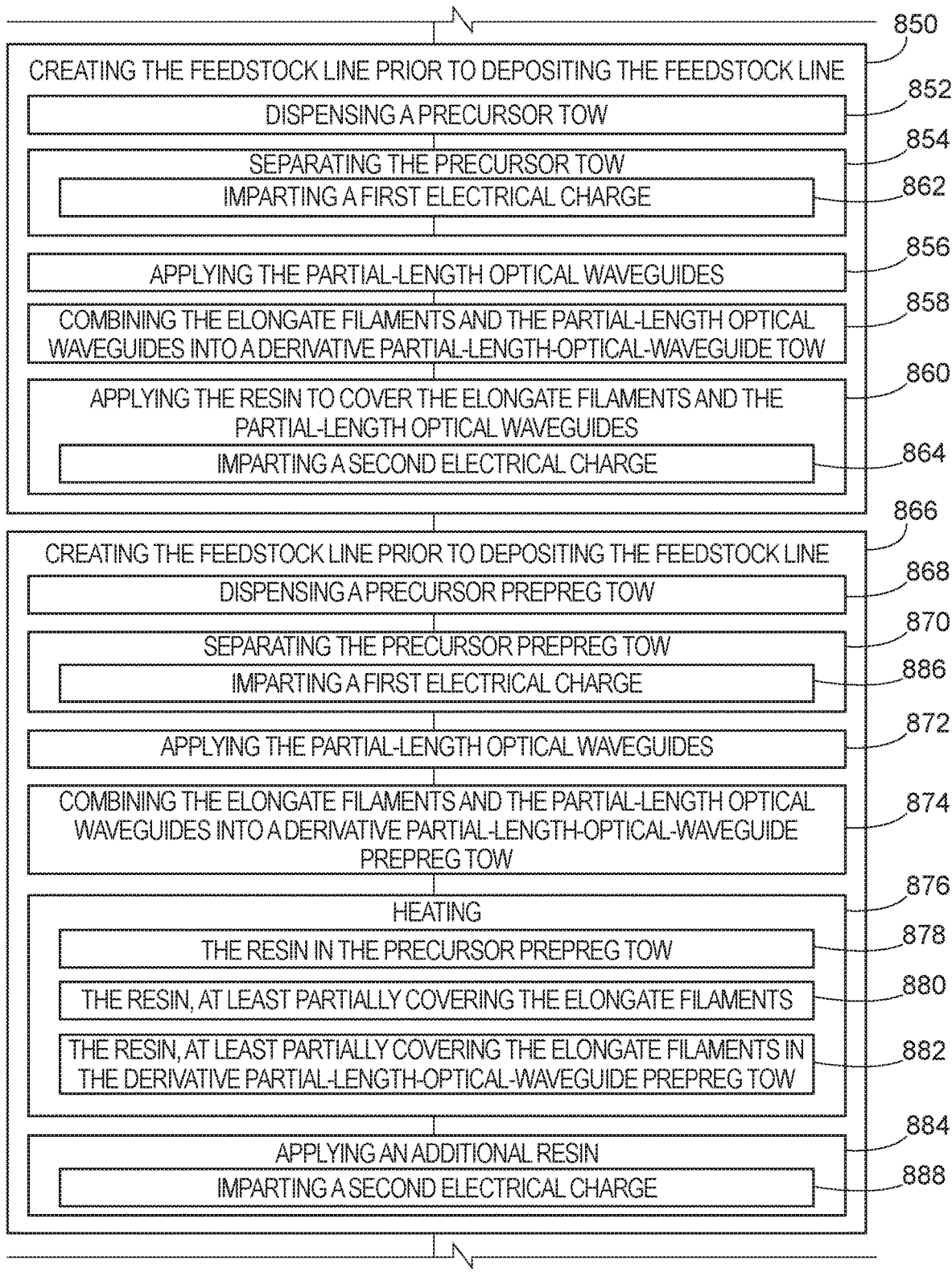
Figure 32D:
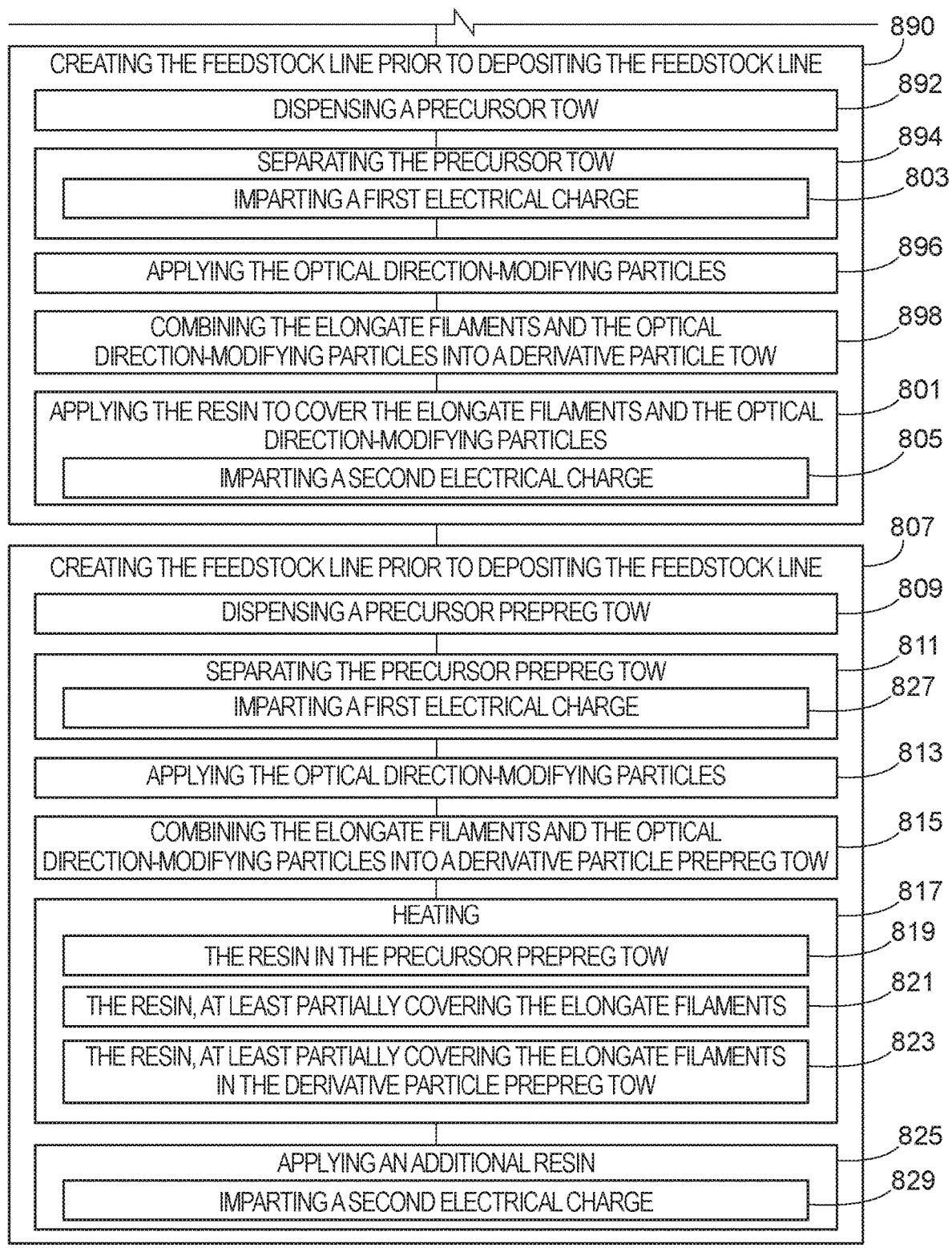
Figure 33:
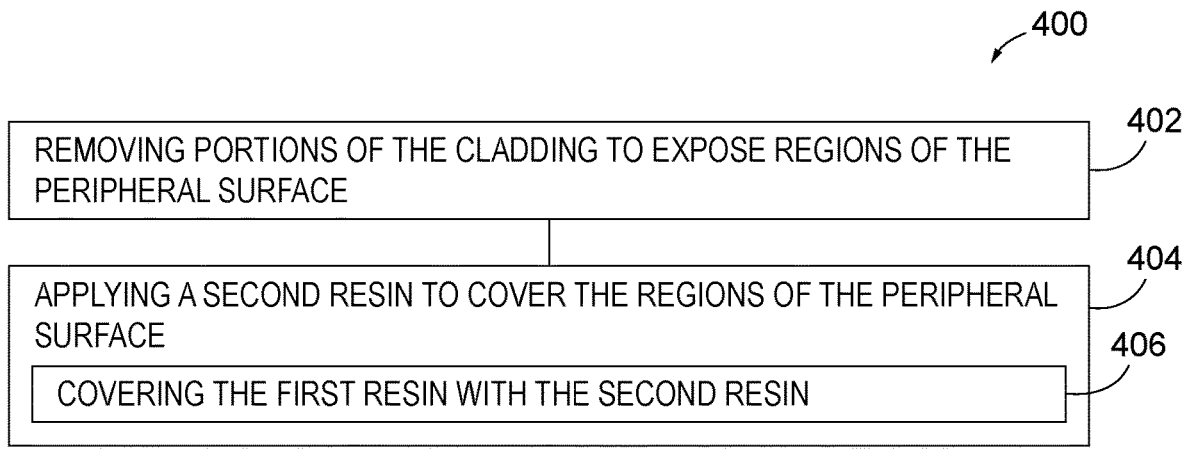
Figure 34:
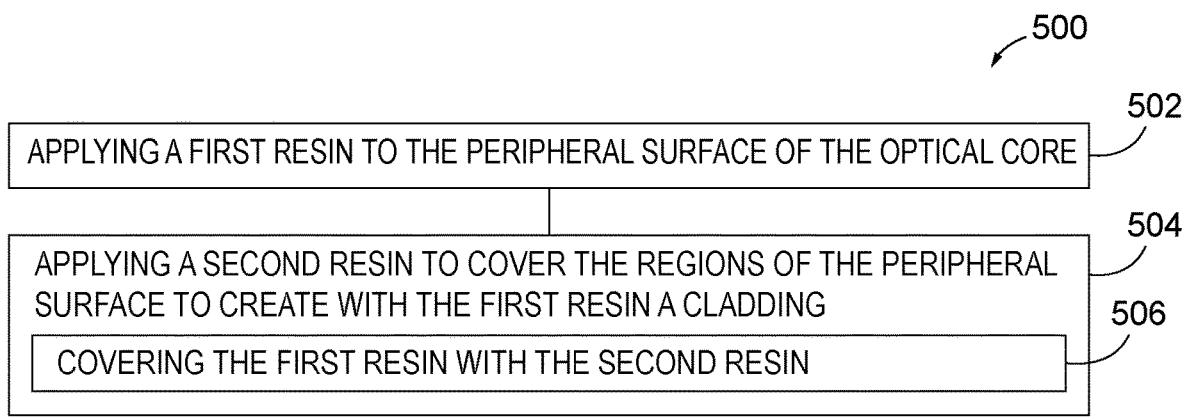
Figure 35:
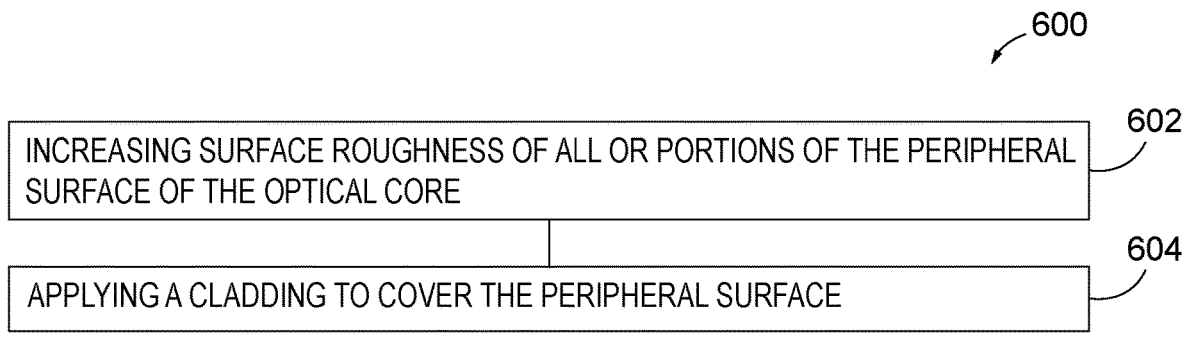
Figure 36:
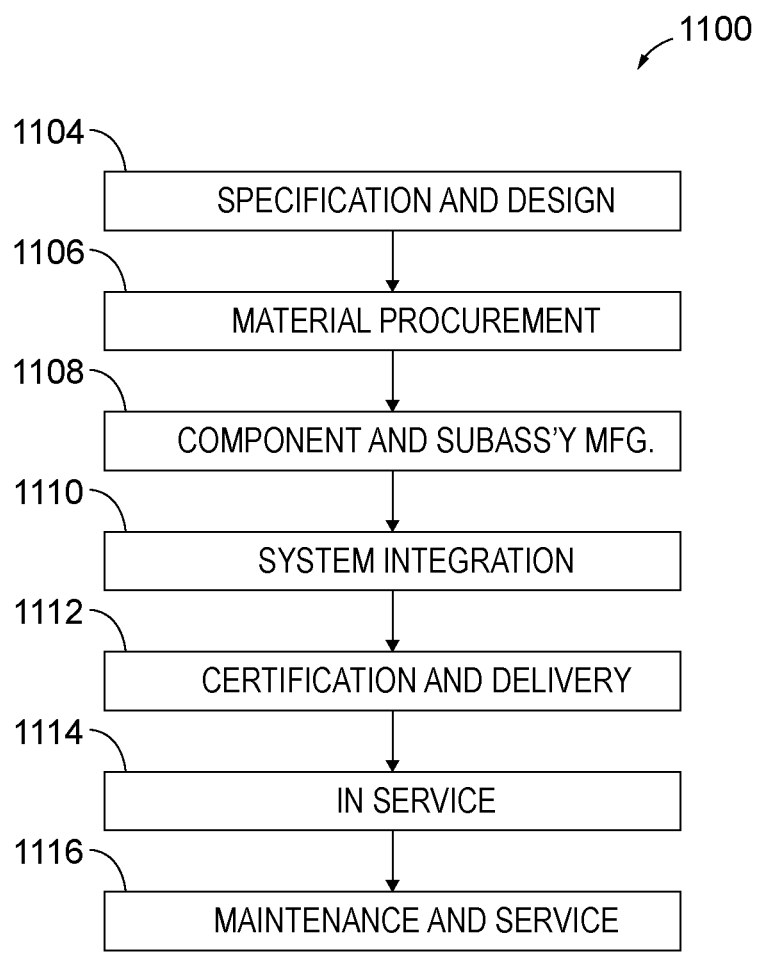

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a block diagram, schematically representing a system for additively manufacturing an object, according to one or more examples of the present disclosure;

FIG. 2 is a block diagram, schematically representing a full-length optical waveguide, according to one or more examples of the present disclosure;

FIG. 3 is a block diagram, schematically representing a partial-length optical waveguide, according to one or more examples of the present disclosure;

FIG. 4 is a block diagram, schematically representing a dry-tow full-length-optical-waveguide feedstock-line subsystem of a system of FIG. 1, according to one or more examples of the present disclosure;

FIG. 5 is a block diagram, schematically representing a prepreg-tow full-length-optical-waveguide feedstock-line subsystem of a system of FIG. 1, according to one or more examples of the present disclosure;

FIG. 6 is a block diagram, schematically representing a dry-tow partial-length-optical-waveguide feedstock-line subsystem of a system of FIG. 1, according to one or more examples of the present disclosure;

FIG. 7 is a block diagram, schematically representing a prepreg-tow partial-length-optical-waveguide feedstock-line subsystem of a system of FIG. 1, according to one or more examples of the present disclosure;

FIG. 8 is a block diagram, schematically representing a dry-tow particle feedstock-line subsystem of a system of FIG. 1, according to one or more examples of the present disclosure;

FIG. 9 is a block diagram, schematically representing a prepreg-tow particle feedstock-line subsystem of a system of FIG. 1, according to one or more examples of the present disclosure;

FIG. 10 is a block diagram, schematically representing an optical waveguide, according to one or more examples of the present disclosure;

FIG. 11 is a schematic representation of a feedstock line, according to one or more examples of the present disclosure;

FIG. 12 is a schematic representation of a feedstock line, according to one or more examples of the present disclosure;

FIG. 13 is a schematic representation of a feedstock line, according to one or more examples of the present disclosure;

FIG. 14 is a schematic representation of a feedstock line, according to one or more examples of the present disclosure;

FIG. 15 is a schematic representation of a feedstock line, according to one or more examples of the present disclosure;

FIG. 16 is a schematic representation of a feedstock line, according to one or more examples of the present disclosure;

FIG. 17 is a schematic representation of an optical fiber that may be modified to create an optical waveguide of FIG. 10, according to one or more examples of the present disclosure;

FIG. 18 is a schematic representation of an optical waveguide, according to one or more examples of the present disclosure;

FIG. 19 is a schematic representation of an optical waveguide, according to one or more examples of the present disclosure;

FIG. 20 is a schematic representation of an optical waveguide, according to one or more examples of the present disclosure;

FIG. 21 is a schematic representation of an optical waveguide, according to one or more examples of the present disclosure;

FIG. 22 is a schematic representation of a system of FIG. 1, according to one or more examples of the present disclosure;

FIG. 23 is a schematic representation of a system of FIG. 1, according to one or more examples of the present disclosure;

FIG. 24 is a schematic representation of a system of FIG. 1, according to one or more examples of the present disclosure;

FIG. 25 is a schematic representation of a system of FIG. 1, according to one or more examples of the present disclosure;

FIG. 26 is a schematic representation of a system of FIG. 1, according to one or more examples of the present disclosure;

FIG. 27 is a schematic representation of a system of FIG. 1, according to one or more examples of the present disclosure;

FIG. 28 is a schematic representation of a system of FIG. 1, according to one or more examples of the present disclosure;

FIG. 29 is a schematic representation of an optical direction-modifying particle, according to one or more examples of the present disclosure;

FIG. 30 is a schematic representation of an optical direction-modifying particle, according to one or more examples of the present disclosure;

FIG. 31 is a schematic representation of an optical direction-modifying particle, according to one or more examples of the present disclosure;

FIGS. 32A, 32B, 32C, and 32D collectively are a block diagram of a method of additively manufacturing an object, according to one or more examples of the present disclosure;

FIG. 33 is a block diagram of a method of modifying an optical fiber to create an optical waveguide, according to one or more examples of the present disclosure;

FIG. 34 is a block diagram of a method of modifying an optical fiber to create an optical waveguide, according to one or more examples of the present disclosure;

FIG. 35 is a block diagram of a method of modifying an optical fiber to create an optical waveguide, according to one or more examples of the present disclosure;

FIG. 36 is a block diagram of aircraft production and service methodology; and

Figure 37:
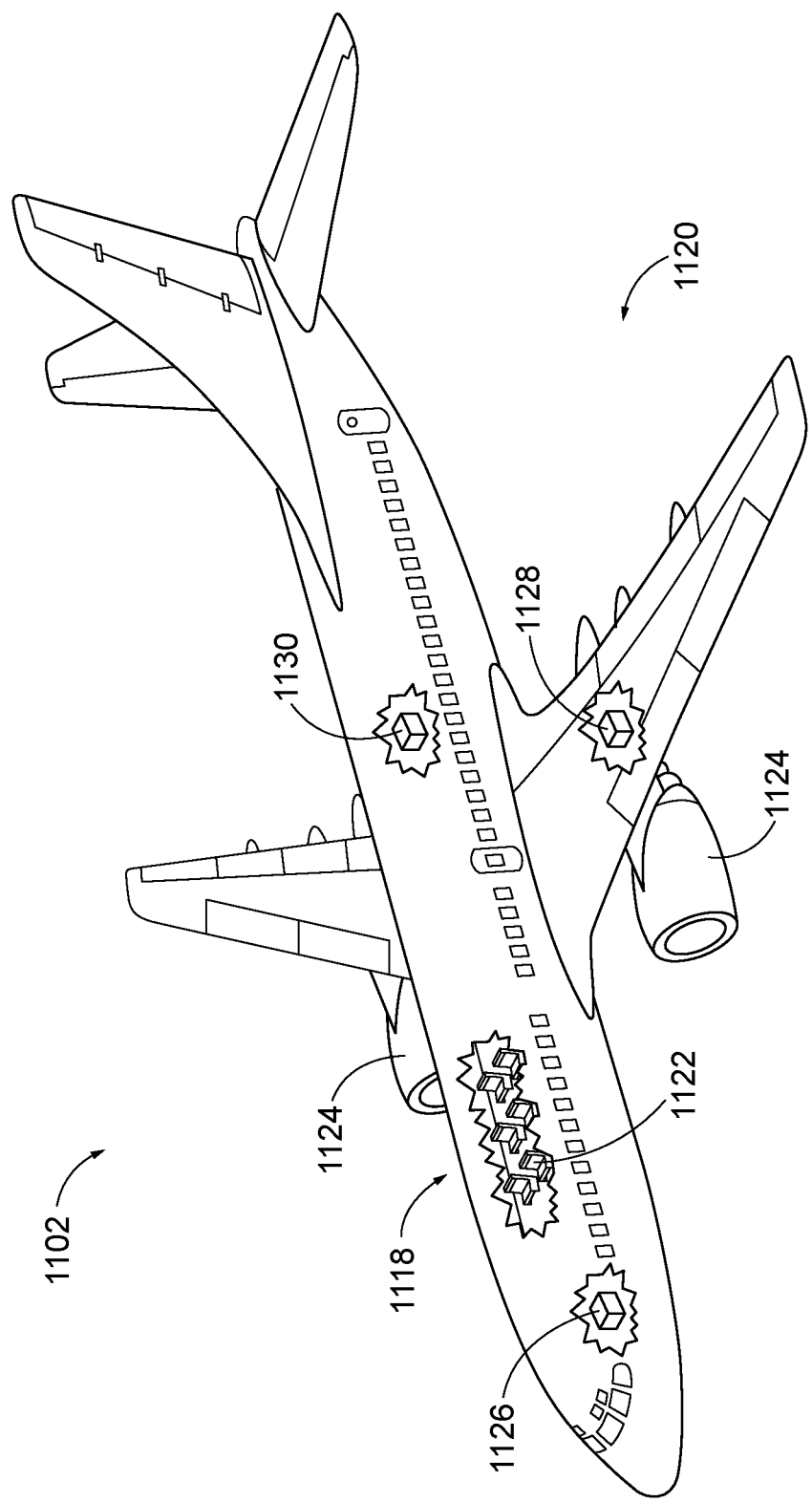

FIG. 37 is a schematic illustration of an aircraft.

DESCRIPTION

In FIGS. 1-10, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual imaginary elements may also be shown for clarity. Those skilled in the art will appreciate that some of the features illustrated in FIGS. 1-10 may be combined in various ways without the need to include other features described in FIGS. 1-10, other drawing figures, and/or the accompanying disclosure, even though such combination or combinations are not explicitly illustrated herein. Similarly, additional features not limited to the examples presented, may be combined with some or all of the features shown and described herein.

In FIGS. 32-36, referred to above, the blocks may represent operations and/or portions thereof, and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 32-36 and the accompanying disclosure describing the operations of the methods set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 22-28, system 700 for additively manufacturing object 136 is disclosed. System 700 comprises feedstock-line supply 702, delivery guide 704, and curing mechanism 706. Feedstock-line supply 702 is configured to dispense feedstock line 100. Feedstock line 100 has a feedstock-line length and exterior surface 180, defining interior volume 182 of feedstock line 100. Feedstock line 100 comprises elongate filaments 104, resin 124, and at least one optical modifier 123. Elongate filaments 104 extend along at least a portion of the feedstock-line length. Resin 124 covers elongate filaments 104. At least one optical modifier 123 has outer surface 184, covered by resin 124. At least one optical modifier 123 is interspersed among elongate filaments 104. Delivery guide 704 is movable relative to surface 708 and is configured to receive feedstock line 100 from feedstock-line supply 702 and to deposit feedstock line 100 along print path 705. Curing mechanism 706 is configured to direct electromagnetic radiation 118 at exterior surface 180 of feedstock line 100 after feedstock line 100 is deposited by delivery guide 704 along print path 705, such that when electromagnetic radiation 118 strikes outer surface 184 of at least one optical modifier 123, at least one optical modifier 123 causes electromagnetic radiation 118 to irradiate, in interior volume 182 of feedstock line 100, resin 124 that, due at least in part to elongate filaments 104, is not directly accessible to electromagnetic radiation 118, incident on exterior surface 180 of feedstock line 100. The preceding subject matter of this paragraph characterizes example 1 of the present disclosure.

System 700 therefore may be used to manufacture object 136 from a fiber reinforced composite material that facilitates in situ curing of resin 124. More specifically, inclusion of at least one optical modifier 123 in feedstock line 100 facilitates penetration of electromagnetic radiation 118 into interior volume 182 of feedstock line 100 for irradiation of resin 124, despite regions of resin 124 being in the shadows of elongate filaments 104 cast by the direct (i.e., line-of-sight) application of electromagnetic radiation 118. In other words, even when electromagnetic radiation 118 is shielded from directly reaching all regions of resin 124, at least one optical modifier 123 will redirect electromagnetic radiation 118 to indirectly reach regions of resin 124. As a result, feedstock line 100 may be more easily cured in situ by curing mechanism 706, may be more evenly cured in situ by curing mechanism 706, may be more thoroughly cured in situ by curing mechanism 706, and/or may be more quickly cured in situ by curing mechanism 706.

Elongate filaments 104 additionally or alternatively may be described as reinforcement filaments or fibers, and may be constructed of any suitable material, illustrative and non-exclusive examples of which include (but are not limited to) fibers, carbon fibers, glass fibers, synthetic organic fibers, aramid fibers, natural fibers, wood fibers, boron fibers, silicon-carbide fibers, optical fibers, fiber bundles, fiber tows, fiber weaves, wires, metal wires, conductive wires, and wire bundles. Feedstock line 100 may include a single configuration, or type, of elongate filaments 104 or may include more than one configuration, or type, of elongate filaments 104. In some examples, elongate filaments 104 may individually and collectively extend for the entire, or substantially the entire, feedstock-line length, and thus may be described as continuous elongate filaments or as full-length elongate filaments.

Additionally or alternatively elongate filaments 104 may individually extend for only a portion of the feedstock-line length, and thus may be described as partial-length elongate filaments or non-continuous elongate filaments. Examples of partial-length elongate filaments include (but are not limited to) so-called chopped fibers.

Resin 124 may include any suitable material that is configured to be cured, or hardened, as a result of cross-linking of polymer chains, such as responsive to an application of electromagnetic radiation 118. For example, electromagnetic radiation 118, or curing energy, may comprise one or more of ultraviolet light, visible light, infrared light, x-rays, electron beams, and microwaves, with curing mechanism 706 being a source of such electromagnetic radiation 118, and resin 124 may take the form of one or more of a polymer, a resin, a thermoplastic, a thermoset, a photopolymer, an ultra-violet photopolymer, a visible-light photopolymer, an infrared-light photopolymer, and an x-ray photopolymer. As used herein, a photopolymer is a polymer that is configured to be cured in the presence of light, such as one or more of ultra-violet light, visible-light, infrared-light, and x-rays. However, as discussed, inclusion of at least one optical modifier 123 in feedstock line 100 specifically facilitates the penetration of electromagnetic radiation 118 into the shadows of elongate filaments 104, and thus electromagnetic radiation 118 typically will be of a wavelength that does not penetrate elongate filaments 104, and resin 124 typically will be a photopolymer.

Some examples of system 700 additionally or alternatively may be described as 3-D printers. System 700 also may be described as a fused filament fabrication system, with delivery guide 704 additionally or alternatively being described as a print head or nozzle.

Referring generally to FIG. 1 and particularly to, e.g., FIGS. 11-16, elongate filaments 104 are opaque to electromagnetic radiation 118. The preceding subject matter of this paragraph characterizes example 2 of the present disclosure, wherein example 2 also includes the subject matter according to example 1, above.

Elongate filaments 104 typically will be selected for strength properties and not for light-transmissivity properties. For example, carbon fibers are often used in fiber-reinforced composite structures, and carbon fibers are opaque to ultra-violet and visible light. Accordingly, elongate filaments 104 that are opaque to electromagnetic radiation 118 are well suited for inclusion in feedstock line 100, as at least one optical modifier 123 operatively will redirect electromagnetic radiation 118 into the shadows of elongate filaments 104.

Referring generally to FIGS. 1 and 2 and particularly to, e.g., FIGS. 11-14 and 18-21, at least one optical modifier 123 comprises at least one full-length optical waveguide 102, extending along all of the feedstock-line length. At least one full-length optical waveguide 102 comprises full-length optical core 110. Full-length optical core 110 comprises first full-length-optical-core end face 112, second full-length-optical-core end face 114, opposite first full-length-optical-core end face 112, and full-length peripheral surface 116, extending between first full-length-optical-core end face 112 and second full-length-optical-core end face 114. At least one full-length optical waveguide 102 is configured such that when electromagnetic radiation 118 enters full-length optical core 110 via at least one of first full-length-optical-core end face 112, second full-length-optical-core end face 114, or full-length peripheral surface 116, at least a portion of electromagnetic radiation 118 exits full-length optical core 110 via full-length peripheral surface 116 to irradiate, in interior volume 182 of feedstock line 100, resin 124 that, due at least in part to elongate filaments 104, is not directly accessible to electromagnetic radiation 118, incident on exterior surface 180 of feedstock line 100. The preceding subject matter of this paragraph characterizes example 3 of the present disclosure, wherein example 3 also includes the subject matter according to example 1 or 2, above.

Inclusion of at least one full-length optical waveguide 102 in feedstock line 100 facilitates penetration of electromagnetic radiation 118 into interior volume 182 of feedstock line 100 for irradiation of resin 124, despite regions of resin 124 being in the shadows of elongate filaments 104. More specifically, even when electromagnetic radiation 118 is shielded from directly reaching all regions of resin 124, at least one full-length optical waveguide 102 will receive electromagnetic radiation 118 via one or more of its first full-length-optical-core end face 112, its second full-length-optical-core end face 114, or its full-length peripheral surface 116, and disperse electromagnetic radiation 118 via at least its full-length peripheral surface 116 to indirectly reach regions of resin 124.

Referring generally to FIGS. 1 and 2 and particularly to, e.g., FIGS. 11-14 and 18-21, feedstock line 100 is configured such that when electromagnetic radiation 118 enters interior volume 182 of feedstock line 100 via exterior surface 180 of feedstock line 100, electromagnetic radiation 118 enters at least one full-length optical waveguide 102 via at least one of full-length peripheral surface 116, first full-length-optical-core end face 112, or second full-length-optical-core end face 114. The preceding subject matter of this paragraph characterizes example 4 of the present disclosure, wherein example 4 also includes the subject matter according to example 3, above.

In other words, in some examples of feedstock line 100, at least one full-length optical waveguide 102 is positioned within interior volume 182 of feedstock line 100 such that at least one of full-length peripheral surface 116, first full-length-optical-core end face 112, or second full-length-optical-core end face 114 is within the line of sight of electromagnetic radiation 118 to receive electromagnetic radiation 118 directed to exterior surface 180 of feedstock line 100 by curing mechanism 706 and then disperse electromagnetic radiation 118 into the shadows of elongate filaments 104. For example, at least one of full-length peripheral surface 116, first full-length-optical-core end face 112, or second full-length-optical-core end face 114 may be adjacent to exterior surface 180 of feedstock line 100.

Referring generally to FIG. 2 and particularly to, e.g., FIGS. 11-14 and 18-21, at least one full-length optical waveguide 102 is configured such that when electromagnetic radiation 118 enters first full-length-optical-core end face 112 of full-length optical core 110, an initial portion of electromagnetic radiation 118 exits full-length optical core 110 via full-length peripheral surface 116 and a final portion of electromagnetic radiation 118, remaining in full-length optical core 110 after the initial portion of electromagnetic radiation 118 exits full-length optical core 110, exits full-length optical core 110 via second full-length-optical-core end face 114. The preceding subject matter of this paragraph characterizes example 5 of the present disclosure, wherein example 5 also includes the subject matter according to example 3 or 4, above.

In other words, in some examples of feedstock line 100, if electromagnetic radiation 118 enters first full-length-optical-core end face 112, it will exit both full-length peripheral surface 116 and second full-length-optical-core end face 114, as opposed, for example, to electromagnetic radiation 118 being fully emitted via full-length peripheral surface 116. Accordingly, such full-length optical waveguide 102 is configured to ensure that electromagnetic radiation 118 travels through a substantial portion of full-length optical core 110, effectively leaking electromagnetic radiation 118 along the way and thereby penetrating multiple regions of resin 124 of feedstock line 100.

Referring generally to FIG. 2 and particularly to, e.g., FIGS. 11-14 and 18-21, at least one full-length optical waveguide 102 is configured such that the initial portion of electromagnetic radiation 118, which exits full-length optical core 110 via full-length peripheral surface 116, is greater than or equal to the final portion of electromagnetic radiation 118, which exits full-length optical core 110 via second full-length-optical-core end face 114. The preceding subject matter of this paragraph characterizes example 6 of the present disclosure, wherein example 6 also includes the subject matter according to example 5, above.

In such configurations, it is ensured that a desired amount of electromagnetic radiation 118 exits full-length optical core 110 via full-length peripheral surface 116 to operatively cure resin 124 among elongate filaments 104 within interior volume 182 of feedstock line 100, when feedstock line 100 is utilized by an additive manufacturing system or in an additive manufacturing method.

Referring generally to FIG. 1 and particularly to, e.g., FIGS. 11-14, at least one full-length optical waveguide 102 is at least one of parallel to, generally parallel to, twisted with, woven with, or braided with elongate filaments 104. The preceding subject matter of this paragraph characterizes example 7 of the present disclosure, wherein example 7 also includes the subject matter according to any one of examples 3 to 6, above.

By at least one full-length optical waveguide 102 being generally parallel to elongate filaments 104, the reinforcing properties of elongate filaments 104 within feedstock line 100, and thus within object 136 are not materially affected. By being twisted with, woven with, or braided with elongate filaments 104, at least one full-length optical waveguide 102 is interspersed with elongate filaments 104 so that electromagnetic radiation 118, exiting at least one full-length optical waveguide 102, is delivered to regions of interior volume 182 that are in the shadows of elongated filaments 104.

Referring generally to FIG. 2 and particularly to, e.g., FIGS. 18-20, full-length optical core 110 has a full-length-optical-core refractive index. At least one full-length optical waveguide 102 further comprises full-length-optical-core cladding 154 at least partially covering full-length optical core 110. Full-length-optical-core cladding 154 comprises at least first full-length-optical-core cladding resin 156, having a full-length-optical-core first-cladding-resin refractive index. Full-length-optical-core cladding 154 is non-uniform along at least one full-length optical waveguide 102. The full-length-optical-core refractive index is greater than the full-length-optical-core first-cladding-resin refractive index. The preceding subject matter of this paragraph characterizes example 8 of the present disclosure, wherein example 8 also includes the subject matter according to any one of examples 3 to 7, above.

By full-length-optical-core cladding 154 being non-uniform along the length of the full-length optical waveguide, electromagnetic radiation 118 is permitted to exit full-length optical core 110 via full-length peripheral surface 116. Moreover, by first full-length-optical-core cladding resin 156 having a refractive index that is lower than that of full-length optical core 110, electromagnetic radiation 118, upon entering full-length optical core 110, is trapped within full-length optical core 110 other than the regions where first full-length-optical-core cladding resin 156 is not present. As a result, at least one full-length optical waveguide 102 may be constructed to provide a desired amount of electromagnetic radiation 118, exiting various positions along full-length peripheral surface 116, such as to ensure a desired amount of electromagnetic radiation 118, penetrating the shadows of elongate filaments 104.

Referring generally to FIG. 2 and particularly to, e.g., FIGS. 19 and 20, full-length peripheral surface 116 has full-length-peripheral-surface regions 127, devoid of first full-length-optical-core cladding resin 156. Full-length-optical-core cladding 154 further comprises second full-length-optical-core cladding resin 158, having a full-length-optical-core second-cladding-resin refractive index. Second full-length-optical-core cladding resin 158 covers full-length-peripheral-surface regions 127 of full-length peripheral surface 116. The full-length-optical-core second-cladding-resin refractive index is greater than the full-length-optical-core first-cladding-resin refractive index. The preceding subject matter of this paragraph characterizes example 9 of the present disclosure, wherein example 9 also includes the subject matter according to example 8, above.

By covering full-length-peripheral-surface regions 127 with second full-length-optical-core cladding resin 158, a desired refractive index thereof may be selected to optimize how electromagnetic radiation 118 exits full-length peripheral surface 116. Additionally or alternatively, with full-length-peripheral-surface regions 127 covered with second full-length-optical-core cladding resin 158, the integrity of first full-length-optical-core cladding resin 156 may be ensured, such that it does not peel or break off during storage and handling of feedstock line 100.

Referring generally to FIG. 2 and particularly to, e.g., FIG. 20, second full-length-optical-core cladding resin 158 also covers first full-length-optical-core cladding resin 156. The preceding subject matter of this paragraph characterizes example 10 of the present disclosure, wherein example 10 also includes the subject matter according to example 9, above.

Such full-length optical waveguides may be more easily manufactured, in that full-length optical core 110 with first full-length-optical-core cladding resin 156 simply may be fully coated with second full-length-optical-core cladding resin 158. Additionally or alternatively, the integrity of full-length optical waveguides may be maintained during storage thereof, as well as during construction and storage of feedstock line 100.

Referring generally to FIGS. 1 and 2 and particularly to, e.g., FIGS. 19 and 20, resin 124 has a resin refractive index. The resin refractive index is greater than the full-length-optical-core second-cladding-resin refractive index. The preceding subject matter of this paragraph characterizes example 11 of the present disclosure, wherein example 11 also includes the subject matter according to example 9 or 10, above.

Because second full-length-optical-core cladding resin 158 has a refractive index lower than that of resin 124, electromagnetic radiation 118 will be permitted to exit second full-length-optical-core cladding resin 158 to penetrate and cure resin 124 when feedstock line 100 is used to additively manufacture object 136 by system 700.

Referring generally to FIG. 2 and particularly to, e.g., FIG. 21, full-length peripheral surface 116 has a surface roughness that is selected such that when electromagnetic radiation 118 enters full-length optical core 110 via at least one of first full-length-optical-core end face 112, second full-length-optical-core end face 114, or full-length peripheral surface 116, at least a portion of electromagnetic radiation 118 exits full-length optical core 110 via full-length peripheral surface 116 to irradiate, in interior volume 182 of feedstock line 100, resin 124 that, due at least in part to elongate filaments 104, is not directly accessible to electromagnetic radiation 118, incident on exterior surface 180 of feedstock line 100. The preceding subject matter of this paragraph characterizes example 12 of the present disclosure, wherein example 12 also includes the subject matter according to any one of examples 3 to 7, above.

Rather than relying on refractive-index properties of a cladding to ensure desired dispersal of electromagnetic radiation 118 from full-length optical core 110 via full-length peripheral surface 116, the surface roughness of full-length peripheral surface 116 is selected such that electromagnetic radiation 118 exits full-length optical core 110 at desired amounts along the length of full-length peripheral surface 116. For example, the surface roughness may create regions of internal reflection of electromagnetic radiation 118 within full-length optical core 110 and may create regions where electromagnetic radiation 118 is permitted to escape full-length optical core 110.

Referring generally to FIG. 2 and particularly to, e.g., FIG. 21, at least one full-length optical waveguide 102 is devoid of any cladding that covers full-length optical core 110. The preceding subject matter of this paragraph characterizes example 13 of the present disclosure, wherein example 13 also includes the subject matter according to example 12, above.

Full-length optical waveguides without any cladding may be less expensive to manufacture than full-length optical waveguides with cladding. Additionally, the difference of refractive indexes between a cladding and resin 124 need not be taken into account when selecting resin 124 for feedstock line 100. Referring generally to FIG. 1 and particularly to, e.g., FIGS. 11-14, at least one full-length optical waveguide 102 is a plurality of full-length optical waveguides, interspersed among elongate filaments 104. The preceding subject matter of this paragraph characterizes example 14 of the present disclosure, wherein example 14 also includes the subject matter according to any one of examples 3 to 13, above.

By including a plurality of full-length optical waveguides, interspersed among elongate filaments 104, such as among a bundle, or tow, of elongate filaments, a desired penetration of electromagnetic radiation 118 into the shadows of elongate filaments 104 is be ensured.

Referring generally to FIG. 1 and particularly to, e.g., FIGS. 11-14, elongate filaments 104 are at least one of twisted with, woven with, or braided with the plurality of full-length optical waveguides. The preceding subject matter of this paragraph characterizes example 15 of the present disclosure, wherein example 15 also includes the subject matter according to example 14, above.

By being twisted with, woven with, or braided with elongate filaments 104, the plurality of full-length optical waveguides is interspersed with elongate filaments 104 so that electromagnetic radiation 118, exiting the full-length optical waveguides, is delivered to regions of interior volume 182 that are in the shadows of elongated filaments 104.

Referring generally to FIGS. 1 and 4 and particularly to, e.g., FIG. 23, feedstock-line supply 702 comprises dry-tow full-length-optical-waveguide feedstock-line subsystem 200 for creating feedstock line 100. Dry-tow full-length-optical-waveguide feedstock-line subsystem 200 comprises filament supply 202, filament separator 210, full-length-optical-waveguide supply 204, combiner 212, and resin supply 206. Filament supply 202 is configured to dispense precursor tow 208, comprising elongate filaments 104. Filament separator 210 is configured to separate precursor tow 208, dispensed from filament supply 202, into individual ones of elongate filaments 104 or into subsets 214 of elongate filaments 104. Each of subsets 214 comprises a plurality of elongate filaments 104. Full-length-optical-waveguide supply 204 is configured to dispense at least one full-length optical waveguide 102. Combiner 212 is configured to combine the individual ones of elongate filaments 104, originating from filament separator 210, and at least one full-length optical waveguide 102, dispensed by full-length-optical-waveguide supply 204, or subsets 214 of elongate filaments 104, originating from filament separator 210, and at least one full-length optical waveguide 102, dispensed by full-length-optical-waveguide supply 204, into derivative full-length-optical-waveguide tow 209 so that each of elongate filaments 104 and at least one full-length optical waveguide 102 extend along all of the feedstock-line length and at least one full-length optical waveguide 102 is interspersed among elongate filaments 104. Resin supply 206 is configured to provide resin 124 to be applied to at least one of (i) precursor tow 208, dispensed from filament supply 202, (ii) the individual ones of elongate filaments 104 or subsets 214 of elongate filaments 104, originating from filament separator 210, (iii) at least one full-length optical waveguide 102, dispensed from full-length-optical-waveguide supply 204, or (iv) derivative full-length-optical-waveguide tow 209, originating from combiner 212, such that elongate filaments 104 and at least one full-length optical waveguide 102 in derivative full-length-optical-waveguide tow 209 are covered with resin 124. The preceding subject matter of this paragraph characterizes example 16 of the present disclosure, wherein example 16 also includes the subject matter according to any one of examples 3 to 15, above.

Creating feedstock line 100 by system 700, as opposed to, for example, merely feeding feedstock line 100 from a pre-made supply of feedstock line 100, creates a versatile additive manufacturing system, in which the user may customize feedstock line 100 with desired properties. Moreover, creating feedstock line 100 from precursor tow 208 permits the use of off-the-shelf reinforcement fiber tows. Filament separator 210 separates precursor tow 208 into individual ones of elongate filaments 104 or into subsets 214 of elongate filaments 104, so that at least one full-length optical waveguide 102 may be operatively interspersed with elongate filaments 104. Combiner 212 then combines elongate filaments 104 and at least one full-length optical waveguide 102 into derivative full-length-optical-waveguide tow 209 to ultimately become feedstock line 100 with resin 124. Resin supply 206 dispenses resin 124 at any suitable location as feedstock line 100 is being created, including one or more of (i) at precursor tow 208 before it is separated into individual ones of elongate filaments 104 or into subsets 214 of elongate filaments 104, (ii) at elongate filaments 104 that have been separated from precursor tow 208, (iii) at at least one full-length optical waveguide 102 before it is combined with elongate filaments 104, or (iv) at derivative full-length-optical-waveguide tow 209 after at least one full-length optical waveguide 102 has been combined with elongate filaments 104.

Precursor tow 208 may take any suitable form depending on the desired properties of feedstock line 100. As mentioned, precursor tow 208 may be (but is not required to be) an off-the-shelf precursor tow, with such examples including tows having 1000, 3000, 6000, 12000, 24000, or 48000 continuous individual fibers within the tow, but other examples also may be used.

Filament separator 210 may take any suitable configuration, such that it is configured to operatively separate precursor tow 208 into individual ones of elongate filaments 104 or subsets 214 thereof. For example, filament separator 210 may comprise at least one of a knife, an air knife, a comb, a mesh, a screen, a series of polished idlers, and other mechanisms known in the art.

Combiner 212 may take any suitable configuration, such that it is configured to operatively combine elongate filaments 104 with at least one full-length optical waveguide 102, such that at least one full-length optical waveguide 102 becomes interspersed among elongate filaments 104. For example, combiner 212 may at least one of twist, weave, braid, or otherwise bundle elongate filaments 104 together with at least one full-length optical waveguide 102. Combiner 212 also may include a fixator, such as a mesh or screen, through which elongate filaments 104 and full-length optical waveguide(s) extend, and which prevents the twisting, weaving, braiding, or bundling from propagating upstream of combiner 212.

Resin supply 206 may take any suitable configuration, such that it is configured to operatively dispense and apply resin 124 at an operative location. For example, resin supply 206 may be configured to spray or mist resin 124. Additionally or alternatively, resin supply 206 may include a reservoir or bath of resin 124, through which is pulled at least one of precursor tow 208, individual ones of elongate filaments 104, subsets 214 of elongate filaments 104, full-length optical waveguide(s), or derivative full-length-optical-waveguide tow 209.

In some examples, dry-tow full-length-optical-waveguide feedstock-line subsystem 200 may further comprise chamber 224 between filament separator 210 and combiner 212, and through which individual ones of elongate filaments 104 or subsets 214 of elongate filaments 104 pass as feedstock line 100 is being created. In some such examples, at least one full-length optical waveguide 102 also extends through chamber 224. Moreover, in some such examples, resin 124 is applied to at least elongate filaments 104, and in some examples, also to at least one full-length optical waveguide 102, in chamber 224.

Referring generally to FIG. 4 and particularly to, e.g., FIG. 23, filament separator 210 is configured to impart a first electrical charge to elongate filaments 104 as precursor tow 208 is separated into the individual ones of elongate filaments 104 or into subsets 214 of elongate filaments 104. Resin supply 206 is configured to impart a second electrical charge to resin 124 when resin 124 is applied to at least one of (i) the individual ones of elongate filaments 104 or subsets 214 of elongate filaments 104 and originating from filament separator 210, or (ii) derivative full-length-optical-waveguide tow 209, originating from combiner 212, such that elongate filaments 104 and at least one full-length optical waveguide 102 in derivative full-length-optical-waveguide tow 209 are covered with resin 124. The second electrical charge and the first electrical charge have opposite signs. The preceding subject matter of this paragraph characterizes example 17 of the present disclosure, wherein example 17 also includes the subject matter according to example 16, above.

By imparting a first electrical charge to elongate filaments 104 and by imparting a second opposite charge to resin 124 as it is applied to elongate filaments 104, resin 124 will be electrostatically attracted to elongate filaments 104, thereby facilitating wetting of elongate filaments 104 with resin 124.

Referring generally to FIG. 4 and particularly to, e.g., FIG. 23, combiner 212 is configured to at least one of twist, weave, or braid the individual ones of elongate filaments 104, originating from filament separator 210, and at least one full-length optical waveguide 102, dispensed by full-length-optical-waveguide supply 204, or subsets 214 of elongate filaments 104, originating from filament separator 210, and at least one full-length optical waveguide 102, dispensed by full-length-optical-waveguide supply 204, into derivative full-length-optical-waveguide tow 209. The preceding subject matter of this paragraph characterizes example 18 of the present disclosure, wherein example 18 also includes the subject matter according to example 16 or 17, above.

As discussed, by being twisted with, woven with, or braided with elongate filaments 104, at least one full-length optical waveguide 102 is interspersed with elongate filaments 104 so that electromagnetic radiation 118, exiting at least one full-length optical waveguide 102, is delivered to regions of interior volume 182 that are in the shadows of elongate filaments 104 when feedstock line 100 is used by system 700 to additively manufacture object 136.

Referring generally to FIGS. 1 and 5 and particularly to, e.g., FIG. 24, feedstock-line supply 702 comprises prepreg-tow full-length-optical-waveguide feedstock-line subsystem 900 for creating feedstock line 100. Prepreg-tow full-length-optical-waveguide feedstock-line subsystem 900 comprises prepreg-tow supply 902, prepreg-tow separator 910, full-length-optical-waveguide supply 204, combiner 212, and at least one heater 220. Prepreg-tow supply 902 is configured to dispense precursor prepreg tow 908 that comprises elongate filaments 104 and resin 124, covering elongate filaments 104. Prepreg-tow separator 910 is configured to separate precursor prepreg tow 908, dispensed from prepreg-tow supply 902, into individual ones of elongate filaments 104, at least partially covered with resin 124, or into subsets 214 of elongate filaments 104, at least partially covered with resin 124. Each of subsets 214 comprises a plurality of elongate filaments 104. Full-length-optical-waveguide supply 204 is configured to dispense at least one full-length optical waveguide 102. Combiner 212 is configured to combine the individual ones of elongate filaments 104, at least partially covered with resin 124, and at least one full-length optical waveguide 102, dispensed by full-length-optical-waveguide supply 204, or subsets 214 of elongate filaments 104, at least partially covered with resin 124, and at least one full-length optical waveguide 102, dispensed by full-length-optical-waveguide supply 204, into derivative full-length-optical-waveguide prepreg tow 909 so that each of elongate filaments 104 and at least one full-length optical waveguide 102 extend along all of feedstock-line length and at least one full-length optical waveguide 102 is interspersed among elongate filaments 104. At least one heater 220 is configured to heat at least one of (i) resin 124 in precursor prepreg tow 908, dispensed from prepreg-tow supply 902, to a first threshold temperature to facilitate separation of precursor prepreg tow 908 by prepreg-tow separator 910 into the individual ones of elongate filaments 104 or into subsets 214 of elongate filaments 104, (ii) resin 124 that at least partially covers the individual ones of elongate filaments 104 or subsets 214 of elongate filaments 104, originating from prepreg-tow separator 910, to a second threshold temperature to cause wet-out of at least one full-length optical waveguide 102 and individual ones of the elongate filaments 104 or of at least one full-length optical waveguide 102 and subsets 214 of elongate filaments 104 in derivative full-length-optical-waveguide prepreg tow 909 by resin 124, or (iii) resin 124 that at least partially covers elongate filaments 104 in derivative full-length-optical-waveguide prepreg tow 909, originating from combiner 212, to a third threshold temperature to cause wet-out of at least one full-length optical waveguide 102 and elongate filaments 104 in derivative full-length-optical-waveguide prepreg tow 909 by resin 124. The preceding subject matter of this paragraph characterizes example 19 of the present disclosure, wherein example 19 also includes the subject matter according to any one of examples 3 to 15, above.

As discussed, creating feedstock line 100 by system 700, as opposed to, for example, merely feeding feedstock line 100 from a pre-made supply of feedstock line 100, creates a versatile additive manufacturing system, in which the user may customize feedstock line 100 with desired properties. Creating feedstock line 100 from precursor prepreg tow 908 permits the use of off-the-shelf prepreg reinforcement fiber tows. Prepreg-tow separator 910 separates precursor prepreg tow 908 into individual ones of elongate filaments 104 that are at least partially covered with resin 124 or into subsets 214 of elongate filaments 104 that are at least partially covered with resin 124, so that at least one full-length optical waveguide 102 may be operatively interspersed with elongate filaments 104. Combiner 212 then combines elongate filaments 104 and at least one full-length optical waveguide 102, together with resin 124, into derivative full-length-optical-waveguide prepreg tow 909 to ultimately become feedstock line 100. At least one heater 220 heats resin 124 to facilitate one or both of separation of precursor prepreg tow 908 or wetting-out of elongate filaments 104 and at least one full-length optical waveguide 102 in derivative full-length-optical-waveguide prepreg tow 909.

As discussed, combiner 212 may take any suitable configuration, such that it is configured to operatively combine elongate filaments 104 with at least one full-length optical waveguide 102, such that at least one full-length optical waveguide 102 becomes interspersed among elongate filaments 104. When combiner 212 is a component of prepreg-tow-full-length-optical-waveguide feedstock-line subsystem 900, combiner 212 also combines elongate filaments 104 with at least one full-length optical waveguide 102, such that elongate filaments 104 and at least one full-length optical waveguide 102 are at least partially covered by resin 124 in derivative full-length-optical-waveguide prepreg tow 909.

Heater 220 may take any suitable configuration, such that it is configured to heat resin 124 at an operative location as feedstock line 100 is being created. In some examples, heater 220 may utilize a heated fluid stream, such as a heated gas stream to heat resin 124. Additionally or alternatively, in some examples, heater 220 may comprise a resistive, or other type of, heater to heat resin 124, such as it passes through prepreg-tow separator 910 or combiner 212, such as with prepreg-tow separator 910 comprising heater 220 or combiner 212 comprising heater 220, respectively.

In some examples, two or more of the first threshold temperature, the second threshold temperature, or the third threshold temperature may be the same temperature. In other examples, two or more of the first threshold temperature, the second threshold temperature, or the third threshold temperature may be different temperatures.

Referring generally to FIG. 5 and particularly to, e.g., FIG. 24, prepreg-tow full-length-optical-waveguide feedstock-line subsystem 900 further comprises additional-resin supply 906, configured to provide additional resin 125 to be applied to at least one of (i) precursor prepreg tow 908, dispensed from prepreg-tow supply 902, (ii) the individual ones of elongate filaments 104, at least partially covered with resin 124, or subsets 214 of elongate filaments 104, at least partially covered with resin 124, originating from prepreg-tow separator 910, (iii) at least one full-length optical waveguide 102, dispensed from full-length-optical-waveguide supply 204, or (iv) derivative full-length-optical-waveguide prepreg tow 909, originating from combiner 212, such that elongate filaments 104 and at least one full-length optical waveguide 102 in derivative full-length-optical-waveguide prepreg tow 909 are covered with resin 124 and additional resin 125. The preceding subject matter of this paragraph characterizes example 20 of the present disclosure, wherein example 20 also includes the subject matter according to example 19, above.

By applying additional resin 125 to elongate filaments 104 and full-length optical waveguide(s), full wet-out of elongate filaments 104 and full-length optical waveguide(s) may be achieved in feedstock line 100.

Additional-resin supply 906 may take any suitable configuration, such that it is configured to operatively dispense and apply additional resin 125 at an operative location. For example, additional-resin supply 906 may be configured to spray or mist additional resin 125. Additionally or alternatively, additional-resin supply 906 may include a reservoir or bath of additional resin 125, through which is pulled at least one of precursor prepreg tow 908, individual ones of elongate filaments 104, subsets 214 of elongate filaments 104, full-length optical waveguide(s), or derivative full-length-optical-waveguide prepreg tow 909.

In some examples, additional resin 125 may be the same as resin 124. In other examples, additional resin 125 may be different from resin 124.

In some examples, prepreg-tow full-length-optical-waveguide feedstock-line subsystem 900 may further comprise chamber 224 between prepreg-tow separator 910 and combiner 212, and through which individual ones of elongate filaments 104 or subsets 214 of elongate filaments 104 pass as feedstock line 100 is being created. In some such examples, at least one full-length optical waveguide 102 also extends through chamber 224. Moreover, in some such examples, additional resin 125 is applied to at least elongate filaments 104, and in some examples, also to at least one full-length optical waveguide 102, in chamber 224.

Referring generally to FIG. 5 and particularly to, e.g., FIG. 24, prepreg-tow separator 910 is configured to impart a first electrical charge to elongate filaments 104 or to resin 124 as precursor prepreg tow 908 is separated into the individual ones of elongate filaments 104, at least partially covered with resin 124, or into subsets 214 of elongate filaments 104, at least partially covered with resin 124. Additional-resin supply 906 is configured to impart a second electrical charge to additional resin 125 when additional resin 125 is applied to at least one of (i) the individual ones of elongate filaments 104, at least partially covered with resin 124, or subsets 214 of elongate filaments 104, at least partially covered with resin 124, and originating from prepreg-tow separator 910, or (ii) derivative full-length-optical-waveguide prepreg tow 909, originating from combiner 212, such that elongate filaments 104 and at least one full-length optical waveguide 102 in derivative full-length-optical-waveguide prepreg tow 909 are covered with resin 124 and additional resin 125. The second electrical charge and the first electrical charge have opposite signs. The preceding subject matter of this paragraph characterizes example 21 of the present disclosure, wherein example 21 also includes the subject matter according to example 20, above.

By imparting a first electrical charge to elongate filaments 104 or resin 124 and by imparting a second opposite charge to additional resin 125 as it is applied to elongate filaments 104 and resin 124, additional resin 125 will be electrostatically attracted to elongate filaments 104.

Referring generally to FIG. 5 and particularly to, e.g., FIG. 24, combiner 212 is configured to at least one of twist, weave, or braid the individual ones of elongate filaments 104, originating from prepreg-tow separator 910, and at least one full-length optical waveguide 102, dispensed by full-length-optical-waveguide supply 204, or subsets 214 of elongate filaments 104, originating from prepreg-tow separator 910, and at least one full-length optical waveguide 102, dispensed by full-length-optical-waveguide supply 204, into derivative full-length-optical-waveguide prepreg tow 909. The preceding subject matter of this paragraph characterizes example 22 of the present disclosure, wherein example 22 also includes the subject matter according to example 20 or 21, above.

As discussed, by being twisted with, woven with, or braided with elongate filaments 104, at least one full-length optical waveguide 102 is interspersed with elongate filaments 104 so that electromagnetic radiation 118, exiting at least one full-length optical waveguide 102, is delivered to regions of interior volume 182 that are in the shadows of elongate filaments 104 when feedstock line 100 is used by system 700 to additively manufacture object 136.

Referring generally to FIGS. 1 and 3 and particularly to, e.g., FIGS. 12, 14, 16, and 18-21, at least one optical modifier 123 comprises partial-length optical waveguides 122. Each of partial-length optical waveguides 122 comprises partial-length optical core 138. Partial-length optical core 138 of each of partial-length optical waveguides 122 comprises first partial-length-optical-core end face 140, second partial-length-optical-core end face 142, opposite first partial-length-optical-core end face 140, and partial-length peripheral surface 144, extending between first partial-length-optical-core end face 140 and second partial-length-optical-core end face 142. Each of partial-length optical waveguides 122 is configured such that when electromagnetic radiation 118 enters partial-length optical core 138 via at least one of first partial-length-optical-core end face 140, second partial-length-optical-core end face 142, or partial-length peripheral surface 144, at least a portion of electromagnetic radiation 118 exits partial-length optical core 138 via partial-length peripheral surface 144 to irradiate, in interior volume 182 of feedstock line 100, resin 124 that, due at least in part to elongate filaments 104, is not directly accessible to electromagnetic radiation 118, incident on exterior surface 180 of feedstock line 100. The preceding subject matter of this paragraph characterizes example 23 of the present disclosure, wherein example 23 also includes the subject matter according to any one of examples 1 to 15, above.

Partial-length optical waveguides 122 may be cost effective to create, such as according to the various methods disclosed herein. Moreover, by being interspersed among elongate filaments 104, partial-length optical waveguides 122 may directly receive electromagnetic radiation 118 and deliver electromagnetic radiation 118 into the shadows of elongate filaments 104.

Partial-length optical waveguides 122 may be similar in construction to full-length optical waveguides disclosed herein but shorter in length.

Referring generally to FIGS. 1 and 3 and particularly to, e.g., FIGS. 12, 14, 16, and 18-21, feedstock line 100 is configured such that when electromagnetic radiation 118 enters interior volume 182 of feedstock line 100 via exterior surface 180 of feedstock line 100, electromagnetic radiation 118 enters at least one of partial-length optical waveguides 122 via at least one of partial-length peripheral surface 144, first partial-length-optical-core end face 140, or second partial-length-optical-core end face 142 of at least one of partial-length optical waveguides 122. The preceding subject matter of this paragraph characterizes example 24 of the present disclosure, wherein example 24 also includes the subject matter according to example 23, above.

In other words, in some examples of feedstock line 100, partial-length optical waveguides 122 are positioned within interior volume 182 of feedstock line 100 such that at least one of partial-length peripheral surface 144, first partial-length-optical-core end face 140, or second partial-length-optical-core end face 142 is within the line of sight of electromagnetic radiation 118 to receive electromagnetic radiation 118 directed to exterior surface 180 of feedstock line 100 by curing mechanism 706 and then disperse, or scatter, electromagnetic radiation 118 within interior volume 182.

Referring generally to FIG. 3 and particularly to, e.g., FIGS. 18-20, partial-length optical core 138 has a partial-length-optical-core refractive index. Each of partial-length optical waveguides 122 further comprises partial-length-optical-core cladding 160, at least partially covering partial-length optical core 138. Partial-length-optical-core cladding 160 comprises at least first partial-length-optical-core cladding resin 162, having a partial-length-optical-core first-cladding-resin refractive index. Partial-length-optical-core cladding 160 is non-uniform along each of partial-length optical waveguides 122. The partial-length-optical-core refractive index is greater than the partial-length-optical-core first-cladding-resin refractive index. The preceding subject matter of this paragraph characterizes example 25 of the present disclosure, wherein example 25 also includes the subject matter according to example 23 or 24, above.

By being non-uniform along the length of partial-length optical waveguides 122, electromagnetic radiation 118 is permitted to exit partial-length optical core 138 via partial-length peripheral surface 144. Moreover, by first partial-length-optical-core cladding resin 162 having a refractive index that is lower than that of partial-length optical core 138, electromagnetic radiation 118, upon entering partial-length optical core 138, is trapped within partial-length optical core 138 other than the regions where first partial-length-optical-core cladding resin 162 is not present. As a result, partial-length optical waveguides 122 may be constructed to provide a desired amount of electromagnetic radiation 118, exiting various positions along partial-length peripheral surface 144, such as to ensure a desired amount of electromagnetic radiation 118, penetrating the shadows of elongate filaments 104.

Referring generally to FIG. 3 and particularly to, e.g., FIGS. 19 and 20, partial-length peripheral surface 144 of partial-length optical core 138 of each of partial-length optical waveguides 122 has partial-length-peripheral-surface regions 129, devoid of first partial-length-optical-core cladding resin 162. Partial-length-optical-core cladding 160 further comprises second partial-length-optical-core cladding resin 164, having a partial-length-optical-core second-cladding-resin refractive index. Second partial-length-optical-core cladding resin 164 covers partial-length-peripheral-surface regions 129 of partial-length peripheral surface 144. The partial-length-optical-core second-cladding-resin refractive index is greater than the partial-length-optical-core first-cladding-resin refractive index. The preceding subject matter of this paragraph characterizes example 26 of the present disclosure, wherein example 26 also includes the subject matter according to example 25, above.

By covering partial-length-peripheral-surface regions 129 with second partial-length-optical-core cladding resin 164, a desired refractive index thereof may be selected to optimize how electromagnetic radiation 118 exits partial-length peripheral surface 144. Additionally or alternatively, with partial-length-peripheral-surface regions 129 covered with second partial-length-optical-core cladding resin 164, the integrity of first partial-length-optical-core cladding resin 162 may be ensured, such that it does not peel or break off during storage of partial-length optical waveguides 122 or during construction and use of feedstock line 100.

Referring generally to FIG. 3 and particularly to, e.g., FIG. 20, second partial-length-optical-core cladding resin 164 also covers first partial-length-optical-core cladding resin 162. The preceding subject matter of this paragraph characterizes example 27 of the present disclosure, wherein example 27 also includes the subject matter according to example 26, above.

Such partial-length optical waveguides 122 may be more easily manufactured, in that partial-length optical core 138 with first partial-length-optical-core cladding resin 162 simply may be fully coated with second partial-length-optical-core cladding resin 164. Additionally or alternatively, the integrity of partial-length optical waveguides 122 may be maintained during storage thereof and during construction and use of feedstock line 100.

Referring generally to FIGS. 1 and 3 and particularly to, e.g., FIGS. 19 and 20, resin 124 has a resin refractive index. The resin refractive index is greater than the partial-length-optical-core second-cladding-resin refractive index. The preceding subject matter of this paragraph characterizes example 28 of the present disclosure, wherein example 28 also includes the subject matter according to example 26 or 27, above.

Because second partial-length-optical-core cladding resin 164 has a refractive index lower than that of resin 124, electromagnetic radiation 118 will be permitted to exit second partial-length-optical-core cladding resin 164 to penetrate and cure resin 124 when feedstock line 100 is being used to additively manufacture object 136 by system 700.

Referring generally to FIG. 3 and particularly to, e.g., FIG. 21, partial-length peripheral surface 144 of partial-length optical core 138 of each of partial-length optical waveguides 122 has a surface roughness that is selected such that when electromagnetic radiation 118 enters partial-length optical core 138 via at least one of first partial-length-optical-core end face 140, second partial-length-optical-core end face 142, or partial-length peripheral surface 144, at least a portion of electromagnetic radiation 118 exits partial-length optical core 138 via partial-length peripheral surface 144 to irradiate, in interior volume 182 of feedstock line 100, resin 124 that, due at least in part to elongate filaments 104, is not directly accessible to electromagnetic radiation 118, incident on exterior surface 180 of feedstock line 100. The preceding subject matter of this paragraph characterizes example 29 of the present disclosure, wherein example 29 also includes the subject matter according to example 23 or 24, above. Rather than relying on refractive-index properties of a cladding to ensure desired dispersal of electromagnetic radiation 118 from partial-length optical core 138 via partial-length peripheral surface 144, the surface roughness of partial-length peripheral surface 144 is selected such that electromagnetic radiation 118 exits partial-length optical core 138 at desired amounts along the length of partial-length peripheral surface 144. For example, the surface roughness may create regions of internal reflection of electromagnetic radiation 118 within partial-length optical core 138 and may create regions where electromagnetic radiation 118 is permitted to escape partial-length optical core 138.

Referring generally to FIG. 3 and particularly to, e.g., FIG. 21, each of partial-length optical waveguides 122 is devoid of any cladding that covers partial-length optical core 138. The preceding subject matter of this paragraph characterizes example 30 of the present disclosure, wherein example 30 also includes the subject matter according to example 29, above.

Partial-length optical waveguides 122 without any cladding may be less expensive to manufacture than partial-length optical waveguides 122 with cladding. Additionally, the difference of refractive indexes between a cladding and resin 124 need not be taken into account when selecting resin 124 for feedstock line 100.

Referring generally to FIGS. 1 and 6 and particularly to, e.g., FIG. 25, feedstock-line supply comprises dry-tow partial-length-optical-waveguide feedstock-line subsystem 1000 for creating feedstock line 100. Dry-tow partial-length-optical-waveguide feedstock-line subsystem 1000 comprises filament supply 202, filament separator 210, partial-length-optical-waveguide supply 1016, combiner 212, and resin supply 206. Filament supply 202 is configured to dispense precursor tow 208, comprising elongate filaments 104. Filament separator 210 is configured to separate precursor tow 208, dispensed from filament supply 202, into individual ones of elongate filaments 104 or into subsets 214 of elongate filaments 104. Each of subsets 214 comprises a plurality of elongate filaments 104. Partial-length-optical-waveguide supply 1016 is configured to dispense partial-length optical waveguides 122 to be applied to individual ones of elongate filaments 104 or subsets 214 of elongate filaments 104, originating from filament separator 210. Combiner 212 is configured to combine the individual ones of elongate filaments 104, originating from filament separator 210, and partial-length optical waveguides 122, dispensed by partial-length-optical-waveguide supply 1016, or subsets 214 of elongate filaments 104, originating from filament separator 210, and partial-length optical waveguides 122, dispensed by partial-length-optical-waveguide supply 1016, into derivative partial-length-optical-waveguide tow 1009 so that partial-length optical waveguides 122 are interspersed among elongate filaments 104. Resin supply 206 is configured to provide resin 124 to be applied to at least one of (i) precursor tow 208, dispensed from filament supply 202, (ii) the individual ones of elongate filaments 104 or subsets 214 of elongate filaments 104, originating from filament separator 210, (iii) partial-length optical waveguides 122, dispensed from partial-length-optical-waveguide supply 1016, or (iv) derivative partiallength-optical-waveguide tow 1009, originating from combiner 212, such that elongate filaments 104 and partial-length optical waveguides 122 in derivative partial-length-optical-waveguide tow 1009 are covered with resin 124. The preceding subject matter of this paragraph characterizes example 31 of the present disclosure, wherein example 31 also includes the subject matter according to any one of examples 23 to 30, above.

As discussed, creating feedstock line 100 by system 700, as opposed to, for example, merely feeding feedstock line 100 from a pre-made supply of feedstock line 100, creates a versatile additive manufacturing system, in which the user may customize feedstock line 100 with desired properties. As also discussed, creating feedstock line 100 from precursor tow 208 permits the use of off-the-shelf reinforcement fiber tows. Filament separator 210 separates precursor tow 208 into individual ones of elongate filaments 104 or into subsets 214 of elongate filaments 104, so that partial-length optical waveguides 122 may be operatively interspersed with elongate filaments 104. Combiner 212 then combines elongate filaments 104 and partial-length optical waveguides 122 into derivative partial-length-optical-waveguide tow 1009 to ultimately become feedstock line 100 with resin 124. Resin supply 206 dispenses resin 124 at any suitable location as feedstock line 100 is being created, including one or more of (i) at precursor tow 208 before it is separated into individual ones of elongate filaments 104 or into subsets 214 of elongate filaments 104, (ii) at elongate filaments 104 that have been separated from the precursor tow 208, (iii) at or with partial-length optical waveguides 122 before they are combined with elongate filaments 104, or (iv) at derivative partial-length-optical-waveguide tow 1009 after partial-length optical waveguides 122 have been combined with elongate filaments 104.

Combiner 212 may take any suitable configuration, such that it is configured to operatively combine elongate filaments 104 with partial-length optical waveguides 122, such that partial-length optical waveguides 122 become interspersed among elongate filaments 104. For example, combiner 212 may at least one of twist, weave, braid, or otherwise bundle elongate filaments 104 together with partial-length optical waveguides 122. Combiner 212 also may include a fixator, such as a mesh or screen, through which elongate filaments 104 extend, and which prevents the twisting, weaving, braiding, or bundling from propagating upstream of combiner 212.

As discussed, resin supply 206 may take any suitable configuration, such that it is configured to operatively dispense and apply resin 124 at an operative location. For example, resin supply 206 may be configured to spray or mist resin 124. Additionally or alternatively, resin supply 206 may include a reservoir or bath of resin 124, through which is pulled at least one of precursor tow 208, individual ones of elongate filaments 104, subsets 214 of elongate filaments 104, or derivative partial-length-optical-waveguide tow 1009.

In some examples, dry-tow partial-length-optical-waveguide feedstock-line subsystem 1000 may further comprise chamber 224 between filament separator 210 and combiner 212, and through which individual ones of elongate filaments 104 or subsets 214 of elongate filaments 104 pass as feedstock line 100 is being created. Moreover, in some such examples, resin 124 is applied to at least elongate filaments 104, and in some examples, also to partial-length optical waveguides 122, in chamber 224. Referring generally to FIG. 6 and particularly to, e.g., FIG. 25, partial-length-optical-waveguide supply 1016 and resin supply 206 together form combined partial-length-optical-waveguide resin supply 222, configured to dispense partial-length optical waveguides 122 together with resin 124. The preceding subject matter of this paragraph characterizes example 32 of the present disclosure, wherein example 32 also includes the subject matter according to example 31, above.

That is, combined partial-length-optical-waveguide resin supply 222 may dispense partial-length optical waveguides 122 in a volume of resin 124. Stated differently, partial-length optical waveguides 122 may be suspended within resin 124. By using combined partial-length-optical-waveguide resin supply 222, even dispersion of partial-length optical waveguides 122 may be ensured, and dry-tow partial-length-optical-waveguide feedstock-line subsystem 1000 may be constructed at a reduced cost. For example, combined partial-length-optical-waveguide resin supply 222 may spray or mist resin 124 and partial-length optical waveguides 122 together to apply them to elongate filaments 104, or elongate filaments 104 may be pulled through a bath of resin 124 with partial-length optical waveguides 122 suspended therein.

Referring generally to FIG. 6 and particularly to, e.g., FIG. 25, filament separator 210 is configured to impart a first electrical charge to elongate filaments 104 as precursor tow 208 is separated into the individual ones of elongate filaments 104 or into subsets 214 of elongate filaments 104. Resin supply 206 is configured to impart a second electrical charge to resin 124 when resin 124 is applied to at least one of (i) the individual ones of elongate filaments 104 or subsets 214 of elongate filaments 104 and originating from filament separator 210, or (ii) derivative partial-length-optical-waveguide tow 1009, originating from combiner 212, such that elongate filaments 104 and partial-length optical waveguides 122 in derivative partial-length-optical-waveguide tow 1009 are covered with resin 124. The second electrical charge and the first electrical charge have opposite signs. The preceding subject matter of this paragraph characterizes example 33 of the present disclosure, wherein example 33 also includes the subject matter according to example 31 or 32, above.

As discussed, by imparting a first electrical charge to elongate filaments 104 and by imparting a second opposite charge to resin 124 as it is applied to elongate filaments 104, resin 124 will be electrostatically attracted to elongate filaments 104, thereby facilitating wetting of elongate filaments 104 with resin 124.

Referring generally to FIGS. 1 and 7 and particularly to, e.g., FIG. 26, feedstock-line supply 702 comprises prepreg-tow partial-length-optical-waveguide feedstock-line subsystem 1200 for creating feedstock line 100. Prepreg-tow partial-length-optical-waveguide feedstock-line subsystem 1200 comprises prepreg-tow supply 902, prepreg-tow separator 910, partial-length-optical-waveguide supply 1016, combiner 212, and at least one heater 220. Prepreg-tow supply 902 is configured to dispense precursor prepreg tow 908 that comprises elongate filaments 104 and resin 124, covering elongate filaments 104. Prepreg-tow separator 910 is configured to separate precursor prepreg tow 908, dispensed from prepreg-tow supply 902, into individual ones of elongate filaments 104, at least partially covered with resin 124, or into subsets 214 of elongate filaments 104, at least partially covered with resin 124. Each of subsets 214 comprises a plurality of elongate filaments 104. Partial-length-optical-waveguide supply 1016 is configured to dispense partial-length optical waveguides 122 to be applied to the individual ones of elongate filaments 104, at least partially covered with resin 124, or subsets 214 of elongate filaments 104, at least partially covered with resin 124, originating from prepreg-tow separator 910. Combiner 212 is configured to combine the individual ones of elongate filaments 104, at least partially covered with resin 124, and partial-length optical waveguides 122, dispensed by partial-length-optical-waveguide supply 1016, or to combine subsets 214 of elongate filaments 104, at least partially covered with resin 124, and partial-length optical waveguides 122, dispensed by partial-length-optical-waveguide supply 1016, into derivative partial-length-optical-waveguide prepreg tow 1209 so that partial-length optical waveguides 122 are interspersed among elongate filaments 104. At least one heater 220 is configured to heat at least one of (i) resin 124 in precursor prepreg tow 908, dispensed from prepreg-tow supply 902, to a first threshold temperature to facilitate separation of precursor prepreg tow 908 by prepreg-tow separator 910 into the individual ones of elongate filaments 104 or into subsets 214 of elongate filaments 104, (ii) resin 124 that at least partially covers the individual ones of elongate filaments 104 or subsets 214 of elongate filaments 104, originating from prepreg-tow separator 910, to a second threshold temperature to cause wet-out of partial-length optical waveguides 122 and elongate filaments 104 in derivative partial-length-optical-waveguide prepreg tow 1209 by resin 124, or (iii) resin 124 that at least partially covers elongate filaments 104 in derivative partial-length-optical-waveguide prepreg tow 1209, originating from combiner 212, to a third threshold temperature to cause wet-out of partial-length optical waveguides 122 and elongate filaments 104 in derivative partial-length-optical-waveguide prepreg tow 1209 by resin 124. The preceding subject matter of this paragraph characterizes example 34 of the present disclosure, wherein example 34 also includes the subject matter according to any one of examples 23 to 30, above.

As discussed, creating feedstock line 100 by system 700, as opposed to, for example, merely feeding feedstock line 100 from a pre-made supply of feedstock line 100, creates a versatile additive manufacturing system, in which the user may customize feedstock line 100 with desired properties. As also discussed, creating feedstock line 100 from precursor prepreg tow 908 permits the use of off-the-shelf prepreg reinforcement fiber tows. Prepreg-tow separator 910 separates precursor prepreg tow 908 into individual ones of elongate filaments 104 that are at least partially covered with resin 124 or into subsets 214 of elongate filaments 104 that are at least partially covered with resin 124, so that partial-length optical waveguides 122 may be operatively interspersed with elongate filaments 104. Combiner 212 then combines elongate filaments 104 and partial-length optical waveguides 122, together with resin 124, into derivative partial-length-optical-waveguide prepreg tow 1209 to ultimately become feedstock line 100. At least one heater 220 heats resin 124 to facilitate one or both of separation of precursor prepreg tow 908 or wetting-out of elongate filaments 104 and partial-length optical waveguides 122 in derivative partial-length-optical-waveguide prepreg tow 1209.

As discussed, combiner 212 may take any suitable configuration, such that it is configured to operatively combine elongate filaments 104 with partial-length optical waveguides 122, such that partial-length optical waveguides 122 become interspersed among elongate filaments 104. When combiner 212 is a component of prepreg-tow partial-length-optical-waveguide feedstock-line subsystem 1200, combiner 212 also combines elongate filaments 104 with partial-length optical waveguides 122, such that elongate filaments 104 and partial-length optical waveguides 122 are at least partially covered by resin 124 in derivative partial-length-optical-waveguide prepreg tow 1209. Referring generally to FIGS. 1 and 7 and particularly to, e.g., FIG. 26, prepreg-tow partial-length-optical-waveguide feedstock-line subsystem 1200 further comprises additional-resin supply 906, configured to provide additional resin 125 to be applied to at least one of (i) precursor prepreg tow 908, dispensed from prepreg-tow supply 902, (ii) the individual ones of elongate filaments 104, at least partially covered with resin 124, or subsets 214 of elongate filaments 104, at least partially covered with resin 124, originating from prepreg-tow separator 910, (iii) partial-length optical waveguides 122, dispensed from partial-length-optical-waveguide supply 1016, or (iv) derivative partial-length-optical-waveguide prepreg tow 1209, originating from combiner 212, such that elongate filaments 104 and partial-length optical waveguides 122 in derivative partial-length-optical-waveguide prepreg tow 1209 are covered with resin 124 and additional resin 125. The preceding subject matter of this paragraph characterizes example 35 of the present disclosure, wherein example 35 also includes the subject matter according to example 34, above.

By applying additional resin 125 to elongate filaments 104 and partial-length optical waveguides 122, full wet-out of elongate filaments 104 and partial-length optical waveguide 122 may be achieved in feedstock line 100.

As discussed, additional-resin supply 906 may take any suitable configuration, such that it is configured to operatively dispense and apply additional resin 125 at an operative location. For example, additional-resin supply 906 may be configured to spray or mist additional resin 125. Additionally or alternatively, additional-resin supply 906 may include a reservoir or bath of additional resin 125, through which is pulled at least one of precursor prepreg tow 908, individual ones of elongate filaments 104, subsets 214 of elongate filaments 104, or derivative partial-length-optical-waveguide prepreg tow 1209.

In some examples, additional resin 125 may be the same as resin 124. In other examples, additional resin 125 may be different from resin 124.

In some examples, prepreg-tow partial-length-optical-waveguide feedstock-line subsystem 1200 may further comprise chamber 224 between prepreg-tow separator 910 and combiner 212, and through which individual ones of elongate filaments 104 or subsets 214 of elongate filaments 104 pass as feedstock line 100 is being created. Moreover, in some such examples, additional resin 125 is applied to at least elongate filaments 104, and in some examples, also to partial-length optical waveguides 122, in chamber 224.

Referring generally to FIG. 7 and particularly to, e.g., FIG. 26, partial-length-optical-waveguide supply 1016 and additional-resin supply 906 together form combined partial-length-optical-waveguide additional-resin supply 1222, configured to dispense partial-length optical waveguides 122 together with additional resin 125. The preceding subject matter of this paragraph characterizes example 36 of the present disclosure, wherein example 36 also includes the subject matter according to example 35, above.

That is, combined partial-length-optical-waveguide additional-resin supply 1222 may dispense partial-length optical waveguides 122 in a volume of additional resin 125. Stated differently, partial-length optical waveguides 122 may be suspended within additional resin 125. By using combined partial-length-optical-waveguide additional-resin supply 1222, even dispersion of partial-length optical waveguides 122 may be ensured, and prepreg-tow partial-length-optical-waveguide feedstock-line subsystem 1200 may be constructed at a reduced cost. For example, combined partial-length-optical-waveguide additional-resin supply 1222 may spray or mist additional resin 125 and partial-length optical waveguides 122 together to apply them to elongate filaments 104, or elongate filaments 104 may be pulled through a bath of additional resin 125 with partial-length optical waveguides 122 suspended therein.

Referring generally to FIG. 7 and particularly to, e.g., FIG. 26, prepreg-tow separator 910 is configured to impart a first electrical charge to elongate filaments 104 or to resin 124 as precursor prepreg tow 908 is separated into the individual ones of elongate filaments 104, at least partially covered with resin 124, or into subsets 214 of elongate filaments 104, at least partially covered with resin 124. Additional-resin supply 906 is configured to impart a second electrical charge to additional resin 125 when additional resin 125 is applied to at least one of (i) the individual ones of elongate filaments 104, at least partially covered with resin 124, or subsets 214 of elongate filaments 104, at least partially covered with resin 124 and originating from prepreg-tow separator 910, or (ii) derivative partial-length-optical-waveguide prepreg tow 1209, originating from combiner 212, such that elongate filaments 104 and partial-length optical waveguides 122 in derivative partial-length-optical-waveguide prepreg tow 1209 are covered with resin 124 and additional resin 125. The second electrical charge and the first electrical charge have opposite signs. The preceding subject matter of this paragraph characterizes example 37 of the present disclosure, wherein example 37 also includes the subject matter according to example 35 or 36, above.

As discussed, by imparting a first electrical charge to elongate filaments 104 or resin 124 and by imparting a second opposite charge to additional resin 125 as it is applied to elongate filaments 104 and resin 124, additional resin 125 will be electrostatically attracted to elongate filaments 104.

Referring generally to FIG. 1 and particularly to, e.g., FIGS. 13-15 and 29-31, at least one optical modifier 123 comprises optical direction-modifying particles 186. Optical direction-modifying particles 186 are configured to at least one of reflect, refract, diffract, or Rayleigh-scatter electromagnetic radiation 118, incident on outer surface 184 of any one of optical direction-modifying particles 186, to disperse, in interior volume 182 of feedstock line 100, electromagnetic radiation 118 to irradiate resin 124 that, due at least in part to elongate filaments 104, is not directly accessible to electromagnetic radiation 118, incident on exterior surface 180 of feedstock line 100. The preceding subject matter of this paragraph characterizes example 38 of the present disclosure, wherein example 38 also includes the subject matter according to any one of examples 1 to 15 or 23 to 30, above.

Inclusion of optical direction-modifying particles 186 that at least one of reflect, refract, diffract, or Rayleigh-scatter electromagnetic radiation 118 provides for dispersion of electromagnetic radiation 118 within interior volume 182 for irradiation of resin 124 therein. Moreover, because they are particles, optical direction-modifying particles 186 more easily are positioned among elongate filaments 104 of a bundle, or tow, of elongate filaments 104. In addition, in some examples, they may be generally uniformly spaced throughout resin 124 within interior volume 182 and effectively scatter electromagnetic radiation 118 throughout interior volume 182 to penetrate among elongate filaments 104 and into the shadows cast by elongate filaments 104 when feedstock line 100 is being used to additively manufacture object 136 by system 700. In other examples, optical direction-modifying particles 186 may have a gradient of concentration within interior volume 182.

Optical direction-modifying particles 186 may be of any suitable material, such that they reflect, refract, diffract, or Rayleigh-scatter electromagnetic radiation 118. As illustrative, non-exclusive examples, optical direction-modifying particles 186 may be of alumina, silica, or thermoplastic with desired reflective, refractive, diffractive, or Rayleigh-scattering properties in connection with electromagnetic radiation 118.

In some examples of feedstock line 100, a single type, or configuration, of optical direction-modifying particles 186 may be included. In other examples of feedstock line 100, more than one type, or configuration, of optical direction-modifying particles 186 may be included, with different types being selected to accomplish different functions, and ultimately to collectively scatter electromagnetic radiation 118 evenly throughout interior volume 182, including into the shadows of elongate filaments 104. For example, a first type of optical direction-modifying particles 186 may be configured to reflect electromagnetic radiation 118, a second type of optical direction-modifying particles 186 may be configured to refract electromagnetic radiation 118, and a third type of optical direction-modifying particles 186 may be configured to diffract electromagnetic radiation 118.

Referring generally to FIG. 1 and particularly to, e.g., FIGS. 13-15 and 29-31, each of elongate filaments 104 has a minimum outer dimension. Each of optical direction-modifying particles 186 has a maximum outer dimension that is less than one-eighth the minimum outer dimension of any one of elongate filaments 104. The preceding subject matter of this paragraph characterizes example 39 of the present disclosure, wherein example 39 also includes the subject matter according to example 38, above.

By having a maximum outer dimension that is less than one-eighth the minimum outer dimension of elongate filaments 104, optical direction-modifying particles 186 easily extend among elongate filaments 104. Moreover, when feedstock line 100 is being constructed (e.g., by dry-tow particle feedstock-line subsystem 1300 herein, by prepreg-tow particle feedstock-line subsystem 1400 herein, or according to method 800 herein), optical direction-modifying particles 186 may easily flow with resin 124 or additional resin 125 into a bundle, or tow, of elongate filaments 104.

Referring generally to FIG. 1 and particularly to, e.g., FIGS. 13-15 and 29-31, each of optical direction-modifying particles 186 has a maximum outer dimension that is less than 1000 nm, 500 nm, 250 nm, or 200 nm. The preceding subject matter of this paragraph characterizes example 40 of the present disclosure, wherein example 40 also includes the subject matter according to example 38 or 39, above.

Typical reinforcement fibers for composite materials often have a diameter in the range of 5 to 8 microns. By having a maximum outer dimension that is less than 1000 nm (1 micron), 500 nm (0.5 micron), 250 nm (0.25 micron), or 200 nm (0.200 micron), optical direction-modifying particles 186 easily extend between typical sizes of elongate filaments 104. Moreover, when feedstock line 100 is being constructed (e.g., by dry-tow particle feedstock-line subsystem 1300 herein, by prepreg-tow particle feedstock-line subsystem 1400 herein, or according to method 800 herein), optical direction-modifying particles 186 may easily flow with resin 124 or additional resin 125 into a bundle, or tow, of elongate filaments 104.

Referring generally to FIG. 1 and particularly to, e.g., FIGS. 13-15 and 29-31, electromagnetic radiation 118 has a wavelength. Each of optical direction-modifying particles 186 has a minimum outer dimension that is greater than one-fourth the wavelength of electromagnetic radiation 118. The preceding subject matter of this paragraph characterizes example 41 of the present disclosure, wherein example 41 also includes the subject matter according to any one of examples 38 to 40, above.

Selecting a minimum outer dimension of optical direction-modifying particles 186 that is greater than one-fourth the wavelength of electromagnetic radiation 118 ensures that optical direction-modifying particles 186 will have the intended effect of causing electromagnetic radiation 118 to reflect, refract, or diffract upon hitting optical direction-modifying particles 186.

Referring generally to FIG. 1 and particularly to, e.g., FIGS. 13-15 and 29-31, each of optical direction-modifying particles 186 has a minimum outer dimension that is greater than or equal to 50 nm or that is greater than or equal to 100 nm. The preceding subject matter of this paragraph characterizes example 42 of the present disclosure, wherein example 42 also includes the subject matter according to any one of examples 38 to 41, above.

Ultra-violet light having a wavelength of about 400 nm is often used in connection with ultra-violet photopolymers. Accordingly, when resin 124 comprises or consists of a photopolymer, optical direction-modifying particles 186 having a minimum outer dimension that is greater than or equal to 100 nm ensures that optical direction-modifying particles 186 will have the intended effect of causing electromagnetic radiation 118 to reflect, refract, or diffract upon hitting optical direction-modifying particles 186. However, in other examples, a minimum outer dimension as low as 50 nm may be appropriate.

Referring generally to FIG. 1 and particularly to, e.g., FIGS. 13-15, optical direction-modifying particles 186 comprise less than 10% by weight of resin 124, less than 5% by weight of resin 124, or less than 1% by weight of resin 124 of feedstock line 100. The preceding subject matter of this paragraph characterizes example 43 of the present disclosure, wherein example 43 also includes the subject matter according to any one of examples 38 to 42, above.

By limiting optical direction-modifying particles 186 to the referenced threshold percentages, resin 124 will operatively flow among elongate filaments 104 when feedstock line 100 is being constructed (e.g., by dry-tow particle feedstock-line subsystem 1300 herein, by prepreg-tow particle feedstock-line subsystem 1400 herein, or according to method 800 herein). In addition, desired properties of resin 124, feedstock line 100, and ultimately object 136 will not be negatively impacted by the presence of optical direction-modifying particles 186.

Referring generally to FIG. 1 and particularly to, e.g., FIGS. 29-31, outer surfaces 184 of at least some of optical direction-modifying particles 186 are faceted. The preceding subject matter of this paragraph characterizes example 44 of the present disclosure, wherein example 44 also includes the subject matter according to any one of examples 38 to 43, above.

By being faceted, outer surfaces 184 effectively scatter electromagnetic radiation 118. As used herein, "faceted" means having a plurality of planar, or generally planar, surfaces. In some examples of optical direction-modifying particles 186 that are faceted, outer surface 184 may have six or more, eight or more, ten or more, 100 or more, or even 1000 or more generally planar surfaces. Optical direction-modifying particles 186 may be of a material that has a natural crystalline structure that is faceted.

Referring generally to FIG. 1 and particularly to, e.g., FIGS. 13-15 and 29-31, outer surfaces 184 of at least some of optical direction-modifying particles 186 have a surface roughness that is selected such that when electromagnetic radiation 118 strikes outer surfaces 184, electromagnetic radiation 118 is scattered in interior volume 182 of feedstock line 100 to irradiate resin 124 that, due at least in part to elongate filaments 104, is not directly accessible to electromagnetic radiation 118, incident on exterior surface 180 of feedstock line 100. The preceding subject matter of this paragraph characterizes example 45 of the present disclosure, wherein example 45 also includes the subject matter according to any one of examples 38 to 44, above.

Having a surface roughness selected to scatter electromagnetic radiation 118 facilitates the operative irradiation of resin 124 throughout interior volume 182, including into the shadows of elongate filaments 104.

Referring generally to FIG. 1 and particularly to, e.g., FIGS. 13-15, resin 124 has a resin refractive index. At least some of optical direction-modifying particles 186 have a particle refractive index. The particle refractive index is higher than or lower than the resin refractive index. The preceding subject matter of this paragraph characterizes example 46 of the present disclosure, wherein example 46 also includes the subject matter according to any one of examples 38 to 45, above.

When optical direction-modifying particles 186 have a refractive index that is different from (e.g., that is at least 0.001 greater or less than) the refractive index of resin 124, electromagnetic radiation 118 incident upon the outer surfaces thereof will necessarily leave the outer surfaces at a different angle, and thus will scatter throughout resin 124, including into the shadows of elongate filaments 104.

Referring generally to FIG. 1 and particularly to, e.g., FIG. 29, at least some of optical direction-modifying particles 186 are spherical. The preceding subject matter of this paragraph characterizes example 47 of the present disclosure, wherein example 47 also includes the subject matter according to any one of examples 38 to 46, above.

By being spherical, optical direction-modifying particles 186 may easily be positioned among elongate filaments 104, and when feedstock line 100 is being constructed (e.g., by dry-tow particle feedstock-line subsystem 1300 herein, by prepreg-tow particle feedstock-line subsystem 1400 herein, or according to method 800 herein), may easily flow with resin 124 or additional resin 125 into a bundle, or tow, of elongate filaments 104.

As used herein, "spherical" includes generally spherical and means that such optical direction-modifying particles 186 have a generally uniform aspect ratio, but are not necessarily perfectly spherical. For example, optical direction-modifying particles 186 that are spherical may be faceted, as discussed herein.

Referring generally to FIG. 1 and particularly to, e.g., FIG. 30, at least some of optical direction-modifying particles 186 are prismatic. The preceding subject matter of this paragraph characterizes example 48 of the present disclosure, wherein example 48 also includes the subject matter according to any one of examples 38 to 47, above.

By being prismatic, optical direction-modifying particles 186 may be selected to operatively at least one of reflect, refract, or diffract electromagnetic radiation 118, as discussed herein.

Referring generally to FIGS. 1 and 8 and particularly to, e.g., FIG. 27, feedstock-line supply 702 comprises dry-tow particle feedstock-line subsystem 1300 for creating feedstock line 100. Dry-tow particle feedstock-line subsystem 1300 comprises filament supply 202, filament separator 210, optical-direction-modifying-particle supply 1316, combiner 212, and resin supply 206. Filament supply 202 is configured to dispense precursor tow 208, comprising elongate filaments 104. Filament separator 210 is configured to separate precursor tow 208, dispensed from filament supply 202, into individual ones of elongate filaments 104 or into subsets 214 of elongate filaments 104. Each of subsets 214 comprises a plurality of elongate filaments 104. Optical-direction-modifying-particle supply 1316 is configured to dispense optical direction-modifying particles 186 to be applied to the individual ones of elongate filaments 104 or subsets 214 of elongate filaments 104, originating from filament separator 210. Combiner 212 is configured to combine the individual ones of elongate filaments 104, originating from filament separator 210, and optical direction-modifying particles 186, dispensed by optical-direction-modifying-particle supply 1316, or subsets 214 of elongate filaments 104, originating from filament separator 210, and optical direction-modifying particles 186, dispensed by optical-direction-modifying-particle supply 1316, into derivative particle tow 1309 so that optical direction-modifying particles 186 are interspersed among elongate filaments 104. Resin supply 206 is configured to provide resin 124 to be applied to at least one of (i) precursor tow 208, dispensed from filament supply 202, (ii) the individual ones of elongate filaments 104 or subsets 214 of elongate filaments 104, originating from filament separator 210, (iii) optical direction-modifying particles 186, dispensed from optical-direction-modifying-particle supply 1316, or (iv) derivative particle tow 1309, originating from combiner 212, such that elongate filaments 104 and optical direction-modifying particles 186 in derivative particle tow 1309 are covered with resin 124. The preceding subject matter of this paragraph characterizes example 49 of the present disclosure, wherein example 49 also includes the subject matter according to any one of examples 38 to 48, above.

As discussed, creating feedstock line 100 by system 700, as opposed to, for example, merely feeding feedstock line 100 from a pre-made supply of feedstock line 100, creates a versatile additive manufacturing system, in which the user may customize feedstock line 100 with desired properties. As also discussed, creating feedstock line 100 from precursor tow 208 permits the use of off-the-shelf reinforcement fiber tows. Filament separator 210 separates precursor tow 208 into individual ones of elongate filaments 104 or into subsets 214 of elongate filaments 104, so that optical direction-modifying particles 186 may be operatively interspersed with elongate filaments 104. Combiner 212 then combines elongate filaments 104 and optical direction-modifying particles 186 into derivative particle tow 1309 to ultimately become feedstock line 100 with resin 124. Resin supply 206 dispenses resin 124 at any suitable location as feedstock line 100 is being created, including one or more of (i) at precursor tow 208 before it is separated into individual ones of elongate filaments 104 or into subsets 214 of elongate filaments 104, (ii) at elongate filaments 104 that have been separated from precursor tow 208, (iii) at or with optical direction-modifying particles 186 before they are combined with elongate filaments 104, or (iv) at derivative particle tow 1309 after optical direction-modifying particles 186 have been combined with elongate filaments 104.

Combiner 212 may take any suitable configuration, such that it is configured to operatively combine elongate filaments 104 with optical direction-modifying particles 186, such that optical direction-modifying particles 186 become interspersed among elongate filaments 104. For example, combiner 212 may at least one of twist, weave, braid, or otherwise bundle elongate filaments 104 together with optical direction-modifying particles 186.

As discussed, resin supply 206 may take any suitable configuration, such that it is configured to operatively dispense and apply resin 124 at an operative location. For example, resin supply 206 may be configured to spray or mist resin 124. Additionally or alternatively, resin supply 206 may include a reservoir or bath of resin 124, through which is pulled at least one of precursor tow 208, individual ones of elongate filaments 104, subsets 214 of elongate filaments 104, or derivative particle tow 1309.

In some examples, dry-tow particle feedstock-line subsystem 1300 may further comprise chamber 224 between filament separator 210 and combiner 212, and through which individual ones of elongate filaments 104 or subsets 214 of elongate filaments 104 pass as feedstock line 100 is being created. Moreover, in some such examples, resin 124 is applied to at least elongate filaments 104, and in some examples, also to optical direction-modifying particles 186, in chamber 224.

Referring generally to FIG. 8 and particularly to, e.g., FIG. 27, optical-direction-modifying-particle supply 1316 and resin supply 206 together form combined particle resin supply 1322, configured to dispense optical direction-modifying particles 186 together with resin 124. The preceding subject matter of this paragraph characterizes example 50 of the present disclosure, wherein example 50 also includes the subject matter according to example 49, above.

That is, combined particle resin supply 1322 may dispense optical direction-modifying particles 186 in a volume of resin 124. Stated differently, optical direction-modifying particles 186 may be suspended within resin 124. By using combined particle resin supply 1322, even dispersion of optical direction-modifying particles 186 may be ensured, and dry-tow particle feedstock-line subsystem 1300 may be constructed at a reduced cost. For example, combined particle resin supply 1322 may spray or mist resin 124 and optical direction-modifying particles 186 together to apply them to elongate filaments 104, or elongate filaments 104 may be pulled through a bath of resin 124 with optical direction-modifying particles 186 suspended therein.

Referring generally to FIG. 8 and particularly to, e.g., FIG. 27, filament separator 210 is configured to impart a first electrical charge to elongate filaments 104 as precursor tow 208 is separated into the individual ones of elongate filaments 104 or into subsets 214 of elongate filaments 104. Resin supply 206 is configured to impart a second electrical charge to resin 124 when resin 124 is applied to at least one of (i) the individual ones of elongate filaments 104 or subsets 214 of elongate filaments 104, originating from filament separator 210, or (ii) derivative particle tow 1309, originating from combiner 212, such that elongate filaments 104 and optical direction-modifying particles 186 in derivative particle tow 1309 are covered with resin 124. The second electrical charge and the first electrical charge have opposite signs. The preceding subject matter of this paragraph characterizes example 51 of the present disclosure, wherein example 51 also includes the subject matter according to example 49 or 50, above.

As discussed, by imparting a first electrical charge to elongate filaments 104 and by imparting a second opposite charge to resin 124 as it is applied to elongate filaments 104, resin 124 will be electrostatically attracted to elongate filaments 104, thereby facilitating wetting of elongate filaments 104 with resin 124.

Referring generally to FIGS. 1 and 9 and particularly to, e.g., FIG. 28, feedstock-line supply 702 comprises prepreg-tow particle feedstock-line subsystem 1400 for creating feedstock line 100. Prepreg-tow particle feedstock-line subsystem 1400 comprises prepreg-tow supply 902, prepreg-tow separator 910, optical-direction-modifying-particle supply 1316, combiner 212, and at least one heater 220. Prepreg-tow supply 902 is configured to dispense precursor prepreg tow 908 that comprises elongate filaments 104 and resin 124, covering elongate filaments 104. Prepreg-tow separator 910 is configured to separate precursor prepreg tow 908, dispensed from prepreg-tow supply 902, into individual ones of elongate filaments 104, at least partially covered with resin 124, or into subsets 214 of elongate filaments 104, at least partially covered with resin 124. Each of subsets 214 comprises a plurality of elongate filaments 104. Optical-direction-modifying-particle supply 1316 is configured to dispense optical direction-modifying particles 186 to be applied to the individual ones of elongate filaments 104, at least partially covered with resin 124, or subsets 214 of elongate filaments 104, at least partially covered with resin 124, originating from prepreg-tow separator 910. Combiner 212 is configured to combine the individual ones of elongate filaments 104, at least partially covered with resin 124, and optical direction-modifying particles 186, dispensed by optical-direction-modifying-particle supply 1316, or to combine subsets 214 of elongate filaments 104, at least partially covered with resin 124, and optical direction-modifying particles 186, dispensed by optical-direction-modifying-particle supply 1316, into derivative particle prepreg tow 1409 so that optical direction-modifying particles 186 are interspersed among elongate filaments 104. At least one heater 220 is configured to heat at least one of (i) resin 124 in precursor prepreg tow 908, dispensed from prepreg-tow supply 902, to a first threshold temperature to facilitate separation of precursor prepreg tow 908 by prepreg-tow separator 910 into the individual ones of elongate filaments 104 or into subsets 214 of elongate filaments 104, (ii) resin 124 that at least partially covers the individual ones of elongate filaments 104 or subsets 214 of elongate filaments 104, originating from prepreg-tow separator 910, to a second threshold temperature to cause wet-out of optical direction-modifying particles 186 and elongate filaments 104 in derivative particle prepreg tow 1409 by resin 124, or (iii) resin 124 that at least partially covers elongate filaments 104 in derivative particle prepreg tow 1409, originating from combiner 212, to a third threshold temperature to cause wet-out of optical direction-modifying particles 186 and elongate filaments 104 in derivative particle prepreg tow 1409 by resin 124. The preceding subject matter of this paragraph characterizes example 52 of the present disclosure, wherein example 52 also includes the subject matter according to any one of examples 38 to 48, above.

As discussed, creating feedstock line 100 by system 700, as opposed to, for example, merely feeding feedstock line 100 from a pre-made supply of feedstock line 100, creates a versatile additive manufacturing system, in which the user may customize feedstock line 100 with desired properties. As also discussed, creating feedstock line 100 from precursor prepreg tow 908 permits the use of off-the-shelf prepreg reinforcement fiber tows. Prepreg-tow separator 910 separates precursor prepreg tow 908 into individual ones of elongate filaments 104 that are at least partially covered with resin 124 or into subsets 214 of elongate filaments 104 that are at least partially covered with resin 124, so that optical direction-modifying particles 186 may be operatively interspersed with elongate filaments 104. Combiner 212 then combines elongate filaments 104 and optical direction-modifying particles 186, together with resin 124, into derivative particle prepreg tow 1409 to ultimately become feedstock line 100. At least one heater 220 heats resin 124 to facilitate one or both of separation of precursor prepreg tow 908 or wetting-out of elongate filaments 104 and optical direction-modifying particles 186 in derivative particle prepreg tow 1409.

As discussed, combiner 212 may take any suitable configuration, such that it is configured to operatively combine elongate filaments 104 with optical direction-modifying particles 186, such that optical direction-modifying particles 186 become interspersed among elongate filaments 104. When combiner 212 is a component of prepreg-tow particle feedstock-line subsystem 1400, combiner 212 also combines elongate filaments 104 with optical direction-modifying particles 186, such that elongate filaments 104 and optical direction-modifying particles 186 are at least partially covered by resin 124 in derivative particle prepreg tow 1409.

Referring generally to FIG. 9 and particularly to, e.g., FIG. 28, prepreg-tow particle feedstock-line subsystem 1400 further comprises additional-resin supply 906, configured to provide additional resin 125 to be applied to at least one of (i) precursor prepreg tow 908, dispensed from prepreg-tow supply 902, (ii) the individual ones of elongate filaments 104, at least partially covered with resin 124, or subsets 214 of elongate filaments 104, at least partially covered with resin 124, originating from prepreg-tow separator 910, (iii) optical direction-modifying particles 186, dispensed from optical-direction-modifying-particle supply 1316, or (iv) derivative particle prepreg tow 1409, originating from combiner 212, such that elongate filaments 104 and optical direction-modifying particles 186 in derivative particle prepreg tow 1409 are covered with resin 124 and additional resin 125. The preceding subject matter of this paragraph characterizes example 53 of the present disclosure, wherein example 53 also includes the subject matter according to example 52, above.

By applying additional resin 125 to elongate filaments 104 and optical direction-modifying particles 186, full wet-out of elongate filaments 104 and optical direction-modifying particles 186 may be achieved in feedstock line 100.

As discussed, additional-resin supply 906 may take any suitable configuration, such that it is configured to operatively dispense and apply additional resin 125 at an operative location. For example, additional-resin supply 906 may be configured to spray or mist additional resin 125. Additionally or alternatively, additional-resin supply 906 may include a reservoir or bath of additional resin 125, through which is pulled at least one of precursor prepreg tow 908, individual ones of elongate filaments 104, subsets 214 of elongate filaments 104, or derivative particle prepreg tow 1409.

In some examples, additional resin 125 may be the same as resin 124. In other examples, additional resin 125 may be different from resin 124.

In some examples, prepreg-tow particle feedstock-line subsystem 1400 may further comprise chamber 224 between prepreg-tow separator 910 and combiner 212, and through which individual ones of elongate filaments 104 or subsets 214 of elongate filaments 104 pass as feedstock line 100 is being created. Moreover, in some such examples, additional resin 125 is applied to at least elongate filaments 104, and in some examples, also to optical direction-modifying particles 186, in chamber 224.

Referring generally to FIG. 9 and particularly to, e.g., FIG. 28, optical-direction-modifying-particle supply 1316 and additional-resin supply 906 together form combined particle additional-resin supply 1422, configured to dispense optical direction-modifying particles 186 together with additional resin 125. The preceding subject matter of this paragraph characterizes example 54 of the present disclosure, wherein example 54 also includes the subject matter according to example 53, above.

That is, combined particle additional-resin supply 1422 may dispense optical direction-modifying particles 186 in a volume of additional resin 125. Stated differently, optical direction-modifying particles 186 may be suspended within additional resin 125. By using combined particle additional-resin supply 1422, even dispersion of optical direction-modifying particles 186 may be ensured, and prepreg-tow particle feedstock-line subsystem 1400 may be constructed at a reduced cost. For example, combined particle additional-resin supply 1422 may spray or mist additional resin 125 and optical direction-modifying particles 186 together to apply them to elongate filaments 104, or elongate filaments 104 may be pulled through a bath of additional resin 125 with optical direction-modifying particles 186 suspended therein.

Referring generally to FIG. 9 and particularly to, e.g., FIG. 28, prepreg-tow separator 910 is configured to impart a first electrical charge to elongate filaments 104 or to resin 124 as precursor prepreg tow 908 is separated into individual ones of elongate filaments 104, at least partially covered with resin 124, or into subsets 214 of elongate filaments 104, at least partially covered with resin 124. Additional-resin supply 906 is configured to impart a second electrical charge to additional resin 125 when additional resin 125 is applied to at least one of (i) the individual ones of elongate filaments 104, at least partially covered with resin 124, or subsets 214 of elongate filaments 104, at least partially covered with resin 124 and originating from prepreg-tow separator 910, or (ii) derivative particle prepreg tow 1409, originating from combiner 212, such that elongate filaments 104 and optical direction-modifying particles 186 in derivative particle prepreg tow 1409 are covered with resin 124 and additional resin 125. The second electrical charge and the first electrical charge have opposite signs. The preceding subject matter of this paragraph characterizes example 55 of the present disclosure, wherein example 55 also includes the subject matter according to example 53 or 54, above.

As discussed, by imparting a first electrical charge to elongate filaments 104 or resin 124 and by imparting a second opposite charge to additional resin 125 as it is applied to elongate filaments 104 and resin 124, additional resin 125 will be electrostatically attracted to elongate filaments 104.

Referring generally to FIG. 1 and particularly to, e.g., FIGS. 22-28, system 700 further comprises drive assembly 710, operatively coupled at least to one of delivery guide 704 or surface 708 and configured to selectively move at least one of delivery guide 704 or surface 708 relative to another in three dimensions to additively manufacture object 136. The preceding subject matter of this paragraph characterizes example 56 of the present disclosure, wherein example 56 also includes the subject matter according to any one of examples 1 to 55, above.

Drive assembly 710 facilitates the relative movement between delivery guide 704 and surface 708 so that object 136 is manufactured from feedstock line 100 as it is deposited via delivery guide 704.

Drive assembly 710 may take any suitable form, such that delivery guide 704 and surface 708 may be operatively moved relative to each other in three dimensions for additive manufacturing of object 136. In some examples, drive assembly 710 may be a robotic arm, and delivery guide 704 may be described as an end effector of the robotic arm. Drive assembly 710 may provide for relative movement between delivery guide 704 and surface 708 in any multiple degrees of freedom, including, for example, orthogonally in three dimensions relative to another, in three dimensions with at least three degrees of freedom relative to another, in three dimensions with at least six degrees of freedom relative to another, in three dimensions with at least nine degrees of freedom relative to another, and/or in three dimensions with at least twelve degrees of freedom relative to another.

Referring generally to, e.g., FIGS. 1 and 22 and particularly to FIG. 32, method 800 of additively manufacturing object 136 is disclosed. Method 800 comprises a step of (block 802) depositing feedstock line 100 along print path 705, using delivery guide 704. Feedstock line 100 has a feedstock-line length and exterior surface 180, defining interior volume 182 of feedstock line 100. Feedstock line 100 comprises elongate filaments 104, resin 124, and at least one optical modifier 123. Elongate filaments 104 extend along at least a portion of the feedstock-line length. Resin 124 covers elongate filaments 104. At least one optical modifier 123 has outer surface 184, covered by resin 124. At least one optical modifier 123 is interspersed among elongate filaments 104. Method 800 also comprises a step of (block 804) directing electromagnetic radiation 118 at exterior surface 180 of feedstock line 100 after feedstock line 100 is deposited by delivery guide 704 along print path 705. The step of (block 804) directing electromagnetic radiation 118 at exterior surface 180 of feedstock line 100 after feedstock line 100 is deposited by delivery guide 704 along print path 705 causes electromagnetic radiation 118 to strike outer surface 184 of at least one optical modifier 123, which in turn causes electromagnetic radiation 118 to irradiate, in interior volume 182 of feedstock line 100, resin 124 that, due at least in part to elongate filaments 104, is not directly accessible to electromagnetic radiation 118, incident on exterior surface 180 of feedstock line 100. The preceding subject matter of this paragraph characterizes example 57 of the present disclosure.

Method 800 therefore may be implemented to manufacture object 136 from a fiber reinforced composite material that facilitates in situ curing of resin 124. Moreover, method 800 may be implemented to manufacture object 136 with elongate filaments 104 being oriented in desired and/or predetermined orientations throughout object 136, such as to define desired properties of object 136. In addition and as discussed in connection with system 700 herein, inclusion of at least one optical modifier 123 in feedstock line 100 facilitates penetration of electromagnetic radiation 118 into interior volume 182 of feedstock line 100 for irradiation of resin 124, despite regions of resin 124 being in the shadows of elongate filaments 104 cast by the direct (i.e., line-of-sight) application of electromagnetic radiation 118. In other words, even when electromagnetic radiation 118 is shielded from directly reaching all regions of resin 124, at least one optical modifier 123 will redirect electromagnetic radiation 118 to indirectly reach regions of resin 124. As a result, feedstock line 100 may be more easily cured in situ with electromagnetic radiation 118, may be more evenly cured in situ with electromagnetic radiation 118, may be more thoroughly cured in situ with electromagnetic radiation 118, and/or may be more quickly cured in situ with electromagnetic radiation 118.

Referring generally to, e.g., FIGS. 1 and 11-16 and particularly to FIG. 32, according to method 800, elongate filaments 104 are opaque to electromagnetic radiation 118. The preceding subject matter of this paragraph characterizes example 58 of the present disclosure, wherein example 58 also includes the subject matter according to example 57, above.

As discussed, elongate filaments 104 typically will be selected for strength properties and not for light-transmissivity properties. For example, carbon fibers are often used in fiber-reinforced composite structures, and carbon fibers are opaque to ultra-violet and visible light. Accordingly, elongate filaments 104 that are opaque to electromagnetic radiation 118 are well suited for inclusion in feedstock line 100, as at least one optical modifier 123 operatively will redirect electromagnetic radiation 118 into the shadows of elongate filaments 104.

Referring generally to, e.g., FIGS. 1,2,11-14, and 18-21 and particularly to FIG. 32, according to method 800, at least one optical modifier 123 comprises at least one full-length optical waveguide 102, extending along all of the feedstock-line length. At least one full-length optical waveguide 102 comprises full-length optical core 110. Full-length optical core 110 comprises first full-length-optical-core end face 112, second full-length-optical-core end face 114, opposite first full-length-optical-core end face 112, and full-length peripheral surface 116, extending between first full-length-optical-core end face 112 and second full-length-optical-core end face 114. The step of (block 804) directing electromagnetic radiation 118 at exterior surface 180 of feedstock line 100 after feedstock line 100 is deposited by delivery guide 704 along print path 705 causes electromagnetic radiation 118 to enter full-length optical core 110 via at least one of first full-length-optical-core end face 112, second full-length-optical-core end face 114, or full-length peripheral surface 116, which in turn causes at least a portion of electromagnetic radiation 118 to exit full-length optical core 110 via full-length peripheral surface 116 to irradiate, in interior volume 182 of feedstock line 100, resin 124 that, due at least in part to elongate filaments 104, is not directly accessible to electromagnetic radiation 118, incident on exterior surface 180 of feedstock line 100. The preceding subject matter of this paragraph characterizes example 59 of the present disclosure, wherein example 59 also includes the subject matter according to example 57 or 58, above.

As discussed, inclusion of at least one full-length optical waveguide 102 in feedstock line 100 facilitates penetration of electromagnetic radiation 118 into interior volume 182 of feedstock line 100 for irradiation of resin 124, despite regions of resin 124 being in the shadows of elongate filaments 104. More specifically, even when electromagnetic radiation 118 is shielded from directly reaching all regions of resin 124, at least one full-length optical waveguide 102 will receive electromagnetic radiation 118 via one or more of its first full-length-optical-core end face 112, its second full-length-optical-core end face 114, or its full-length peripheral surface 116, and disperse electromagnetic radiation 118 via at least its full-length peripheral surface 116 to indirectly reach regions of resin 124.

Referring generally to, e.g., FIGS. 1, 2, 11-14, and 18-21 and particularly to FIG. 32, according to method 800, the step of (block 804) directing electromagnetic radiation 118 at exterior surface 180 of feedstock line 100 after feedstock line 100 is deposited by delivery guide 704 along print path 705 causes electromagnetic radiation 118 to enter first full-length-optical-core end face 112 of full-length optical core 110, which in turn causes an initial portion of electromagnetic radiation 118 to exit full-length optical core 110 via full-length peripheral surface 116 and a final portion of electromagnetic radiation 118, remaining in full-length optical core 110 after the initial portion of electromagnetic radiation 118 exits full-length optical core 110, to exit full-length optical core 110 via second full-length-optical-core end face 114. The preceding subject matter of this paragraph characterizes example 60 of the present disclosure, wherein example 60 also includes the subject matter according to example 59, above.

In other words, when electromagnetic radiation 118 enters first full-length-optical-core end face 112, it will exit both full-length peripheral surface 116 and second full-length-optical-core end face 114, as opposed, for example, to electromagnetic radiation 118 being fully emitted via full-length peripheral surface 116. Accordingly, it is ensured that electromagnetic radiation 118 travels through a substantial portion of full-length optical core 110, effectively leaking electromagnetic radiation 118 along the way and thereby penetrating multiple regions of resin 124 of feedstock line 100.

Referring generally to, e.g., FIGS. 1, 2, 11-14, and 18-21 and particularly to FIG. 32, according to method 800, the initial portion of electromagnetic radiation 118, which exits full-length optical core 110 via full-length peripheral surface 116, is greater than or equal to the final portion of electromagnetic radiation 118, which exits full-length optical core 110 via second full-length-optical-core end face 114. The preceding subject matter of this paragraph characterizes example 61 of the present disclosure, wherein example 61 also includes the subject matter according to example 60, above.

Accordingly, it is ensured that a desired amount of electromagnetic radiation 118 exits full-length optical core 110 via full-length peripheral surface 116 to operatively cure resin 124 among elongate filaments 104 within interior volume 182 of feedstock line 100, as opposed to, for example, excessive amounts of electromagnetic radiation 118 traveling all the way to second full-length-optical-core end face 114 and not operatively penetrating a desired volume of resin 124 within feedstock line 100.

Referring generally to, e.g., FIGS. 1, 2, and 11-14 and particularly to FIG. 32, according to method 800, at least one full-length optical waveguide 102 is at least one of parallel to, generally parallel to, twisted with, woven with, or braided with elongate filaments 104. The preceding subject matter of this paragraph characterizes example 62 of the present disclosure, wherein example 62 also includes the subject matter according to any one of examples 59 to 61, above.

As discussed, by at least one full-length optical waveguide 102 being generally parallel to elongate filaments 104, the reinforcing properties of elongate filaments 104 within feedstock line 100, and thus within object 136 are not materially affected. By being twisted with, woven with, or braided with elongate filaments 104, at least one full-length optical waveguide 102 is interspersed with elongate filaments 104 so that electromagnetic radiation 118, exiting at least one full-length optical waveguide 102, is delivered to regions of interior volume 182 that are in the shadows of elongated filaments 104.

Referring generally to, e.g., FIGS. 2 and 18-20 and particularly to FIG. 32, according to method 800, full-length optical core 110 has a full-length-optical-core refractive index. At least one full-length optical waveguide 102 further comprises full-length-optical-core cladding 154, at least partially covering full-length optical core 110. Full-length-optical-core cladding 154 comprises at least first full-length-optical-core cladding resin 156, having a full-length-optical-core first-cladding-resin refractive index. Full-length-optical-core cladding 154 is non-uniform along at least one full-length optical waveguide 102. The full-length-optical-core refractive index is greater than the full-length-optical-core first-cladding-resin refractive index. The preceding subject matter of this paragraph characterizes example 63 of the present disclosure, wherein example 63 also includes the subject matter according to any one of examples 59 to 62, above.

As discussed, by full-length-optical-core cladding 154 being non-uniform along the length of the full-length optical waveguide, electromagnetic radiation 118 is permitted to exit full-length optical core 110 via full-length peripheral surface 116. Moreover, by first full-length-optical-core cladding resin 156 having a refractive index that is lower than that of full-length optical core 110, electromagnetic radiation 118, upon entering full-length optical core 110, is trapped within full-length optical core 110 other than the regions where first full-length-optical-core cladding resin 156 is not present. As a result, at least one full-length optical waveguide 102 may be constructed to provide a desired amount of electromagnetic radiation 118, exiting various positions along full-length peripheral surface 116, such as to ensure a desired amount of electromagnetic radiation 118, penetrating the shadows of elongate filaments 104.

Referring generally to, e.g., FIGS. 2, 19, and 20 and particularly to FIG. 32, according to method 800, full-length peripheral surface 116 has full-length-peripheral-surface regions 127, devoid of first full-length-optical-core cladding resin 156. Full-length-optical-core cladding 154 further comprises second full-length-optical-core cladding resin 158, having a full-length-optical-core second-cladding-resin refractive index. Second full-length-optical-core cladding resin 158 covers full-length-peripheral-surface regions 127 of full-length peripheral surface 116. The full-length-optical-core second-cladding-resin refractive index is greater than the full-length-optical-core first-cladding-resin refractive index. The preceding subject matter of this paragraph characterizes example 64 of the present disclosure, wherein example 64 also includes the subject matter according to example 63, above.

As discussed, by covering full-length-peripheral-surface regions 127 with second full-length-optical-core cladding resin 158, a desired refractive index thereof may be selected to optimize how electromagnetic radiation 118 exits full-length peripheral surface 116. Additionally or alternatively, with full-length-peripheral-surface regions 127 covered with second full-length-optical-core cladding resin 158, the integrity of first full-length-optical-core cladding resin 156 may be ensured, such that it does not peel or break off during storage and handling of feedstock line 100.

Referring generally to, e.g., FIGS. 2 and 20 and particularly to FIG. 32, according to method 800, second full-length-optical-core cladding resin 158 also covers first full-length-optical-core cladding resin 156. The preceding subject matter of this paragraph characterizes example 65 of the present disclosure, wherein example 65 also includes the subject matter according to example 64, above.

As discussed, such full-length optical waveguides may be more easily manufactured, in that full-length optical core 110 with first full-length-optical-core cladding resin 156 simply may be fully coated with second full-length-optical-core cladding resin 158. Additionally or alternatively, the integrity of full-length optical waveguides may be maintained during storage thereof, as well as during construction and storage of feedstock line 100.

Referring generally to, e.g., FIGS. 1, 2, 19, and 20 and particularly to FIG. 32, according to method 800, resin 124 has a resin refractive index. The resin refractive index is greater than the full-length-optical-core second-cladding-resin refractive index. The preceding subject matter of this paragraph characterizes example 66 of the present disclosure, wherein example 66 also includes the subject matter according to example 64 or 65, above.

As discussed, because second full-length-optical-core cladding resin 158 has a refractive index that is lower than that of resin 124, electromagnetic radiation 118 will be permitted to exit second full-length-optical-core cladding resin 158 to penetrate and cure resin 124.

Referring generally to, e.g., FIGS. 2 and 21 and particularly to FIG. 32, according to method 800, full-length peripheral surface 116 has a surface roughness that is selected such that when electromagnetic radiation 118 enters full-length optical core 110 via at least one of first full-length-optical-core end face 112, second full-length-optical-core end face 114, or full-length peripheral surface 116, at least a portion of electromagnetic radiation 118 exits full-length optical core 110 via full-length peripheral surface 116 to irradiate, in interior volume 182 of feedstock line 100, resin 124 that, due at least in part to elongate filaments 104, is not directly accessible to electromagnetic radiation 118, incident on exterior surface 180 of feedstock line 100. The preceding subject matter of this paragraph characterizes example 67 of the present disclosure, wherein example 67 also includes the subject matter according to any one of examples 59 to 62, above.

As discussed, rather than relying on refractive-index properties of a cladding to ensure desired dispersal of electromagnetic radiation 118 from full-length optical core 110 via full-length peripheral surface 116, the surface roughness of full-length peripheral surface 116 is selected such that electromagnetic radiation 118 exits full-length optical core 110 at desired amounts along the length of full-length peripheral surface 116. For example, the surface roughness may create regions of internal reflection of electromagnetic radiation 118 within full-length optical core 110 and may create regions where electromagnetic radiation 118 is permitted to escape full-length optical core 110.

Referring generally to, e.g., FIGS. 2 and 21 and particularly to FIG. 32, according to method 800, at least one full-length optical waveguide 102 is devoid of any cladding that covers full-length optical core 110. The preceding subject matter of this paragraph characterizes example 68 of the present disclosure, wherein example 68 also includes the subject matter according to example 67, above.

As discussed, full-length optical waveguides without any cladding may be less expensive to manufacture than full-length optical waveguides with cladding. Additionally, the difference of refractive indexes between a cladding and resin 124 need not be taken into account when selecting resin 124 for feedstock line 100.

Referring generally to, e.g., FIGS. 1 and 11-14 and particularly to FIG. 32, according to method 800, at least one full-length optical waveguide 102 is a plurality of full-length optical waveguides, interspersed among elongate filaments 104. The preceding subject matter of this paragraph characterizes example 69 of the present disclosure, wherein example 69 also includes the subject matter according to any one of examples 59 to 68, above.

As disused, by including a plurality of full-length optical waveguides, interspersed among elongate filaments 104, such as among a bundle, or tow, of elongate filaments, a desired penetration of electromagnetic radiation 118 into the shadows of elongate filaments 104 is be ensured.

Referring generally to, e.g., FIGS. 1 and 11-14 and particularly to FIG. 32, according to method 800, elongate filaments 104 are at least one of twisted with, woven with, or braided with the plurality of full-length optical waveguides. The preceding subject matter of this paragraph characterizes example 70 of the present disclosure, wherein example 70 also includes the subject matter according to example 69, above.

As discussed, by being twisted with, woven with, or braided with elongate filaments 104, the plurality of full-length optical waveguides is interspersed with elongate filaments 104 so that electromagnetic radiation 118, exiting the full-length optical waveguides, is delivered to regions of interior volume 182 that are in the shadows of elongated filaments 104.

Referring generally to, e.g., FIGS. 1, 4, and 23 and particularly to FIG. 32, method 800 further comprises a step of (block 806) creating feedstock line 100 prior to depositing feedstock line 100 along print path 705. The step of (block 806) creating feedstock line 100 comprises a step of (block 808) dispensing precursor tow 208, comprising elongate filaments 104. The step of (block 806) creating feedstock line 100 also comprises a step of (block 810) separating precursor tow 208 into individual ones of elongate filaments 104 or into subsets 214 of elongate filaments 104. Each of subsets 214 comprises a plurality of elongate filaments 104. The step of (block 806) creating feedstock line 100 further comprises a step of (block 812) dispensing at least one full-length optical waveguide 102. The step of (block 806) creating feedstock line 100 additionally comprises a step of (block 814) combining the individual ones of elongate filaments 104 and at least one full-length optical waveguide 102, or subsets 214 of elongate filaments 104 and at least one full-length optical waveguide 102, into derivative full-length-optical-waveguide tow 209 so that each of elongate filaments 104 and at least one full-length optical waveguide 102 extend along all of feedstock-line length and at least one full-length optical waveguide 102 is interspersed among elongate filaments 104. The step of (block 806) creating feedstock line 100 also comprises a step of (block 816) applying resin 124 to cover elongate filaments 104 and at least one full-length optical waveguide 102 such that elongate filaments 104 and at least one full-length optical waveguide 102 are covered by resin 124 in derivative full-length-optical-waveguide tow 209. The preceding subject matter of this paragraph characterizes example 71 of the present disclosure, wherein example 71 also includes the subject matter according to any one of examples 59 to 70, above.

As discussed in connection with dry-tow full-length-optical-waveguide feedstock-line subsystem 200 of system 700, creating feedstock line 100 from precursor tow 208 permits the use of off-the-shelf reinforcement fiber tows. By separating precursor tow 208 into individual ones of elongate filaments 104 or into subsets 214 of elongate filaments 104, at least one full-length optical waveguide 102 may be operatively interspersed with elongate filaments 104. Covering elongate filaments 104 and full-length optical waveguide 102 with resin 124 ensures that elongate filaments 104 and full-length optical waveguide 102 are wetted and have suitable integrity for additively manufacturing object 136.

Referring generally to, e.g., FIGS. 4, and 23 and particularly to FIG. 32, according to method 800, resin 124 is applied to cover elongate filaments 104 and at least one full-length optical waveguide 102, such that elongate filaments 104 and at least one full-length optical waveguide 102 are covered by resin 124 in derivative full-length-optical-waveguide tow 209, at least one of before or after (block 810) separating precursor tow 208 into the individual ones of elongate filaments 104 or into subsets 214 of elongate filaments 104. The preceding subject matter of this paragraph characterizes example 72 of the present disclosure, wherein example 72 also includes the subject matter according to example 71, above.

In some implementations of method 800, applying resin 124 before precursor tow 208 is separated enables a corresponding system (e.g., system 700 herein and dry-two full-length-optical-waveguide feedstock-line subsystem 200 thereof) to regulate the amount of resin 124 on each individual one of elongate filaments 104 or individual subsets 214 of elongate filaments 104. For example, when a screen or mesh is used to separate precursor tow 208, the screen or mesh may effectively scrape away excess resin 124 leaving only a desired amount on each individual one of elongate filaments 104 or individual subsets 214 of elongate filaments 104 for subsequent combination with full-length optical waveguide(s) to create feedstock line 100.

On the other hand, in some implementations of method 800, applying resin 124 after precursor tow 208 is separated enables a sufficient amount of resin 124 to fully wet elongate filaments 104 and full-length optical waveguide(s).

In some implementations of method 800, resin 124 may be applied both before and after precursor tow 208 is separated.

Referring generally to, e.g., FIGS. 4 and 23 and particularly to FIG. 32, according to method 800, resin 124 is applied to cover elongate filaments 104 and at least one full-length optical waveguide 102, such that elongate filaments 104 and at least one full-length optical waveguide 102 are covered by resin 124 in derivative full-length-optical-waveguide tow 209, at least one of before or after (block 814) combining the individual ones of elongate filaments 104 or subsets 214 of elongate filaments 104 and at least one full-length optical waveguide 102 into derivative full-length-optical-waveguide tow 209. The preceding subject matter of this paragraph characterizes example 73 of the present disclosure, wherein example 73 also includes the subject matter according to example 71 or 72, above.

In some implementations of method 800, applying resin 124 before elongate filaments 104 and at least one full-length optical waveguide 102 are combined enables a sufficient amount of resin 124 to fully wet elongate filaments 104 and full-length optical waveguide(s).

In some implementations of method 800, applying resin 124 after elongate filaments 104 and full-length optical waveguide(s) are combined into derivative full-length-optical-waveguide tow 209 ensures that feedstock line 100 has the overall desired amount of resin 124 therein.

In some implementations of method 800, resin 124 may be applied both before and after elongate filaments 104 and full-length optical waveguide(s) are combined.

Referring generally to, e.g., FIGS. 4 and 23 and particularly to FIG. 32, according to method 800, the step of (block 810) separating precursor tow 208 into individual ones of elongate filaments 104 or into subsets 214 of elongate filaments 104 comprises (block 818) imparting a first electrical charge to elongate filaments 104. The step of (block 816) applying resin 124 to cover elongate filaments 104 and at least one full-length optical waveguide 102, such that elongate filaments 104 and at least one full-length optical waveguide 102 are covered by resin 124 in derivative full-length-optical-waveguide tow 209, comprises (block 820) imparting a second electrical charge to resin 124. The second electrical charge and the first electrical charge have opposite signs. The preceding subject matter of this paragraph characterizes example 74 of the present disclosure, wherein example 74 also includes the subject matter according to any one of examples 71 to 73, above.

As discussed in connection with system 700, by imparting a first electrical charge to elongate filaments 104 and by imparting a second opposite charge to resin 124 as it is applied to elongate filaments 104, resin 124 will be electrostatically attracted to elongate filaments 104, thereby facilitating wetting of elongate filaments 104 with resin 124.

Referring generally to, e.g., FIGS. 4 and 23 and particularly to FIG. 32, according to method 800, the step of (block 814) combining the individual ones of elongate filaments 104 and at least one full-length optical waveguide 102 or subsets 214 of elongate filaments 104 and at least one full-length optical waveguide 102 into derivative full-length-optical-waveguide tow 209 comprises (block 822) at least one of twisting, weaving, or braiding the individual ones of elongate filaments 104 and at least one full-length optical waveguide 102, or subsets 214 of elongate filaments 104 and at least one full-length optical waveguide 102, into derivative full-length-optical-waveguide tow 209. The preceding subject matter of this paragraph characterizes example 75 of the present disclosure, wherein example 75 also includes the subject matter according to any one of examples 71 to 74, above.

Again, by being twisted with, woven with, or braided with elongate filaments 104, at least one full-length optical waveguide 102 is interspersed with elongate filaments 104 so that electromagnetic radiation 118, exiting at least one full-length optical waveguide 102, is delivered to regions of interior volume 182 that are in the shadows of elongated filaments 104.

Referring generally to, e.g., FIGS. 1, 5, and 24 and particularly to FIG. 32, method 800 further comprises a step of (block 824) creating feedstock line 100 prior to depositing feedstock line 100 along print path 705. The step of (block 824) creating feedstock line 100 comprises a step of (block 826) dispensing precursor prepreg tow 908 that comprises elongate filaments 104 and resin 124, covering elongate filaments 104. The step of (block 824) creating feedstock line 100 further comprises a step of (block 828) separating precursor prepreg tow 908 into individual ones of elongate filaments 104, at least partially covered with resin 124, or into subsets 214 of elongate filaments 104, at least partially covered with resin 124. Each of subsets 214 comprises a plurality of elongate filaments 104. The step of (block 824) creating feedstock line 100 also comprises a step of (block 830) dispensing at least one full-length optical waveguide 102. The step of (block 824) creating feedstock line 100 additionally comprises a step of (block 832) combining the individual ones of elongate filaments 104 and at least one full-length optical waveguide 102, or subsets 214 of elongate filaments 104 and at least one full-length optical waveguide 102, into derivative full-length-optical-waveguide prepreg tow 909 so that each of elongate filaments 104 and at least one full-length optical waveguide 102 extend along all of the feedstock-line length and at least one full-length optical waveguide 102 is interspersed among elongate filaments 104. The step of (block 824) creating feedstock line 100 further comprises a step of (block 834) heating at least one of (i) (block 836) resin 124 in precursor prepreg tow 908 prior to separating precursor prepreg tow 908 into the individual ones of elongate filaments 104, at least partially covered with resin 124, or into subsets 214 of elongate filaments 104, at least partially covered with resin 124, to a first threshold temperature to facilitate separating of precursor prepreg tow 908; (ii) (block 838) resin 124, at least partially covering the individual ones of elongate filaments 104 or subsets 214 of elongate filaments 104 following (block 810) separating precursor prepreg tow 908 into the individual ones of elongate filaments 104, at least partially covered with resin 124, or into subsets 214 of elongate filaments 104, at least partially covered with resin 124, and prior to (block 814) combining the individual ones of elongate filaments 104, at least partially covered with resin 124, or into subsets 214 of elongate filaments 104, at least partially covered with resin 124, and at least one full-length optical waveguide 102 into derivative full-length-optical-waveguide prepreg tow 909, to a second threshold temperature to cause wet-out of at least one full-length optical waveguide 102 and elongate filaments 104 in derivative full-length-optical-waveguide prepreg tow 909 by resin 124; or (iii) (block 840) resin 124, at least partially covering elongate filaments 104 in derivative full-length-optical-waveguide prepreg tow 909, to a third threshold temperature to cause wet-out of at least one full-length optical waveguide 102 and elongate filaments 104 in derivative full-length-optical-waveguide prepreg tow 909 by resin 124. The preceding subject matter of this paragraph characterizes example 76 of the present disclosure, wherein example 76 also includes the subject matter according to any one of examples 59 to 70, above.

As discussed in connection with prepreg-tow full-length-optical-waveguide feedstock-line subsystem 900 of system 700, creating feedstock line 100 from precursor prepreg tow 908 permits the use of off-the-shelf prepreg reinforcement fiber tows. By separating precursor prepreg tow 908 into individual ones of elongate filaments 104 or into subsets 214 of elongate filaments 104, at least one full-length optical waveguide 102 may be operatively interspersed with elongate filaments 104. Heating resin 124 facilitates one or both of separation of precursor prepreg tow 908 or wetting-out of elongate filaments 104 and at least one full-length optical waveguide 102 in derivative full-length-optical-waveguide prepreg tow 909.

Referring generally to, e.g., FIGS. 5 and 24 and particularly to FIG. 32, according to method 800, the step of (block 824) creating feedstock line 100 further comprises a step of (block 842) applying additional resin 125 to cover elongate filaments 104 and at least one full-length optical waveguide 102 such that elongate filaments 104 and at least one full-length optical waveguide 102 are covered by resin 124 and additional resin 125 in derivative full-length-optical-waveguide prepreg tow 909. The preceding subject matter of this paragraph characterizes example 77 of the present disclosure, wherein example 77 also includes the subject matter according to example 76, above.

As discussed, by applying additional resin 125 to elongate filaments 104 and full-length optical waveguide(s), full wet-out of elongate filaments 104 and full-length optical waveguide(s) may be achieved in feedstock line 100.

Referring generally to, e.g., FIGS. 5 and 24 and particularly to FIG. 32, according to method 800, additional resin 125 is applied to cover elongate filaments 104 and at least one full-length optical waveguide 102, such that elongate filaments 104 and at least one full-length optical waveguide 102 are covered by resin 124 and additional resin 125 in derivative full-length-optical-waveguide prepreg tow 909, at least one of before or after (block 828) separating precursor prepreg tow 908 into the individual ones of elongate filaments 104, at least partially covered with resin 124, or into subsets 214 of elongate filaments 104, at least partially covered with resin 124. The preceding subject matter of this paragraph characterizes example 78 of the present disclosure, wherein example 78 also includes the subject matter according to example 77, above.

In some implementations of method 800, applying additional resin 125 before precursor prepreg tow 908 is separated enables a corresponding system (e.g., system 700 herein and prepreg-tow full-length-optical-waveguide feedstock-line subsystem 900 thereof) to regulate the amount of additional resin 125 on each individual one of elongate filaments 104 or individual subsets 214 of elongate filaments 104. For example, when a screen or mesh is used to separate precursor prepreg tow 908, the screen or mesh may effectively scrape away excess resin 124 and additional resin 125 leaving only a desired amount on each individual one of elongate filaments 104 or individual subsets 214 of elongate filaments 104 for subsequent combination with full-length optical waveguide(s) to create feedstock line 100.

On the other hand, in some implementations of method 800, applying additional resin 125 after precursor prepreg tow 908 is separated enables a sufficient amount of additional resin 125 to fully wet, with resin 124, elongate filaments 104 and full-length optical waveguide(s).

In some implementations of method 800, additional resin 125 may be applied both before and after precursor prepreg tow 908 is separated.

Referring generally to, e.g., FIGS. 5 and 24 and particularly to FIG. 32, according to method 800, additional resin 125 is applied to cover elongate filaments 104 and at least one full-length optical waveguide 102, such that elongate filaments 104 and at least one full-length optical waveguide 102 are covered by resin 124 and additional resin 125 in derivative full-length-optical-waveguide prepreg tow 909, at least one of before or after (block 832) combining the individual ones of elongate filaments 104, at least partially covered with resin 124, or subsets 214 of elongate filaments 104, at least partially covered with resin 124, and at least one full-length optical waveguide 102 into derivative full-length-optical-waveguide prepreg tow 909. The preceding subject matter of this paragraph characterizes example 79 of the present disclosure, wherein example 79 also includes the subject matter according to example 77 or 78, above.

In some implementations of method 800, applying additional resin 125 before elongate filaments 104 and at least one full-length optical waveguide 102 are combined enables a sufficient amount of resin 124 and additional resin 125 to fully wet elongate filaments 104 and full-length optical waveguide(s).

In some implementations of method 800, applying additional resin 125 after elongate filaments 104 and full-length optical waveguide(s) are combined into derivative full-length-optical-waveguide prepreg tow 909 ensures that feedstock line 100 has the overall desired amount of resin 124 and additional resin 125 therein.

In some implementations of method 800, additional resin 125 may be applied both before and after elongate filaments 104 and full-length optical waveguide(s) are combined.

Referring generally to, e.g., FIGS. 5 and 24 and particularly to FIG. 32, according to method 800, the step of (block 828) separating precursor prepreg tow 908 into individual ones of elongate filaments 104, at least partially covered with resin 124, or into subsets 214 of elongate filaments 104, at least partially covered with resin 124, comprises (block 844) imparting a first electrical charge to elongate filaments 104 or to resin 124. The step of (block 842) applying additional resin 125 to cover elongate filaments 104 and at least one full-length optical waveguide 102, such that elongate filaments 104 and at least one full-length optical waveguide 102 are covered by resin 124 and additional resin 125 in derivative full-length-optical-waveguide prepreg tow 909, comprises (block 846) imparting a second electrical charge to additional resin 125. The second electrical charge and the first electrical charge have opposite signs. The preceding subject matter of this paragraph characterizes example 80 of the present disclosure, wherein example 80 also includes the subject matter according to any one of examples 77 to 79, above.

As discussed in connection with prepreg-tow full-length-optical-waveguide feedstock-line subsystem 900 of system 700, by imparting a first electrical charge to elongate filaments 104 or resin 124 and by imparting a second opposite charge to additional resin 125 as it is applied to elongate filaments 104 and resin 124, additional resin 125 will be electrostatically attracted to elongate filaments 104.

Referring generally to, e.g., FIGS. 5 and 24 and particularly to FIG. 32, according to method 800, the step of (block 832) combining the individual ones of elongate filaments 104, at least partially covered with resin 124, and at least one full-length optical waveguide 102 or subsets 214 of elongate filaments 104, at least partially covered with resin 124, and at least one full-length optical waveguide 102 into derivative full-length-optical-waveguide prepreg tow 909 comprises (block 848) at least one of twisting, weaving, or braiding the individual ones of elongate filaments 104, at least partially covered with resin 124, and at least one full-length optical waveguide 102, or subsets 214 of elongate filaments 104, at least partially covered with resin 124, and at least one full-length optical waveguide 102, into derivative full-length-optical-waveguide prepreg tow 909. The preceding subject matter of this paragraph characterizes example 81 of the present disclosure, wherein example 81 also includes the subject matter according to any one of examples 76 to 80, above.

Again, by being twisted with, woven with, or braided with elongate filaments 104, at least one full-length optical waveguide 102 is interspersed with elongate filaments 104 so that electromagnetic radiation 118, exiting at least one full-length optical waveguide 102, is delivered to regions of interior volume 182 that are in the shadows of elongate filaments 104.

Referring generally to, e.g., FIGS. 1, 3, 12, 14, 16, and 18-21 and particularly to FIG. 32, according to method 800, at least one optical modifier 123 comprises partial-length optical waveguides 122. Each of partial-length optical waveguides 122 comprises partial-length optical core 138. Partial-length optical core 138 of each of partial-length optical waveguides 122 comprises first partial-length-optical-core end face 140, second partial-length-optical-core end face 142, opposite first partial-length-optical-core end face 140, and partial-length peripheral surface 144, extending between first partial-length-optical-core end face 140 and second partial-length-optical-core end face 142. The step of (block 804) directing electromagnetic radiation 118 at exterior surface 180 of feedstock line 100 after feedstock line 100 is deposited by delivery guide 704 along print path 705 causes electromagnetic radiation 118 to enter partial-length optical core 138 via at least one of first partial-length-optical-core end face 140, second partial-length-optical-core end face 142, or partial-length peripheral surface 144, which in turn causes at least a portion of electromagnetic radiation 118 to exit partial-length optical core 138 via partial-length peripheral surface 144 to irradiate, in interior volume 182 of feedstock line 100, resin 124 that, due at least in part to elongate filaments 104, is not directly accessible to electromagnetic radiation 118, incident on exterior surface 180 of feedstock line 100. The preceding subject matter of this paragraph characterizes example 82 of the present disclosure, wherein example 82 also includes the subject matter according to any one of examples 57 to 70, above.

As discussed, partial-length optical waveguides 122 may be cost effective to create, such as according to the various methods disclosed herein. Moreover, by being interspersed among elongate filaments 104, partial-length optical waveguides 122 may directly receive electromagnetic radiation 118 and deliver electromagnetic radiation 118 into the shadows of elongate filaments 104.

Referring generally to, e.g., FIGS. 3 and 18-20 and particularly to FIG. 32, according to method 800, partial-length optical core 138 has a partial-length-optical-core refractive index. Each of partial-length optical waveguides 122 further comprises partial-length-optical-core cladding 160, at least partially covering partial-length optical core 138. Partial-length-optical-core cladding 160 comprises at least first partial-length-optical-core cladding resin 162, having a partial-length-optical-core first-cladding-resin refractive index. Partial-length-optical-core cladding 160 is non-uniform along each of partial-length optical waveguides 122. The partial-length-optical-core refractive index is greater than the partial-length-optical-core first-cladding-resin refractive index. The preceding subject matter of this paragraph characterizes example 83 of the present disclosure, wherein example 83 also includes the subject matter according to example 82, above.

As discussed, by being non-uniform along the length of partial-length optical waveguides 122, electromagnetic radiation 118 is permitted to exit partial-length optical core 138 via partial-length peripheral surface 144. Moreover, by first partial-length-optical-core cladding resin 162 having a refractive index that is lower than that of partial-length optical core 138, electromagnetic radiation 118, upon entering partial-length optical core 138, is trapped within partial-length optical core 138 other than the regions where first partial-length-optical-core cladding resin 162 is not present. As a result, partial-length optical waveguides 122 may be constructed to provide a desired amount of electromagnetic radiation 118, exiting various positions along partial-length peripheral surface 144, such as to ensure a desired amount of electromagnetic radiation 118, penetrating the shadows of elongate filaments 104.

Referring generally to, e.g., FIGS. 3, 19, and 20 and particularly to FIG. 32, according to method 800, partial-length peripheral surface 144 of partial-length optical core 138 of each of partial-length optical waveguides 122 has partial-length-peripheral-surface regions 129, devoid of first partial-length-optical-core cladding resin 162. Partial-length-optical-core cladding 160 further comprises second partial-length-optical-core cladding resin 164, having a partial-length-optical-core second-cladding-resin refractive index. Second partial-length-optical-core cladding resin 164 covers partial-length-peripheral-surface regions 129 of partial-length peripheral surface 144. The partial-length-optical-core second-cladding-resin refractive index is greater than the partial-length-optical-core first-cladding-resin refractive index. The preceding subject matter of this paragraph characterizes example 84 of the present disclosure, wherein example 84 also includes the subject matter according to example 83, above.

As discussed, by covering partial-length-peripheral-surface regions 129 with second partial-length-optical-core cladding resin 164, a desired refractive index thereof may be selected to optimize how electromagnetic radiation 118 exits partial-length peripheral surface 144. Additionally or alternatively, with partial-length-peripheral-surface regions 129 covered with second partial-length-optical-core cladding resin 164, the integrity of first partial-length-optical-core cladding resin 162 may be ensured, such that it does not peel or break off during storage of partial-length optical waveguides 122 or during construction and use of feedstock line 100.

Referring generally to, e.g., FIGS. 3 and 20 and particularly to FIG. 32, according to method 800, second partial-length-optical-core cladding resin 164 also covers first partial-length-optical-core cladding resin 162. The preceding subject matter of this paragraph characterizes example 85 of the present disclosure, wherein example 85 also includes the subject matter according to example 84, above.

As discussed, such partial-length optical waveguides 122 may be more easily manufactured, in that partial-length optical core 138 with first partial-length-optical-core cladding resin 162 simply may be fully coated with second partial-length-optical-core cladding resin 164. Additionally or alternatively, the integrity of partial-length optical waveguides 122 may be maintained during storage thereof and during construction and use of feedstock line 100.

Referring generally to, e.g., FIGS. 1, 3, 19, and 20 and particularly to FIG. 32, according to method 800, resin 124 has a resin refractive index. The resin refractive index is greater than the partial-length-optical-core second-cladding-resin refractive index. The preceding subject matter of this paragraph characterizes example 86 of the present disclosure, wherein example 86 also includes the subject matter according to example 84 or 85, above.

As discussed, because second partial-length-optical-core cladding resin 164 has a refractive index that is lower than that of resin 124, electromagnetic radiation 118 exits second partial-length-optical-core cladding resin 164 to penetrate and cure resin 124.

Referring generally to, e.g., FIGS. 3 and 21 and particularly to FIG. 32, according to method 800, partial-length peripheral surface 144 of partial-length optical core 138 of each of partial-length optical waveguides 122 has a surface roughness that is selected such that when electromagnetic radiation 118 enters partial-length optical core 138 via at least one of first partial-length-optical-core end face 140, second partial-length-optical-core end face 142, or partial-length peripheral surface 144, at least a portion of electromagnetic radiation 118 exits partial-length optical core 138 via partial-length peripheral surface 144 to irradiate, in interior volume 182 of feedstock line 100, resin 124 that, due at least in part to elongate filaments 104, is not directly accessible to electromagnetic radiation 118, incident on exterior surface 180 of feedstock line 100. The preceding subject matter of this paragraph characterizes example 87 of the present disclosure, wherein example 87 also includes the subject matter according to example 82, above.

As discussed, rather than relying on refractive-index properties of a cladding to ensure desired dispersal of electromagnetic radiation 118 from partial-length optical core 138 via partial-length peripheral surface 144, the surface roughness of partial-length peripheral surface 144 results in electromagnetic radiation 118 exiting partial-length optical core 138 at desired amounts along the length of partial-length peripheral surface 144. For example, the surface roughness creates regions of internal reflection of electromagnetic radiation 118 within partial-length optical core 138 and creates regions where electromagnetic radiation 118 escapes partial-length optical core 138.

Referring generally to, e.g., FIGS. 3 and 21 and particularly to FIG. 32, according to method 800, each of partial-length optical waveguides 122 is devoid of any cladding that covers partial-length optical core 138. The preceding subject matter of this paragraph characterizes example 88 of the present disclosure, wherein example 88 also includes the subject matter according to example 87, above.

As discussed, partial-length optical waveguides 122 without any cladding may be less expensive to manufacture than partial-length optical waveguides 122 with cladding. Additionally, the difference of refractive indexes between a cladding and resin 124 need not be taken into account when selecting resin 124 for feedstock line 100.

Referring generally to, e.g., FIGS. 1, 6, and 25 and particularly to FIG. 32, method 800 further comprises a step of (block 850) creating feedstock line 100 prior to depositing feedstock line 100 along print path 705. The step of (block 850) creating feedstock line 100 comprises a step of (block 852) dispensing precursor tow 208, comprising elongate filaments 104. The step of (block 850) creating feedstock line 100 further comprises a step of (block 854) separating precursor tow 208 into individual ones of elongate filaments 104 or into subsets 214 of elongate filaments 104. Each of subsets 214 comprises a plurality of elongate filaments 104. The step of (block 850) creating feedstock line 100 also comprises a step of (block 856) applying partial-length optical waveguides 122 to the individual ones of elongate filaments 104 or to subsets 214 of elongate filaments 104. The step of (block 850) creating feedstock line 100 additionally comprises a step of (block 858) combining the individual ones of elongate filaments 104 and partial-length optical waveguides 122 or subsets 214 of elongate filaments 104 and partial-length optical waveguides 122 into derivative partial-length-optical-waveguide tow 1009 so that partial-length optical waveguides 122 are interspersed among elongate filaments 104. The step of (block 850) creating feedstock line 100 further comprises a step of (block 860) applying resin 124 to cover elongate filaments 104 and partial-length optical waveguides 122 such that elongate filaments 104 and partial-length optical waveguides 122 are covered with resin 124 in derivative partial-length-optical-waveguide tow 1009. The preceding subject matter of this paragraph characterizes example 89 of the present disclosure, wherein example 89 also includes the subject matter according to any one of examples 82 to 88, above.

As discussed in connection with dry-tow partial-length-optical-waveguide feedstock-line subsystem 1000 of system 700, creating feedstock line 100 from precursor tow 208 permits the use of off-the-shelf reinforcement fiber tows. By separating precursor tow 208 into individual ones of elongate filaments 104 or into subsets 214 of elongate filaments 104, partial-length optical waveguides 122 may be operatively interspersed with elongate filaments 104. Covering elongate filaments 104 and partial-length optical waveguides 122 with resin 124 ensures that elongate filaments 104 and partial-length optical waveguides 122 are wetted and have suitable integrity for additively manufacturing object 136. Referring generally to, e.g., FIGS. 6 and 25 and particularly to FIG. 32, according to method 800, resin 124 is applied to cover elongate filaments 104 and partial-length optical waveguides 122, such that elongate filaments 104 and partial-length optical waveguides 122 are covered with resin 124 in derivative partial-length-optical-waveguide tow 1009, at least one of before or after (block 854) separating precursor tow 208 into the individual ones of elongate filaments 104 or subsets 214 of elongate filaments 104. The preceding subject matter of this paragraph characterizes example 90 of the present disclosure, wherein example 90 also includes the subject matter according to example 89, above.

In some implementations of method 800, applying resin 124 before precursor tow 208 is separated enables a corresponding system (e.g., system 700 herein and dry-tow partial-length-optical-waveguide feedstock-line subsystem 1000 thereof) to regulate the amount of resin 124 on each individual one of elongate filaments 104 or individual subsets 214 of elongate filaments 104. For example, when a screen or mesh is used to separate precursor tow 208, the screen or mesh may effectively scrape away excess resin 124 leaving only a desired amount on each individual one of elongate filaments 104 or individual subsets 214 of elongate filaments 104 for subsequent combination with partial-length optical waveguides 122 to create feedstock line 100.

On the other hand, in some implementations of method 800, applying resin 124 after precursor tow 208 is separated enables a sufficient amount of resin 124 to fully wet elongate filaments 104 and partial-length optical waveguides 122.

In some implementations of method 800, resin 124 may be applied both before and after precursor tow 208 is separated.

Referring generally to, e.g., FIGS. 6 and 25 and particularly to FIG. 32, according to method 800, resin 124 is applied to cover elongate filaments 104 and partial-length optical waveguides 122, such that elongate filaments 104 and partial-length optical waveguides 122 are covered with resin 124 in derivative partial-length-optical-waveguide tow 1009, at least one of before or after (block 874) combining individual ones of elongate filaments 104 and partial-length optical waveguides 122 or subsets 214 of elongate filaments 104 and partial-length optical waveguides 122 into derivative partial-length-optical-waveguide tow 1009 so that partial-length optical waveguides 122 are interspersed among elongate filaments 104. The preceding subject matter of this paragraph characterizes example 91 of the present disclosure, wherein example 91 also includes the subject matter according to example 89 or 90, above.

In some implementations of method 800, applying resin 124 before elongate filaments 104 and partial-length optical waveguides 122 are combined enables a sufficient amount of resin 124 to fully wet elongate filaments 104 and partial-length optical waveguides 122.

In some implementations of method 800, applying resin 124 after elongate filaments 104 and partial-length optical waveguides 122 are combined into derivative partial-length-optical-waveguide tow 1009 ensures that feedstock line 100 has the overall desired amount of resin 124 therein.

In some implementations of method 800, resin 124 may be applied both before and after elongate filaments 104 and partial-length optical waveguides 122 are combined.

Referring generally to, e.g., FIGS. 6 and 25 and particularly to FIG. 32, according to method 800, the step of (block 854) separating precursor tow 208 into individual ones of elongate filaments 104 or into subsets 214 of elongate filaments 104 comprises (block 862) imparting a first electrical charge to elongate filaments 104. The step of (block 860) applying resin 124 to cover elongate filaments 104 and partial-length optical waveguides 122 such that elongate filaments 104 and partial-length optical waveguides 122 are covered with resin 124 in derivative partial-length-optical-waveguide tow 1009 comprises (block 864) imparting a second electrical charge to resin 124. The second electrical charge and the first electrical charge have opposite signs. The preceding subject matter of this paragraph characterizes example 92 of the present disclosure, wherein example 92 also includes the subject matter according to any one of examples 89 to 91, above.

As discussed in connection with dry-tow partial-length-optical-waveguide feedstock-line subsystem 1000 thereof, by imparting a first electrical charge to elongate filaments 104 and by imparting a second opposite charge to resin 124 as it is applied to elongate filaments 104, resin 124 will be electrostatically attracted to elongate filaments 104, thereby facilitating wetting of elongate filaments 104 with resin 124.

Referring generally to, e.g., FIGS. 1, 7, 26 and particularly to FIG. 32, method 800 further comprises a step of (block 866) creating feedstock line 100 prior to depositing feedstock line 100 along print path 705. The step of (block 866) creating feedstock line 100 comprises a step of (block 868) dispensing precursor prepreg tow 908 that comprises elongate filaments 104 and resin 124, covering elongate filaments 104. The step of (block 866) creating feedstock line 100 further comprises a step of (block 870) separating precursor prepreg tow 908 into individual ones of elongate filaments 104, at least partially covered with resin 124, or into subsets 214 of elongate filaments 104, at least partially covered with resin 124. Each of subsets 214 comprises a plurality of elongate filaments 104. The step of (block 866) creating feedstock line 100 also comprises a step of (block 872) applying partial-length optical waveguides 122 to the individual ones of elongate filaments 104, at least partially covered with resin 124, or to subsets 214 of elongate filaments 104, at least partially covered with resin 124. The step of (block 866) creating feedstock line 100 additionally comprises a step of (block 874) combining the individual ones of elongate filaments 104, at least partially covered with resin 124, and partial-length optical waveguides 122, or subsets 214 of elongate filaments 104, at least partially covered with resin 124, and partial-length optical waveguides 122, into derivative partial-length-optical-waveguide prepreg tow 1209 so that partial-length optical waveguides 122 are interspersed among elongate filaments 104. The step of (block 866) creating feedstock line 100 further comprises a step of (block 876) heating at least one of (i) (block 878) resin 124 in precursor prepreg tow 908 prior to separating precursor prepreg tow 908 into the individual ones of elongate filaments 104, at least partially covered with resin 124, or into subsets 214 of elongate filaments 104, at least partially covered with resin 124, to a first threshold temperature to facilitate separating of precursor prepreg tow 908; (ii) (block 880) resin 124 at least partially covering the individual ones of elongate filaments 104 or subsets 214 of elongate filaments 104 following (block 870) separating precursor prepreg tow 908 into the individual ones of elongate filaments 104, at least partially covered with resin 124, or into subsets 214 of elongate filaments 104, at least partially covered with resin 124, and prior to (block 874) combining the individual ones of elongate filaments 104, at least partially covered with resin 124, and partial-length optical waveguides 122, or subsets 214 of elongate filaments 104, at least partially covered with resin 124, and partial-length optical waveguides 122, into derivative partial-length-optical-waveguide prepreg tow 1209, to a second threshold temperature to cause wet-out of partial-length optical waveguides 122 and elongate filaments 104 in derivative partial-length-optical-waveguide prepreg tow 1209 by resin 124; or (iii) (block 882) resin 124 at least partially covering elongate filaments 104 in derivative partial-length-optical-waveguide prepreg tow 1209, to a third threshold temperature to cause wet-out of partial-length optical waveguides 122 and elongate filaments 104 in derivative partial-length-optical-waveguide prepreg tow 1209 by resin 124. The preceding subject matter of this paragraph characterizes example 93 of the present disclosure, wherein example 93 also includes the subject matter according to any one of examples 82 to 88, above.

As discussed in connection with prepreg-tow partial-length-optical-waveguide feedstock-line subsystem 1200 of system 700, creating feedstock line 100 from precursor prepreg tow 908 permits the use of off-the-shelf prepreg reinforcement fiber tows. By separating precursor prepreg tow 908 into individual ones of elongate filaments 104 or into subsets 214 of elongate filaments 104, partial-length optical waveguides 122 may be operatively interspersed with elongate filaments 104. Heating resin 124 facilitates one or both of separation of precursor prepreg tow 908 or wetting-out of elongate filaments 104 and partial-length optical waveguides 122 in derivative partial-length-optical-waveguide prepreg tow 1209.

Referring generally to, e.g., FIGS. 7 and 26 and particularly to FIG. 32, according to method 800, the step of (block 824) creating feedstock line 100 further comprises a step of (block 842) applying additional resin 125 to cover elongate filaments 104 and partial-length optical waveguides 122 such that elongate filaments 104 and partial-length optical waveguides 122 are covered by resin 124 and additional resin 125 in derivative partial-length-optical-waveguide prepreg tow 1209. The preceding subject matter of this paragraph characterizes example 94 of the present disclosure, wherein example 94 also includes the subject matter according to example 93, above.

As discussed, by applying additional resin 125 to elongate filaments 104 and partial-length optical waveguides 122, full wet-out of elongate filaments 104 and partial-length optical waveguides 122 may be achieved in feedstock line 100.

Referring generally to, e.g., FIGS. 7 and 26 and particularly to FIG. 32, according to method 800, additional resin 125 is applied to cover elongate filaments 104 and partial-length optical waveguides 122, such that elongate filaments 104 and partial-length optical waveguides 122 are covered by resin 124 and additional resin 125 in derivative partial-length-optical-waveguide prepreg tow 1209, at least one of before or after (block 870) separating precursor prepreg tow 908 into the individual ones of elongate filaments 104, at least partially covered with resin 124, or into subsets 214 of elongate filaments 104, at least partially covered with resin 124. The preceding subject matter of this paragraph characterizes example 95 of the present disclosure, wherein example 95 also includes the subject matter according to example 94, above.

In some implementations of method 800, applying additional resin 125 before precursor prepreg tow 908 is separated enables a corresponding system (e.g., system 700 herein and prepreg-tow partial-length-optical-waveguide feedstock-line subsystem 1200 thereof) to regulate the amount of additional resin 125 on each individual one of elongate filaments 104 or individual subsets 214 of elongate filaments 104. For example, when a screen or mesh is used to separate precursor prepreg tow 908, the screen or mesh may effectively scrape away excess resin 124 and additional resin 125 leaving only a desired amount on each individual one of elongate filaments 104 or individual subsets 214 of elongate filaments 104 for subsequent combination with partial-length optical waveguides 122 to create feedstock line 100.

On the other hand, in some implementations of method 800, applying additional resin 125 after precursor prepreg tow 908 is separated enables a sufficient amount of additional resin 125 to fully wet, with resin 124, elongate filaments 104 and partial-length optical waveguides 122.

In some implementations of method 800, additional resin 125 may be applied both before and after precursor prepreg tow 908 is separated.

Referring generally to, e.g., FIGS. 7 and 26 and particularly to FIG. 32, according to method 800, additional resin 125 is applied to cover elongate filaments 104 and partial-length optical waveguides 122, such that elongate filaments 104 and partial-length optical waveguides 122 are covered by resin 124 and additional resin 125 in derivative partial-length-optical-waveguide prepreg tow 1209, at least one of before or after (block 874) combining the individual ones of elongate filaments 104, at least partially covered with resin 124, or subsets 214 of elongate filaments 104, at least partially covered with resin 124, and partial-length optical waveguides 122 into derivative partial-length-optical-waveguide prepreg tow 1209. The preceding subject matter of this paragraph characterizes example 96 of the present disclosure, wherein example 96 also includes the subject matter according to example 94 or 95, above.

In some implementations of method 800, applying additional resin 125 before elongate filaments 104 and partial-length optical waveguides 122 are combined enables a sufficient amount of resin 124 and additional resin 125 to fully wet elongate filaments 104 and partial-length optical waveguides 122.

In some implementations of method 800, applying additional resin 125 after elongate filaments 104 and partial-length optical waveguides 122 are combined into derivative partial-length-optical-waveguide prepreg tow 1209 ensures that feedstock line 100 has the overall desired amount of resin 124 and additional resin 125 therein.

In some implementations of method 800, additional resin 125 may be applied both before and after elongate filaments 104 and partial-length optical waveguides 122 are combined.

Referring generally to, e.g., FIGS. 7 and 26 and particularly to FIG. 32, according to method 800, the step of (block 870) separating precursor prepreg tow 908 into individual ones of elongate filaments 104, at least partially covered with resin 124, or into subsets 214 of elongate filaments 104, at least partially covered with resin 124, comprises (block 886) imparting a first electrical charge to elongate filaments 104 or to resin 124. The step of (block 884) applying additional resin 125 to cover elongate filaments 104 and partial-length optical waveguides 122, such that elongate filaments 104 and partial-length optical waveguides 122 are covered by resin 124 and additional resin 125 in derivative partial-length-optical-waveguide prepreg tow 1209, comprises (block 888) imparting a second electrical charge to additional resin 125. The second electrical charge and the first electrical charge have opposite signs. The preceding subject matter of this paragraph characterizes example 97 of the present disclosure, wherein example 97 also includes the subject matter according to any one of examples 94 to 96, above.

As discussed in connection with prepreg-tow partial-length-optical-waveguide feedstock-line subsystem 1200 of system 700, by imparting a first electrical charge to elongate filaments 104 or resin 124 and by imparting a second opposite charge to additional resin 125 as it is applied to elongate filaments 104 and resin 124, additional resin 125 will be electrostatically attracted to elongate filaments 104.

Referring generally to, e.g., FIGS. 1, 13-15, and 29-31 and particularly to FIG. 32, according to method 800, at least one optical modifier 123 comprises optical direction-modifying particles 186. The step of (block 804) directing electromagnetic radiation 118 at exterior surface 180 of feedstock line 100 after feedstock line 100 is deposited by delivery guide 704 along print path 705 causes electromagnetic radiation 118 to strike outer surface 184 of at least some of optical direction-modifying particles 186, which in turn causes electromagnetic radiation 118 to at least one of reflect, refract, diffract, or Rayleigh-scatter electromagnetic radiation 118, to disperse, in interior volume 182 of feedstock line 100, electromagnetic radiation 118 to irradiate resin 124 that, due at least in part to elongate filaments 104, is not directly accessible to electromagnetic radiation 118, incident on exterior surface 180 of feedstock line 100. The preceding subject matter of this paragraph characterizes example 98 of the present disclosure, wherein example 98 also includes the subject matter according to any one of examples 57 to 70 or 82 to 88, above.

As discussed in connection with system 700, inclusion of optical direction-modifying particles 186 that at least one of reflect, refract, diffract, or Rayleigh-scatter electromagnetic radiation 118 facilitates dispersion of electromagnetic radiation 118 within interior volume 182 for irradiation of resin 124 therein.

Referring generally to, e.g., FIGS. 13-15 and 29-31 and particularly to FIG. 32, according to method 800, each of elongate filaments 104 has a minimum outer dimension. Each of optical direction-modifying particles 186 has a maximum outer dimension that is less than one-eighth the minimum outer dimension of any one of elongate filaments 104. The preceding subject matter of this paragraph characterizes example 99 of the present disclosure, wherein example 99 also includes the subject matter according to example 98, above.

As discussed, by having a maximum outer dimension that is less than one-eighth the minimum outer dimension of elongate filaments 104, optical direction-modifying particles 186 easily extend among elongate filaments 104. Moreover, when feedstock line 100 is being constructed, optical direction-modifying particles 186 may easily flow with resin 124 or additional resin 125 into a bundle, or tow, of elongate filaments 104.

Referring generally to, e.g., FIGS. 13-15 and 29-31 and particularly to FIG. 32, according to method 800, each of optical direction-modifying particles 186 has a maximum outer dimension that is less than 1000 nm, 500 nm, 250 nm, or 200 nm. The preceding subject matter of this paragraph characterizes example 100 of the present disclosure, wherein example 100 also includes the subject matter according to example 98 or 99, above.

As discussed, by having a maximum outer dimension that is less than 1000 nm (1 micron), 500 nm (0.5 micron), 250 nm (0.25 micron), or 200 nm (0.200 micron), optical direction-modifying particles 186 easily extend between typical sizes of elongate filaments 104. Moreover, when feedstock line 100 is being constructed, optical direction-modifying particles 186 may easily flow with resin 124 or additional resin 125 into a bundle, or tow, of elongate filaments 104.

Referring generally to, e.g., FIGS. 13-15 and 29-31 and particularly to FIG. 32, according to method 800, electromagnetic radiation 118 has a wavelength. Each of optical direction-modifying particles 186 has a minimum outer dimension that is greater than one-fourth the wavelength of electromagnetic radiation 118. The preceding subject matter of this paragraph characterizes example 101 of the present disclosure, wherein example 101 also includes the subject matter according to any one of examples 98 to 100, above.

As discussed, selecting a minimum outer dimension of optical direction-modifying particles 186 that is greater than one-fourth the wavelength of electromagnetic radiation 118 ensures that optical direction-modifying particles 186 will cause electromagnetic radiation 118 to reflect, refract, or diffract upon hitting optical direction-modifying particles 186.

Referring generally to, e.g., FIGS. 13-15 and 29-31 and particularly to FIG. 32, according to method 800, each of optical direction-modifying particles 186 has a minimum outer dimension that is greater than or equal to 50 nm or that is greater than or equal to 100 nm. The preceding subject matter of this paragraph characterizes example 102 of the present disclosure, wherein example 102 also includes the subject matter according to any one of examples 98 to 101, above.

As discussed, ultra-violet light having a wavelength of about 400 nm is often used in connection with ultra-violet photopolymers. Accordingly, when resin 124 comprises or consists of a photopolymer, optical direction-modifying particles 186 having a minimum outer dimension that is greater than or equal to 100 nm ensures that optical direction-modifying particles 186 cause electromagnetic radiation 118 to reflect, refract, or diffract upon hitting optical direction-modifying particles 186.

Referring generally to, e.g., FIGS. 1 and 13-15 and particularly to FIG. 32, according to method 800, optical direction-modifying particles 186 comprise less than 10% by weight of resin 124, less than 5% by weight of resin 124, or less than 1% by weight of resin 124 of feedstock line 100. The preceding subject matter of this paragraph characterizes example 103 of the present disclosure, wherein example 103 also includes the subject matter according to any one of examples 98 to 102, above.

As discussed, by limiting optical direction-modifying particles 186 to the referenced threshold percentages, resin 124 will operatively flow among elongate filaments 104 when feedstock line 100 is being constructed. In addition, desired properties of resin 124, feedstock line 100, and ultimately object 136 will not be negatively impacted by the presence of optical direction-modifying particles 186.

Referring generally to, e.g., FIGS. 1 and 29-31 and particularly to FIG. 32, according to method 800, outer surfaces 184 of at least some of optical direction-modifying particles 186 are faceted. The preceding subject matter of this paragraph characterizes example 104 of the present disclosure, wherein example 104 also includes the subject matter according to any one of examples 98 to 103, above.

As discussed, by being faceted, outer surfaces 184 effectively scatter electromagnetic radiation 118.

Referring generally to, e.g., FIGS. 1, 13-15, and 29-31 and particularly to FIG. 32, according to method 800, outer surfaces 184 of at least some of optical direction-modifying particles 186 have a surface roughness that is selected such that electromagnetic radiation 118 that strikes outer surfaces 184 is scattered in interior volume 182 of feedstock line 100 to irradiate resin 124 that, due at least in part to elongate filaments 104, is not directly accessible to electromagnetic radiation 118, incident on exterior surface 180 of feedstock line 100. The preceding subject matter of this paragraph characterizes example 105 of the present disclosure, wherein example 105 also includes the subject matter according to any one of examples 98 to 104, above.

As discussed, having a surface roughness selected to scatter electromagnetic radiation 118 facilitates the operative irradiation of resin 124 throughout interior volume 182, including into the shadows of elongate filaments 104.

Referring generally to, e.g., FIGS. 1 and 13-15 and particularly to FIG. 32, according to method 800, resin 124 has a resin refractive index. At least some of optical direction-modifying particles 186 have a particle refractive index. The particle refractive index is higher than or lower than the resin refractive index. The preceding subject matter of this paragraph characterizes example 106 of the present disclosure, wherein example 106 also includes the subject matter according to any one of examples 98 to 105, above.

As discussed, when optical direction-modifying particles 186 have a refractive index that is different from (e.g., that is at least 0.001 greater or less than) the refractive index of resin 124, electromagnetic radiation 118 incident upon the outer surfaces thereof will necessarily leave the outer surfaces at a different angle, and thus will scatter throughout resin 124, including into the shadows of elongate filaments 104.

Referring generally to, e.g., FIGS. 1 and 29 and particularly to FIG. 32, according to method 800, at least some of optical direction-modifying particles 186 are spherical. The preceding subject matter of this paragraph characterizes example 107 of the present disclosure, wherein example 107 also includes the subject matter according to any one of examples 98 to 106, above.

As discussed, by being spherical, optical direction-modifying particles 186, when feedstock line 100 is being constructed, may easily flow with resin 124 or additional resin 125 into a bundle, or tow, of elongate filaments 104.

Referring generally to, e.g., FIGS. 1 and 30 and particularly to FIG. 32, according to method 800, at least some of optical direction-modifying particles 186 are prismatic. The preceding subject matter of this paragraph characterizes example 108 of the present disclosure, wherein example 108 also includes the subject matter according to any one of examples 98 to 107, above.

As discussed, by being prismatic, optical direction-modifying particles 186 may be selected to operatively at least one of reflect, refract, or diffract electromagnetic radiation 118.

Referring generally to, e.g., FIGS. 1, 8, 27 and particularly to FIG. 32, method 800 further comprises a step of (block 890) creating feedstock line 100 prior to depositing feedstock line 100 along print path 705. The step of (block 890) creating feedstock line 100 comprises a step of (block 892) dispensing precursor tow 208, comprising elongate filaments 104. The step of (block 890) creating feedstock line 100 further comprises a step of (block 894) separating precursor tow 208 into individual ones of elongate filaments 104 or into subsets 214 of elongate filaments 104, wherein each of subsets 214 comprises a plurality of elongate filaments 104. The step of (block 890) creating feedstock line 100 also comprises a step of (block 896) applying optical direction-modifying particles 186 to the individual ones of elongate filaments 104 or to subsets 214 of elongate filaments 104. The step of (block 890) creating feedstock line 100 additionally comprises a step of (block 898) combining the individual ones of elongate filaments 104 and optical direction-modifying particles 186 or subsets 214 of elongate filaments 104 and optical direction-modifying particles 186 into derivative particle tow 1309 so that optical direction-modifying particles 186 are interspersed among elongate filaments 104. The step of (block 890) creating feedstock line 100 further comprises a step of (block 801) applying resin 124 to cover elongate filaments 104 and optical direction-modifying particles 186 such that elongate filaments 104 and optical direction-modifying particles 186 are covered with resin 124 in derivative particle tow 1309. The preceding subject matter of this paragraph characterizes example 109 of the present disclosure, wherein example 109 also includes the subject matter according to any one of examples 98 to 108, above.

As discussed in connection with dry-tow particle feedstock-line subsystem 1300 of system 700, creating feedstock line 100 from precursor tow 208 permits the use of off-the-shelf reinforcement fiber tows. By separating precursor tow 208 into individual ones of elongate filaments 104 or into subsets 214 of elongate filaments 104, optical direction-modifying particles 186 may be operatively interspersed with elongate filaments 104. Covering elongate filaments 104 and optical direction-modifying particles 186 with resin 124 ensures that elongate filaments 104 and optical direction-modifying particles 186 are wetted and have suitable integrity for additively manufacturing object 136.

Referring generally to, e.g., FIGS. 8 and 27 and particularly to FIG. 32, according to method 800, resin 124 is applied to cover elongate filaments 104 and optical direction-modifying particles 186, such that elongate filaments 104 and optical direction-modifying particles 186 are covered with resin 124 in derivative particle tow 1309, at least one of before or after (block 894) separating precursor tow 208 into the individual ones of elongate filaments 104 or subsets 214 of elongate filaments 104. The preceding subject matter of this paragraph characterizes example 110 of the present disclosure, wherein example 110 also includes the subject matter according to example 109, above.

In some implementations of method 800, applying resin 124 before precursor tow 208 is separated enables a corresponding system (e.g., system 700 herein and dry-tow particle feedstock-line subsystem 1300 thereof) to regulate the amount of resin 124 on each individual one of elongate filaments 104 or individual subsets 214 of elongate filaments 104. For example, when a screen or mesh is used to separate precursor tow 208, the screen or mesh may effectively scrape away excess resin 124 leaving only a desired amount on each individual one of elongate filaments 104 or individual subsets 214 of elongate filaments 104 for subsequent combination with optical direction-modifying particles 186 to create feedstock line 100.

On the other hand, in some implementations of method 800, applying resin 124 after precursor tow 208 is separated enables a sufficient amount of resin 124 to fully wet elongate filaments 104 and optical direction-modifying particles 186.

In some implementations of method 800, resin 124 may be applied both before and after precursor tow 208 is separated.

Referring generally to, e.g., FIGS. 8 and 27 and particularly to FIG. 32, according to method 800, resin 124 is applied to cover elongate filaments 104 and optical direction-modifying particles 186, such that elongate filaments 104 and optical direction-modifying particles 186 are covered with resin 124 in derivative particle tow 1309, at least one of before or after (block 898) combining the individual ones of elongate filaments 104 and optical direction-modifying particles 186 or subsets 214 of elongate filaments 104 and optical direction-modifying particles 186 into derivative particle tow 1309 so that optical direction-modifying particles 186 are interspersed among elongate filaments 104. The preceding subject matter of this paragraph characterizes example 111 of the present disclosure, wherein example 111 also includes the subject matter according to example 109 or 110, above.

In some implementations of method 800, applying resin 124 before elongate filaments 104 and optical direction-modifying particles 186 are combined enables a sufficient amount of resin 124 to fully wet elongate filaments 104 and optical direction-modifying particles 186.

In some implementations of method 800, applying resin 124 after elongate filaments 104 and optical direction-modifying particles 186 are combined into derivative particle tow 1309 ensures that feedstock line 100 has the overall desired amount of resin 124 therein.

In some implementations of method 800, resin 124 may be applied both before and after elongate filaments 104 and optical direction-modifying particles 186 are combined.

Referring generally to, e.g., FIGS. 8 and 27 and particularly to FIG. 32, according to method 800, the step of (block 894) separating precursor tow 208 into individual ones of elongate filaments 104 or into subsets 214 of elongate filaments 104 comprises (block 803) imparting a first electrical charge to elongate filaments 104. The step of (block 801) applying resin 124 to cover elongate filaments 104 and optical direction-modifying particles 186, such that elongate filaments 104 and optical direction-modifying particles 186 are covered with resin 124 in derivative particle tow 1309, comprises (block 805) imparting a second electrical charge to resin 124. The second electrical charge and the first electrical charge have opposite signs. The preceding subject matter of this paragraph characterizes example 112 of the present disclosure, wherein example 112 also includes the subject matter according to any one of examples 109 to 111, above.

As discussed in connection with dry-tow particle feedstock-line subsystem 1300, by imparting a first electrical charge to elongate filaments 104 and by imparting a second opposite charge to resin 124 as it is applied to elongate filaments 104, resin 124 will be electrostatically attracted to elongate filaments 104, thereby facilitating wetting of elongate filaments 104 with resin 124.

Referring generally to, e.g., FIGS. 1, 9, and 28 and particularly to FIG. 32, method 800 further comprises a step of (block 807) creating feedstock line 100 prior to depositing feedstock line 100 along print path 705. The step of (block 807) creating feedstock line 100 comprises a step of (block 809) dispensing precursor prepreg tow 908 that comprises elongate filaments 104 and resin 124, covering elongate filaments 104. The step of (block 807) creating feedstock line 100 further comprises a step of (block 811) separating precursor prepreg tow 908 into individual ones of elongate filaments 104, at least partially covered with resin 124, or into subsets 214 of elongate filaments 104, at least partially covered with resin 124. Each of subsets 214 comprises a plurality of elongate filaments 104. The step of (block 807) creating feedstock line 100 also comprises a step of (block 813) applying optical direction-modifying particles 186 to individual ones of elongate filaments 104, at least partially covered with resin 124, or to subsets 214 of elongate filaments 104, at least partially covered with resin 124. The step of (block 807) creating feedstock line 100 additionally comprises a step of (block 815) combining the individual ones of elongate filaments 104, at least partially covered with resin 124, and optical direction-modifying particles 186, or subsets 214 of elongate filaments 104, at least partially covered with resin 124, and optical direction-modifying particles 186, into derivative particle prepreg tow 1409 so that optical direction-modifying particles 186 are interspersed among elongate filaments 104. The step of (block 807) creating feedstock line 100 further comprises a step of (block 817) heating at least one of (i) (block 819) resin 124 in precursor prepreg tow 908 prior to (block 811) separating precursor prepreg tow 908 into the individual ones of elongate filaments 104, at least partially covered with resin 124, or into subsets 214 of elongate filaments 104, at least partially covered with resin 124, to a first threshold temperature to facilitate separating of precursor prepreg tow 908; (ii) (block 821) resin 124 at least partially covering the individual ones of elongate filaments 104 or subsets 214 of elongate filaments 104 following separating (block 811) precursor prepreg tow 908 into the individual ones of elongate filaments 104, at least partially covered with resin 124, or into subsets 214 of elongate filaments 104, at least partially covered with resin 124, and prior to (block 815) combining the individual ones of elongate filaments 104, at least partially covered with resin 124, and optical direction-modifying particles 186, or subsets 214 of elongate filaments 104, at least partially covered with resin 124, and optical direction-modifying particles 186, into derivative particle prepreg tow 1409, to a second threshold temperature to cause wet-out of optical direction-modifying particles 186 and elongate filaments 104 in derivative particle prepreg tow 1409 by resin 124; or (iii) (block 823) resin 124 at least partially covering elongate filaments 104 in derivative particle prepreg tow 1409, to a third threshold temperature to cause wet-out of optical direction-modifying particles 186 and elongate filaments 104 in derivative particle prepreg tow 1409 by resin 124. The preceding subject matter of this paragraph characterizes example 113 of the present disclosure, wherein example 113 also includes the subject matter according to any one of examples 98 to 108, above.

As discussed in connection with prepreg-tow particle feedstock-line subsystem 1400 of system 700, creating feedstock line 100 from precursor prepreg tow 908 permits the use of off-the-shelf prepreg reinforcement fiber tows. By separating precursor prepreg tow 908 into individual ones of elongate filaments 104 or into subsets 214 of elongate filaments 104, optical direction-modifying particles 186 may be operatively interspersed with elongate filaments 104. Heating resin 124 facilitates one or both of separation of precursor prepreg tow 908 or wetting-out of elongate filaments 104 and optical direction-modifying particles 186 in derivative particle prepreg tow 1409.

Referring generally to, e.g., FIGS. 9 and 28 and particularly to FIG. 32, according to method 800, the step of (block 807) creating feedstock line 100 further comprises a step of (block 825) applying additional resin 125 to cover elongate filaments 104 and optical direction-modifying particles 186 such that elongate filaments 104 and optical direction-modifying particles 186 are covered by resin 124 and additional resin 125 in derivative particle prepreg tow 1409. The preceding subject matter of this paragraph characterizes example 114 of the present disclosure, wherein example 114 also includes the subject matter according to example 113, above.

As discussed, by applying additional resin 125 to elongate filaments 104 and optical direction-modifying particles 186, full wet-out of elongate filaments 104 and optical direction-modifying particles 186 may be achieved in feedstock line 100.

Referring generally to, e.g., FIGS. 9 and 28 and particularly to FIG. 32, according to method 800, additional resin 125 is applied to cover elongate filaments 104 and optical direction-modifying particles 186, such that elongate filaments 104 and optical direction-modifying particles 186 are covered by resin 124 and additional resin 125 in derivative particle prepreg tow 1409, at least one of before or after (block 811) separating precursor prepreg tow 908 into the individual ones of elongate filaments 104, at least partially covered with resin 124, or into subsets 214 of elongate filaments 104, at least partially covered with resin 124. The preceding subject matter of this paragraph characterizes example 115 of the present disclosure, wherein example 115 also includes the subject matter according to example 114, above.

In some implementations of method 800, applying additional resin 125 before precursor prepreg tow 908 is separated enables a corresponding system (e.g., system 700 herein and prepreg-tow particle feedstock-line subsystem 1400 thereof) to regulate the amount of additional resin 125 on each individual one of elongate filaments 104 or individual subsets 214 of elongate filaments 104. For example, when a screen or mesh is used to separate precursor prepreg tow 908, the screen or mesh may effectively scrape away excess resin 124 and additional resin 125 leaving only a desired amount on each individual one of elongate filaments 104 or individual subsets 214 of elongate filaments 104 for subsequent combination with optical direction-modifying particles 186 to create feedstock line 100.

On the other hand, in some implementations of method 800, applying additional resin 125 after precursor prepreg tow 908 is separated enables a sufficient amount of additional resin 125 to fully wet, with resin 124, elongate filaments 104 and optical direction-modifying particles 186.

In some implementations of method 800, additional resin 125 may be applied both before and after precursor prepreg tow 908 is separated.

Referring generally to, e.g., FIGS. 9 and 28 and particularly to FIG. 32, according to method 800, additional resin 125 is applied to cover elongate filaments 104 and optical direction-modifying particles 186, such that elongate filaments 104 and optical direction-modifying particles 186 are covered by resin 124 and additional resin 125 in derivative particle prepreg tow 1409, at least one of before or after (block 815) combining the individual ones of elongate filaments 104, at least partially covered with resin 124, or subsets 214 of elongate filaments 104, at least partially covered with resin 124, and optical direction-modifying particles 186 into derivative particle prepreg tow 1409. The preceding subject matter of this paragraph characterizes example 116 of the present disclosure, wherein example 116 also includes the subject matter according to example 114 or 115, above.

In some implementations of method 800, applying additional resin 125 before elongate filaments 104 and optical direction-modifying particles 186 are combined enables a sufficient amount of resin 124 and additional resin 125 to fully wet elongate filaments 104 and optical direction-modifying particles 186.

In some implementations of method 800, applying additional resin 125 after elongate filaments 104 and optical direction-modifying particles 186 are combined into derivative particle prepreg tow 1409 ensures that feedstock line 100 has the overall desired amount of resin 124 and additional resin 125 therein.

In some implementations of method 800, additional resin 125 may be applied both before and after elongate filaments 104 and optical direction-modifying particles 186 are combined.

Referring generally to, e.g., FIGS. 9 and 28 and particularly to FIG. 32, according to method 800, the step of (block 811) separating precursor prepreg tow 908 into individual ones of elongate filaments 104, at least partially covered with resin 124, or into subsets 214 of elongate filaments 104, at least partially covered with resin 124, comprises (block 827) imparting a first electrical charge to elongate filaments 104 or to resin 124. The step of (block 825) applying additional resin 125 to cover elongate filaments 104 and optical direction-modifying particles 186, such that elongate filaments 104 and optical direction-modifying particles 186 are covered by resin 124 and additional resin 125 in derivative particle prepreg tow 1409, comprises (block 829) imparting a second electrical charge to additional resin 125. The second electrical charge and the first electrical charge have opposite signs. The preceding subject matter of this paragraph characterizes example 117 of the present disclosure, wherein example 117 also includes the subject matter according to any one of examples 114 to 116, above.

As discussed in connection with prepreg-tow particle feedstock-line subsystem 1400 of system 700, by imparting a first electrical charge to elongate filaments 104 or resin 124 and by imparting a second opposite charge to additional resin 125 as it is applied to elongate filaments 104 and resin 124, additional resin 125 will be electrostatically attracted to elongate filaments 104.

Referring generally to FIG. 10 and particularly to, e.g., FIGS. 18-21, optical waveguide 108 is disclosed. Optical waveguide 108 comprises optical core 146, comprising first end face 148, second end face 150, opposite first end face 148, and peripheral surface 152, extending between first end face 148 and second end face 150. Optical waveguide 108 is configured such that when electromagnetic radiation 118 enters optical core 146 via at least one of first end face 148, second end face 150, or peripheral surface 152, at least a portion of electromagnetic radiation 118 exits optical core 146 via peripheral surface 152. The preceding subject matter of this paragraph characterizes example 118 of the present disclosure.

Because optical waveguide 108 is configured for electromagnetic radiation to enter optical core 146 via any one of first end face 148, second end face 150, or peripheral surface 152 and then exit optical core 146 via peripheral surface 152, optical waveguide 108 is well suited for inclusion in a photopolymer resin (e.g., resin 124 herein) of a feedstock line (e.g., feedstock line 100 here) that also includes reinforcing fibers (e.g., elongate filaments 104 herein) and that is used to additively manufacture an object (e.g., object 136 herein by system 700 herein or according to method 800 herein). More specifically, inclusion of at least one optical waveguide 108 in such a feedstock line facilitates penetration of electromagnetic radiation 118 into the interior volume of the feedstock line for irradiation of the resin, despite regions of the resin being in the shadows of the reinforcing fibers cast by the direct (i.e., line-of-sight) application of electromagnetic radiation 118. In other words, even when electromagnetic radiation 118 is shielded from directly reaching all regions of the resin, at least one optical waveguide 108 will receive electromagnetic radiation 118 via one or more of first end face 148, second end face 150, or peripheral surface 152, and disperse electromagnetic radiation 118 via at least peripheral surface 152 to indirectly reach regions of the resin. As a result, the feedstock line may be more easily cured with electromagnetic radiation 118, may be more evenly cured with electromagnetic radiation 118, may be more thoroughly cured with electromagnetic radiation 118, and/or may be more quickly cured with electromagnetic radiation 118. Such a configuration of feedstock line is particularly well suited for additive manufacturing of the fused filament fabrication variety (e.g., by system 700 herein or according to method 800 herein), in which the feedstock line is dispensed by a print head, or nozzle (e.g., delivery guide 704 herein), and a source of curing energy (e.g., curing mechanism 706 herein) directs the curing energy at the feedstock line as it is being dispensed to cure the resin in situ.

Full-length optical waveguides and partial-length optical waveguides are examples of optical waveguides, such as optical waveguide 108.

Referring generally to FIG. 10 and particularly to, e.g., FIGS. 18-21, optical waveguide 108 is configured such that when electromagnetic radiation 118 enters first end face 148 of optical core 146, an initial portion of electromagnetic radiation 118 exits optical core 146 via peripheral surface 152 and a final portion of electromagnetic radiation 118, remaining in optical core 146 after the initial portion of electromagnetic radiation 118 exits optical core 146, exits optical core 146 via second end face 150. The preceding subject matter of this paragraph characterizes example 119 of the present disclosure, wherein example 119 also includes the subject matter according to example 118, above.

That is, when electromagnetic radiation 118 enters first end face 148, it will exit both peripheral surface 152 and second end face 150, as opposed, for example, to electromagnetic radiation 118 being fully emitted via peripheral surface 152. Such examples of optical waveguide 108 are well suited for inclusion in feedstock lines with additive manufacturing systems and methods in which electromagnetic radiation 118 is directed at first end face 148 as the feedstock line is being constructed and as an object is being manufactured. That is, an additive manufacturing system may be configured to construct a feedstock line while the object is being manufactured from the feedstock line, and while electromagnetic radiation 118 is entering first end face 148. Because electromagnetic radiation 118 exits not only peripheral surface 152, but also second end face 150, it is ensured that sufficient electromagnetic radiation 118 travels the full length of optical waveguide 108 to operatively cure the resin of the feedstock line that is in the shadows of the reinforcing fibers.

Referring generally to FIG. 10 and particularly to, e.g., FIGS. 18-21, optical waveguide 108 is configured such that the initial portion of electromagnetic radiation 118, which exits optical core 146 via peripheral surface 152, is greater than or equal to the final portion of electromagnetic radiation 118, which exits optical core 146 via second end face 150. The preceding subject matter of this paragraph characterizes example 120 of the present disclosure, wherein example 120 also includes the subject matter according to example 119, above.

In such configurations, it is ensured that a desired amount of electromagnetic radiation 118 exits optical core 146 via peripheral surface 152 to operatively cure the resin of a feedstock line that is in the shadows of the reinforcing fibers, when the feedstock line is utilized by an additive manufacturing system or in an additive manufacturing method.

Referring generally to FIG. 10 and particularly to, e.g., FIGS. 18-21, optical core 146 has an optical-core refractive index. Optical waveguide 108 further comprises cladding 120, at least partially covering optical core 146. Cladding 120 comprises at least first resin 132, having a first-resin refractive index. Cladding 120 is non-uniform along optical waveguide 108. The optical-core refractive index is greater than the first-resin refractive index. The preceding subject matter of this paragraph characterizes example 121 of the present disclosure, wherein example 121 also includes the subject matter according to any one of examples 118 to 120, above.

By cladding 120 being non-uniform along the length of optical waveguide 108, electromagnetic radiation 118 is permitted to exit optical core 146 via peripheral surface 152. Moreover, by first resin 132 having a refractive index that is lower than that of optical core 146, electromagnetic radiation 118, upon entering optical core 146, is trapped within optical core 146 other than the regions where first resin 132 is not present. As a result, optical waveguide 108 may be constructed to provide a desired amount of electromagnetic radiation 118, exiting various positions along peripheral surface 152, such as to ensure a desired amount of electromagnetic radiation 118, penetrating the shadows of reinforcing fibers when optical waveguide 108 is included in a feedstock line that is used to additively manufacture an object.

Referring generally to FIG. 10 and particularly to, e.g., FIGS. 19 and 20, peripheral surface 152 has regions 130 devoid of first resin 132. Cladding 120 further comprises second resin 134, having a second-resin refractive index. Second resin 134 contacts regions 130 of peripheral surface 152. The second-resin refractive index is greater than the first-resin refractive index. The preceding subject matter of this paragraph characterizes example 122 of the present disclosure, wherein example 122 also includes the subject matter according to example 121, above.

By covering regions 130 with second resin 134, a desired refractive index thereof may be selected to optimize how electromagnetic radiation 118 exits peripheral surface 152. Additionally or alternatively, with regions 130 covered with second resin 134, the integrity of first resin 132 may be ensured, such that it does not peel or break off during storage of optical waveguide 108 and during construction of an associated feedstock line.

Referring generally to FIG. 10 and particularly to, e.g., FIG. 20, second resin 134 covers first resin 132. The preceding subject matter of this paragraph characterizes example 123 of the present disclosure, wherein example 123 also includes the subject matter according to example 122, above.

Optical waveguides, such as optical waveguide 108, may be more easily manufactured, in that optical core 146 with first resin 132 simply may be fully coated with second resin 134. Additionally or alternatively, the integrity of optical waveguides may be maintained during storage thereof and during construction of an associated feedstock line.

Referring generally to FIG. 10 and particularly to, e.g., FIG. 21, peripheral surface 152 has a surface roughness that is selected such that when electromagnetic radiation 118 enters optical core 146 via at least one of first end face 148, second end face 150, or peripheral surface 152, at least a portion of electromagnetic radiation 118 exits optical core 146 via peripheral surface 152. The preceding subject matter of this paragraph characterizes example 124 of the present disclosure, wherein example 124 also includes the subject matter according to any one of examples 118 to 120, above.

Rather than relying on refractive index properties of a cladding to ensure desired dispersal of electromagnetic radiation 118 from optical core 146 via peripheral surface 152, the surface roughness of peripheral surface 152 is selected such that electromagnetic radiation 118 exits optical core 146 at desired amounts along the length of peripheral surface 152. For example, the surface roughness may create regions of internal reflection of electromagnetic radiation 118 within optical core 146 and may create regions where electromagnetic radiation 118 is permitted to escape optical core 146.

Referring generally to FIG. 10 and particularly to, e.g., FIG. 21, optical waveguide 108 is devoid of any cladding that covers optical core 146. The preceding subject matter of this paragraph characterizes example 125 of the present disclosure, wherein example 125 also includes the subject matter according to example 124, above.

Optical waveguides without any cladding may be less expensive to manufacture than optical waveguides with cladding. Additionally, the difference of refractive indexes between a cladding and a resin of a feedstock line need not be taken into account when selecting the resin for the feedstock line.

Referring generally to, e.g., FIGS. 10, 17, and 18, and particularly to FIG. 33, method 400 of modifying optical fiber 126 to create optical waveguide 108 is disclosed. Optical fiber 126 comprises optical core 146, having an optical-core refractive index, and cladding 120, comprising at least first resin 132, having a first-resin refractive index that is lower than the optical-core refractive index. Cladding 120 covers peripheral surface 152 of optical core 146 and extends between first end face 148 and second end face 150 of optical core 146. Method 400 comprises a step of (block 402) removing portions 128 of cladding 120 to expose regions 130 of peripheral surface 152, such that at least a portion of electromagnetic radiation 118, entering optical core 146 via at least one of first end face 148, second end face 150, or peripheral surface 152, exits optical core 146 via regions 130 of peripheral surface 152. The preceding subject matter of this paragraph characterizes example 126 of the present disclosure.

Method 400 provides an inexpensive process for creating optical waveguide 108. For example, an off-the-shelf cladded optical fiber may be used as optical fiber 126, and portions 128 of cladding 120 simply may be removed at regions 130 that are appropriately spaced apart to result in the desired functions of optical waveguide 108, discussed herein.

Any suitable process may be utilized to remove portion 128 of cladding 120, including, for example, mechanical processes, chemical processes, thermal processes (e.g., utilizing a laser), etc.

Referring generally to, e.g., FIGS. 10 and 17-20, and particularly to FIG. 33, method 400 further comprises a step of (block 404) applying second resin 134 to contact regions 130 of peripheral surface 152. Second resin 134 has a second-resin refractive index that is greater than the first-resin refractive index. The preceding subject matter of this paragraph characterizes example 127 of the present disclosure, wherein example 127 also includes the subject matter according to example 126, above.

As discussed, by covering regions 130 with second resin 134, a desired refractive index thereof may be selected to optimize how electromagnetic radiation 118 exits peripheral surface 152. Additionally or alternatively, with regions 130 covered with second resin 134, the integrity of first resin 132 may be ensured, such that it does not peel or break off during storage of optical waveguide 108 and during construction of an associated feedstock line.

Referring generally to, e.g., FIGS. 10, 17, 18, and 20, and particularly to FIG. 33, according to method 400, the step of (block 404) applying second resin 134 to contact regions 130 of peripheral surface 152 comprises (block 406) covering first resin 132 with second resin 134. The preceding subject matter of this paragraph characterizes example 128 of the present disclosure, wherein example 128 also includes the subject matter according to example 127, above.

Applying second resin 134 such that it also covers first resin 132 may be an easier and less-expensive process than applying second resin 134 only to contact and cover regions 130.

Referring generally to, e.g., FIGS. 10 and 18, and particularly to FIG. 34, method 500 of modifying optical core 146 to create optical waveguide 108 is disclosed. Optical core 146 comprises first end face 148, second end face 150, opposite first end face 148, and peripheral surface 152, extending between first end face 148 and second end face 150. Method 500 comprises a step of (block 502) applying first resin 132 to peripheral surface 152 of optical core 146 so that regions 130 of peripheral surface 152 remain uncovered by first resin 132. First resin 132 has a first-resin refractive index. Optical core 146 has an optical-core refractive index that is greater than the first-resin refractive index. At least a portion of electromagnetic radiation 118, entering optical core 146 via at least one of first end face 148, second end face 150, or peripheral surface 152, exits optical core 146 via peripheral surface 152. The preceding subject matter of this paragraph characterizes example 129 of the present disclosure.

Method 500 provides an inexpensive process for creating optical waveguide 108. For example, an off-the-shelf non-cladded optical fiber may be used as optical core 146, and first resin 132 may be applied to peripheral surface 152 thereof.

Any suitable process for applying first resin 132 may be used, including, for example spraying, misting, or splattering first resin 132 on peripheral surface 152, such that regions 130 of peripheral surface 152 remain uncovered by first resin 132.

Referring generally to, e.g., FIGS. 10 and 18-20, and particularly to FIG. 34, method 500 further comprises a step of (block 504) applying second resin 134 to contact regions 130 of peripheral surface 152 to create with first resin 132 cladding 120 that covers peripheral surface 152 of optical core 146. Second resin 134 has a second-resin refractive index that is greater than the first-resin refractive index. The preceding subject matter of this paragraph characterizes example 130 of the present disclosure, wherein example 130 also includes the subject matter according to example 129, above.

Similar to method 400, by covering regions 130 with second resin 134, a desired refractive index thereof may be selected to optimize how electromagnetic radiation 118 exits peripheral surface 152. Additionally or alternatively, with regions 130 covered with second resin 134, the integrity of first resin 132 may be ensured, such that it does not peel or break off during storage of optical waveguide 108 and during construction of an associated feedstock line.

Referring generally to, e.g., FIGS. 10, 18, and 20, and particularly to FIG. 34, according to method 500, the step of (block 504) applying second resin 134 to contact regions 130 of peripheral surface 152 comprises (block 506) covering first resin 132 with second resin 134. The preceding subject matter of this paragraph characterizes example 131 of the present disclosure, wherein example 131 also includes the subject matter according to example 130, above.

Again, applying second resin 134 such that it also covers first resin 132 may be an easier and less-expensive process than applying second resin 134 only to contact and cover regions 130.

Referring generally to, e.g., FIGS. 10 and 21, and particularly to FIG. 35, method 600 of modifying optical core 146 to create optical waveguide 108 is disclosed. Optical core 146 comprises first end face 148, second end face 150, opposite first end face 148, and peripheral surface 152, extending between first end face 148 and second end face 150. Method 600 comprises a step of (block 602) increasing surface roughness of all or portions of peripheral surface 152 of optical core 146 so that at least a portion of electromagnetic radiation 118, entering optical core 146 via at least one of first end face 148, second end face 150, or peripheral surface 152, exits optical core 146 via peripheral surface 152. The preceding subject matter of this paragraph characterizes example 132 of the present disclosure.

Method 600 provides an inexpensive process for creating optical waveguide 108. For example, an off-the-shelf non-cladded optical fiber may be used as optical core 146, and peripheral surface 152 thereof may be roughened.

Any suitable process for increasing surface roughness of peripheral surface may be used including, for example, mechanical processes, chemical processes, thermal processes (e.g., utilizing a laser), etc.

Referring generally to, e.g., FIGS. 10 and 21, and particularly to FIG. 35, method 600 further comprises (block 604) applying cladding 120 to cover peripheral surface 152. Optical core 146 has an optical-core refractive index. Cladding 120 has a cladding refractive index. The optical-core refractive index is lower than the cladding refractive index. The preceding subject matter of this paragraph characterizes example 133 of the present disclosure, wherein example 133 also includes the subject matter according to example 132, above.

By applying cladding 120 to cover peripheral surface 152, the integrity of the surface roughness of peripheral surface 152 may be maintained, and by selecting a cladding refractive index that is lower than the optical-core refractive index ensures that electromagnetic radiation 118 can operatively exit optical core 146 at desired locations as a result of the surface roughness of peripheral surface 152.

Examples of the present disclosure may be described in the context of aircraft manufacturing and service method 1100 as shown in FIG. 36 and aircraft 1102 as shown in FIG. 37. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 37, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings. Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

The invention claimed is:

1. A system for additively manufacturing an object, the system comprising:
   a feedstock-line supply, configured to dispense a feedstock line having a feedstock-line length and an exterior surface, defining an interior volume of the feedstock line, and wherein the feedstock line comprises:
      elongate filaments, extending along at least a portion of the feedstock-line length;
      a resin, covering the elongate filaments; and
      at least one optical modifier, having an outer surface, covered by the resin, and wherein at least the one optical modifier is interspersed among the elongate filaments;
   a delivery guide, movable relative to a surface and configured to receive the feedstock line from the feedstock-line supply and to deposit the feedstock line along a print path; and
   a curing mechanism, configured to direct electromagnetic radiation at the exterior surface of the feedstock line after the feedstock line is deposited by the delivery guide along the print path, such that when the electromagnetic radiation strikes the outer surface of at least the one optical modifier, at least the one optical modifier causes the electromagnetic radiation to irradiate, in the interior volume of the feedstock line, the resin that, due at least in part to the elongate filaments, is not directly accessible to the electromagnetic radiation, incident on the exterior surface of the feedstock line.

2. The system according to claim 1, wherein the elongate filaments are opaque to the electromagnetic radiation.

3. The system according to claim 1, wherein:
   at least the one optical modifier comprises at least one full-length optical waveguide, extending along all of the feedstock-line length;
   at least the one full-length optical waveguide comprises a full-length optical core;
   the full-length optical core comprises a first full-length-optical-core end face, a second full-length-optical-core end face, opposite the first full-length-optical-core end face, and a full-length peripheral surface, extending between the first full-length-optical-core end face and the second full-length-optical-core end face; and
   at least the one full-length optical waveguide is configured such that when electromagnetic radiation enters the full-length optical core via at least one of the first full-length-optical-core end face, the second full-length-optical-core end face, or the full-length peripheral surface, at least a portion of the electromagnetic radiation exits the full-length optical core via the full-length peripheral surface to irradiate, in the interior volume of the feedstock line, the resin that, due at least in part to the elongate filaments, is not directly accessible to the electromagnetic radiation, incident on the exterior surface of the feedstock line.

4. The system according to claim 3, wherein:
   the feedstock-line supply comprises a dry-tow full-length-optical-waveguide feedstock-line subsystem for creating the feedstock line; and
   the dry-tow full-length-optical-waveguide feedstock-line subsystem comprises:
      a filament supply, configured to dispense a precursor tow, comprising the elongate filaments;
      a filament separator, configured to separate the precursor tow, dispensed from the filament supply, into individual ones of the elongate filaments or into subsets of the elongate filaments, wherein each of the subsets comprises a plurality of the elongate filaments;
      a full-length-optical-waveguide supply, configured to dispense at least the one full-length optical waveguide;
      a combiner, configured to combine the individual ones of the elongate filaments, originating from the filament separator, and at least the one full-length optical waveguide, dispensed by the full-length-optical-waveguide supply, or the subsets of the elongate filaments, originating from the filament separator, and at least the one full-length optical waveguide, dispensed by the full-length-optical-waveguide supply, into a derivative full-length-optical-waveguide tow so that each of the elongate filaments and at least the one full-length optical waveguide extend along all of the feedstock-line length and at least the one full-length optical waveguide is interspersed among the elongate filaments; and a resin supply, configured to provide the resin to be applied to at least one of the precursor tow, dispensed from the filament supply, the individual ones of the elongate filaments or the subsets of the elongate filaments, originating from the filament separator, at least the one full-length optical waveguide, dispensed from the full-length-optical-waveguide supply, or the derivative full-length-optical-waveguide tow, originating from the combiner, such that the elongate filaments and at least the one full-length optical waveguide in the derivative full-length-optical-waveguide tow are covered with the resin.

5. The system according to claim 3, wherein:
the feedstock-line supply comprises a prepreg-tow full-length-optical-waveguide feedstock-line subsystem for creating the feedstock line; and
the prepreg-tow full-length-optical-waveguide feedstock-line subsystem comprises:
a prepreg-tow supply, configured to dispense a precursor prepreg tow that comprises the elongate filaments and the resin, covering the elongate filaments;
a prepreg-tow separator, configured to separate the precursor prepreg tow, dispensed from the prepreg-tow supply, into individual ones of the elongate filaments, at least partially covered with the resin, or into subsets of the elongate filaments, at least partially covered with the resin, wherein each of the subsets comprises a plurality of the elongate filaments;
a full-length-optical-waveguide supply, configured to dispense at least the one full-length optical waveguide;
a combiner, configured to combine the individual ones of the elongate filaments, at least partially covered with the resin, and at least the one full-length optical waveguide, dispensed by the full-length-optical-waveguide supply, or the subsets of the elongate filaments, at least partially covered with the resin, and at least the one full-length optical waveguide, dispensed by the full-length-optical-waveguide supply, into a derivative full-length-optical-waveguide prepreg tow so that each of the elongate filaments and at least the one full-length optical waveguide extend along all of the feedstock-line length and at least the one full-length optical waveguide is interspersed among the elongate filaments; and
at least one heater, configured to heat at least one of:
the resin in the precursor prepreg tow, dispensed from the prepreg-tow supply, to a first threshold temperature to facilitate separation of the precursor prepreg tow by the prepreg-tow separator into the individual ones of the elongate filaments or into the subsets of the elongate filaments;
the resin that at least partially covers the individual ones of the elongate filaments or the subsets of the elongate filaments, originating from the prepreg-tow separator, to a second threshold temperature to cause wet-out of at least the one full-length optical waveguide and the individual ones of the elongate filaments or of at least the one full-length optical waveguide and the subsets of the elongate filaments in the derivative full-length-optical-waveguide prepreg tow by the resin; or
the resin that at least partially covers the elongate filaments in the derivative full-length-optical-waveguide prepreg tow, originating from the combiner, to a third threshold temperature to cause wet-out of at least the one full-length optical waveguide and the elongate filaments in the derivative full-length-optical-waveguide prepreg tow by the resin.

6. The system according to claim 1, wherein:
at least the one optical modifier comprises partial-length optical waveguides;
each of the partial-length optical waveguides comprises a partial-length optical core;
the partial-length optical core of each of the partial-length optical waveguides comprises a first partial-length-optical-core end face, a second partial-length-optical-core end face, opposite the first partial-length-optical-core end face, and a partial-length peripheral surface, extending between the first partial-length-optical-core end face and the second partial-length-optical-core end face; and
each of the partial-length optical waveguides is configured such that when the electromagnetic radiation enters the partial-length optical core via at least one of the first partial-length-optical-core end face, the second partial-length-optical-core end face, or the partial-length peripheral surface, at least a portion of the electromagnetic radiation exits the partial-length optical core via the partial-length peripheral surface to irradiate, in the interior volume of the feedstock line, the resin that, due at least in part to the elongate filaments, is not directly accessible to the electromagnetic radiation, incident on the exterior surface of the feedstock line.

7. The system according to claim 6, wherein:
the feedstock-line supply comprises a dry-tow partial-length-optical-waveguide feedstock-line subsystem for creating the feedstock line; and
the dry-tow partial-length-optical-waveguide feedstock-line subsystem comprises:
a filament supply, configured to dispense a precursor tow, comprising the elongate filaments;
a filament separator, configured to separate the precursor tow, dispensed from the filament supply, into individual ones of the elongate filaments or into subsets of the elongate filaments, wherein each of the subsets comprises a plurality of the elongate filaments;
a partial-length-optical-waveguide supply, configured to dispense the partial-length optical waveguides to be applied to the individual ones of the elongate filaments or the subsets of the elongate filaments, originating from the filament separator;
a combiner, configured to combine the individual ones of the elongate filaments, originating from the filament separator, and the partial-length optical waveguides, dispensed by the partial-length-optical-waveguide supply, or the subsets of the elongate filaments, originating from the filament separator, and the partial-length optical waveguides, dispensed by the partial-length-optical-waveguide supply, into a derivative partial-length-optical-waveguide tow so that the partial-length optical waveguides are interspersed among the elongate filaments; and a resin supply, configured to provide the resin to be applied to at least one of the precursor tow, dispensed from the filament supply, the individual ones of the elongate filaments or the subsets of the elongate filaments, originating from the filament separator, the partial-length optical waveguides, dispensed from the partial-length-optical-waveguide supply, or the derivative partial-length-optical-waveguide tow, originating from the combiner, such that the elongate filaments and the partial-length optical waveguides in the derivative partial-length-optical-waveguide tow are covered with the resin.

8. The system according to claim 7, wherein the partial-length-optical-waveguide supply and the resin supply together form a combined partial-length-optical-waveguide resin supply, configured to dispense the partial-length optical waveguides together with the resin.

9. The system according to claim 6, wherein:
the feedstock-line supply comprises a prepreg-tow partial-length-optical-waveguide feedstock-line subsystem for creating the feedstock line; and
the prepreg-tow partial-length-optical-waveguide feedstock-line subsystem comprises:
  a prepreg-tow supply, configured to dispense a precursor prepreg tow that comprises the elongate filaments and the resin, covering the elongate filaments;
  a prepreg-tow separator, configured to separate the precursor prepreg tow, dispensed from the prepreg-tow supply, into individual ones of the elongate filaments, at least partially covered with the resin, or into subsets of the elongate filaments, at least partially covered with the resin, wherein each of the subsets comprises a plurality of the elongate filaments;
  a partial-length-optical-waveguide supply, configured to dispense the partial-length optical waveguides to be applied to the individual ones of the elongate filaments, at least partially covered with the resin, or the subsets of the elongate filaments, at least partially covered with the resin, originating from the prepreg-tow separator;
  a combiner, configured to combine the individual ones of the elongate filaments, at least partially covered with the resin, and the partial-length optical waveguides, dispensed by the partial-length-optical-waveguide supply, or to combine the subsets of the elongate filaments, at least partially covered with the resin, and the partial-length optical waveguides, dispensed by the partial-length-optical-waveguide supply, into a derivative partial-length-optical-waveguide prepreg tow so that the partial-length optical waveguides are interspersed among the elongate filaments; and
  at least one heater, configured to heat at least one of:
    the resin in the precursor prepreg tow, dispensed from the prepreg-tow supply, to a first threshold temperature to facilitate separation of the precursor prepreg tow by the prepreg-tow separator into the individual ones of the elongate filaments or into the subsets of the elongate filaments;
    the resin that at least partially covers the individual ones of the elongate filaments or the subsets of the elongate filaments, originating from the prepreg-tow separator, to a second threshold temperature to cause wet-out of the partial-length optical waveguides and the elongate filaments in the derivative partial-length-optical-waveguide prepreg tow by the resin; or
    the resin that at least partially covers the elongate filaments in the derivative partial-length-optical-waveguide prepreg tow, originating from the combiner, to a third threshold temperature to cause wet-out of the partial-length optical waveguides and the elongate filaments in the derivative partial-length-optical-waveguide prepreg tow by the resin.

10. The system according to claim 1, wherein:
at least the one optical modifier comprises optical direction-modifying particles; and
the optical direction-modifying particles are configured to at least one of reflect, refract, diffract, or Rayleigh-scatter the electromagnetic radiation, incident on an outer surface of any one of the optical direction-modifying particles, to disperse, in the interior volume of the feedstock line, the electromagnetic radiation to irradiate the resin that, due at least in part to the elongate filaments, is not directly accessible to the electromagnetic radiation, incident on the exterior surface of the feedstock line.

11. The system according to claim 10, wherein:
each of the elongate filaments has a minimum outer dimension; and
each of the optical direction-modifying particles has a maximum outer dimension that is less than one-eighth the minimum outer dimension of any one of the elongate filaments.

12. The system according to claim 10, wherein each of the optical direction-modifying particles has a maximum outer dimension that is less than 1000 nm.

13. The system according to claim 10, wherein:
the electromagnetic radiation has a wavelength; and
each of the optical direction-modifying particles has a minimum outer dimension that is greater than one-fourth the wavelength of the electromagnetic radiation.

14. The system according to claim 10, wherein each of the optical direction-modifying particles has a minimum outer dimension that is greater than or equal to 50 nm.

15. The system according to claim 10, wherein the optical direction-modifying particles comprise less than 10% by weight of the resin.

16. The system according to claim 10, wherein:
the feedstock-line supply comprises a dry-tow particle feedstock-line subsystem for creating the feedstock line; and
the dry-tow particle feedstock-line subsystem comprises:
  a filament supply, configured to dispense a precursor tow, comprising the elongate filaments;
  a filament separator, configured to separate the precursor tow, dispensed from the filament supply, into individual ones of the elongate filaments or into subsets of the elongate filaments, wherein each of the subsets comprises a plurality of the elongate filaments;
  an optical-direction-modifying-particle supply, configured to dispense the optical direction-modifying particles to be applied to the individual ones of the elongate filaments or the subsets of the elongate filaments, originating from the filament separator;
  a combiner, configured to combine the individual ones of the elongate filaments, originating from the filament separator, and the optical direction-modifying particles, dispensed by the optical-direction-modifying-particle supply, or the subsets of the elongate filaments, originating from the filament separator, and the optical direction-modifying particles, dispensed by the optical-direction-modifying-particle supply, into a derivative particle tow so that the optical direction-modifying particles are interspersed among the elongate filaments; and a resin supply, configured to provide the resin to be applied to at least one of the precursor tow, dispensed from the filament supply, the individual ones of the elongate filaments or the subsets of the elongate filaments, originating from the filament separator, the optical direction-modifying particles, dispensed from the optical-direction-modifying-particle supply, or the derivative particle tow, originating from the combiner, such that the elongate filaments and the optical direction-modifying particles in the derivative particle tow are covered with the resin.

17. The system according to claim 16, wherein the optical-direction-modifying-particle supply and the resin supply together form a combined particle resin supply, configured to dispense the optical direction-modifying particles together with the resin.

18. The system according to claim 10, wherein:
the feedstock-line supply comprises a prepreg-tow particle feedstock-line subsystem for creating the feedstock line; and
the prepreg-tow particle feedstock-line subsystem comprises:
  a prepreg-tow supply, configured to dispense a precursor prepreg tow that comprises the elongate filaments and the resin, covering the elongate filaments;
  a prepreg-tow separator, configured to separate the precursor prepreg tow, dispensed from the prepreg-tow supply, into individual ones of the elongate filaments, at least partially covered with the resin, or into subsets of the elongate filaments, at least partially covered with the resin, wherein each of the subsets comprises a plurality of the elongate filaments;
  an optical-direction-modifying-particle supply, configured to dispense the optical direction-modifying particles to be applied to the individual ones of the elongate filaments, at least partially covered with the resin, or the subsets of the elongate filaments, at least partially covered with the resin, originating from the prepreg-tow separator;
  a combiner, configured to combine the individual ones of the elongate filaments, at least partially covered with the resin, and the optical direction-modifying particles, dispensed by the optical-direction-modifying-particle supply, or to combine the subsets of the elongate filaments, at least partially covered with the resin, and the optical direction-modifying particles, dispensed by the optical-direction-modifying-particle supply, into a derivative particle prepreg tow so that the optical direction-modifying particles are interspersed among the elongate filaments; and
  at least one heater, configured to heat at least one of:
    the resin in the precursor prepreg tow, dispensed from the prepreg-tow supply, to a first threshold temperature to facilitate separation of the precursor prepreg tow by the prepreg-tow separator into the individual ones of the elongate filaments or into the subsets of the elongate filaments;
    the resin that at least partially covers the individual ones of the elongate filaments or the subsets of the elongate filaments, originating from the prepreg-tow separator, to a second threshold temperature to cause wet-out of the optical direction-modifying particles and the elongate filaments in the derivative particle prepreg tow by the resin; or
    the resin that at least partially covers the elongate filaments in the derivative particle prepreg tow, originating from the combiner, to a third threshold temperature to cause wet-out of the optical direction-modifying particles and the elongate filaments in the derivative particle prepreg tow by the resin.

19. The system according to claim 1, further comprising:
a drive assembly, operatively coupled at least to one of the delivery guide or the surface and configured to selectively move at least one of the delivery guide or the surface relative to another in three dimensions to additively manufacture the object.

20. A method of additively manufacturing an object, the method comprising steps of:
depositing a feedstock line along a print path, using a delivery guide, and wherein:
  the feedstock line has a feedstock-line length and an exterior surface, defining an interior volume of the feedstock line;
  the feedstock line comprises:
    elongate filaments, extending along at least a portion of the feedstock-line length;
    a resin, covering the elongate filaments; and
    at least one optical modifier, having an outer surface, covered by the resin; and
  at least the one optical modifier is interspersed among the elongate filaments; and
directing electromagnetic radiation at the exterior surface of the feedstock line after the feedstock line is deposited by the delivery guide along the print path; and
wherein the step of directing electromagnetic radiation at the exterior surface of the feedstock line after the feedstock line is deposited by the delivery guide along the print path causes the electromagnetic radiation to strike the outer surface of at least the one optical modifier, which in turn causes the electromagnetic radiation to irradiate, in the interior volume of the feedstock line, the resin that, due at least in part to the elongate filaments, is not directly accessible to the electromagnetic radiation, incident on the exterior surface of the feedstock line.

21. The method according to claim 20, wherein the elongate filaments are opaque to the electromagnetic radiation.

22. The method according to claim 20, wherein:
at least the one optical modifier comprises at least one full-length optical waveguide, extending along all of the feedstock-line length;
at least the one full-length optical waveguide comprises a full-length optical core;
the full-length optical core comprises a first full-length-optical-core end face, a second full-length-optical-core end face, opposite the first full-length-optical-core end face, and a full-length peripheral surface, extending between the first full-length-optical-core end face and the second full-length-optical-core end face; and
the step of directing electromagnetic radiation at the exterior surface of the feedstock line after the feedstock line is deposited by the delivery guide along the print path causes the electromagnetic radiation to enter the full-length optical core via at least one of the first full-length-optical-core end face, the second fulllength-optical-core end face, or the full-length peripheral surface, which in turn causes at least a portion of the electromagnetic radiation to exit the full-length optical core via the full-length peripheral surface to irradiate, in the interior volume of the feedstock line, the resin that, due at least in part to the elongate filaments, is not directly accessible to the electromagnetic radiation, incident on the exterior surface of the feedstock line.

23. The method according to claim 22, wherein the step of directing electromagnetic radiation at the exterior surface of the feedstock line after the feedstock line is deposited by the delivery guide along the print path causes the electromagnetic radiation to enter the first full-length-optical-core end face of the full-length optical core, which in turn causes an initial portion of the electromagnetic radiation to exit the full-length optical core via the full-length peripheral surface and a final portion of the electromagnetic radiation, remaining in the full-length optical core after the initial portion of the electromagnetic radiation exits the full-length optical core, to exit the full-length optical core via the second full-length-optical-core end face.

24. The method according to claim 23, wherein the initial portion of the electromagnetic radiation, which exits the full-length optical core via the full-length peripheral surface, is greater than or equal to the final portion of the electromagnetic radiation, which exits the full-length optical core via the second full-length-optical-core end face.

25. The method according to claim 22, wherein:
the full-length optical core has a full-length-optical-core refractive index;
at least the one full-length optical waveguide further comprises a full-length-optical-core cladding, at least partially covering the full-length optical core;
the full-length-optical-core cladding comprises at least a first full-length-optical-core cladding resin, having a full-length-optical-core first-cladding-resin refractive index;
the full-length-optical-core cladding is non-uniform along at least the one full-length optical waveguide; and
the full-length-optical-core refractive index is greater than the full-length-optical-core first-cladding-resin refractive index.

26. The method according to claim 25, wherein:
the full-length peripheral surface has full-length-peripheral-surface regions, devoid of the first full-length-optical-core cladding resin;
the full-length-optical-core cladding further comprises a second full-length-optical-core cladding resin, having a full-length-optical-core second-cladding-resin refractive index;
the second full-length-optical-core cladding resin covers the full-length-peripheral-surface regions of the full-length peripheral surface; and
the full-length-optical-core second-cladding-resin refractive index is greater than the full-length-optical-core first-cladding-resin refractive index.

27. The method according to claim 22, further comprising a step of:
creating the feedstock line prior to depositing the feedstock line along the print path, and wherein the step of creating the feedstock line comprises steps of:
dispensing a precursor tow, comprising the elongate filaments;
separating the precursor tow into individual ones of the elongate filaments or into subsets of the elongate filaments, wherein each of the subsets comprises a plurality of the elongate filaments;
dispensing at least the one full-length optical waveguide;
combining the individual ones of the elongate filaments and at least the one full-length optical waveguide, or the subsets of the elongate filaments and at least the one full-length optical waveguide, into a derivative full-length-optical-waveguide tow so that each of the elongate filaments and at least the one full-length optical waveguide extend along all of the feedstock-line length and at least the one full-length optical waveguide is interspersed among the elongate filaments; and
applying the resin to cover the elongate filaments and at least the one full-length optical waveguide such that the elongate filaments and at least the one full-length optical waveguide are covered by the resin in the derivative full-length-optical-waveguide tow.

28. The method according to claim 27, wherein the resin is applied to cover the elongate filaments and at least the one full-length optical waveguide, such that the elongate filaments and at least the one full-length optical waveguide are covered by the resin in the derivative full-length-optical-waveguide tow, at least one of before or after separating the precursor tow into the individual ones of the elongate filaments or into the subsets of the elongate filaments.

29. The method according to claim 27, wherein the resin is applied to cover the elongate filaments and at least the one full-length optical waveguide, such that the elongate filaments and at least the one full-length optical waveguide are covered by the resin in the derivative full-length-optical-waveguide tow, at least one of before or after combining the individual ones of the elongate filaments or the subsets of the elongate filaments and at least the one full-length optical waveguide into the derivative full-length-optical-waveguide tow.

30. The method according to claim 27, wherein:
the step of separating the precursor tow into individual ones of the elongate filaments or into subsets of the elongate filaments comprises imparting a first electrical charge to the elongate filaments;
the step of applying the resin to cover the elongate filaments and at least the one full-length optical waveguide, such that the elongate filaments and at least the one full-length optical waveguide are covered by the resin in the derivative full-length-optical-waveguide tow, comprises imparting a second electrical charge to the resin; and
the second electrical charge and the first electrical charge have opposite signs.

31. The method according to claim 27, wherein the step of combining the individual ones of the elongate filaments and at least the one full-length optical waveguide or the subsets of the elongate filaments and at least the one full-length optical waveguide into the derivative full-length-optical-waveguide tow comprises at least one of twisting, weaving, or braiding the individual ones of the elongate filaments and at least the one full-length optical waveguide, or the subsets of the elongate filaments and at least the one full-length optical waveguide, into the derivative full-length-optical-waveguide tow.

32. The method according to claim 22, further comprising a step of:
creating the feedstock line prior to depositing the feedstock line along the print path, and wherein the step of creating the feedstock line comprises steps of:
dispensing a precursor prepreg tow that comprises the elongate filaments and the resin, covering the elongate filaments;
separating the precursor prepreg tow into individual ones of the elongate filaments, at least partially covered with the resin, or into subsets of the elongate filaments, at least partially covered with the resin, wherein each of the subsets comprises a plurality of the elongate filaments;
dispensing at least the one full-length optical waveguide;
combining the individual ones of the elongate filaments and at least the one full-length optical waveguide, or the subsets of the elongate filaments and at least the one full-length optical waveguide, into a derivative full-length-optical-waveguide prepreg tow so that each of the elongate filaments and at least the one full-length optical waveguide extend along all of the feedstock-line length and at least the one full-length optical waveguide is interspersed among the elongate filaments; and
heating at least one of:
the resin in the precursor prepreg tow prior to separating the precursor prepreg tow into the individual ones of the elongate filaments, at least partially covered with the resin, or into the subsets of the elongate filaments, at least partially covered with the resin, to a first threshold temperature to facilitate separating of the precursor prepreg tow;
the resin, at least partially covering the individual ones of the elongate filaments or the subsets of the elongate filaments following separating the precursor prepreg tow into the individual ones of the elongate filaments, at least partially covered with the resin, or into the subsets of the elongate filaments, at least partially covered with the resin, and prior to combining the individual ones of the elongate filaments, at least partially covered with the resin, or into the subsets of the elongate filaments, at least partially covered with the resin, and at least the one full-length optical waveguide into the derivative full-length-optical-waveguide prepreg tow, to a second threshold temperature to cause wet-out of at least the one full-length optical waveguide and the elongate filaments in the derivative full-length-optical-waveguide prepreg tow by the resin; or
the resin, at least partially covering the elongate filaments in the derivative full-length-optical-waveguide prepreg tow, to a third threshold temperature to cause wet-out of at least the one full-length optical waveguide and the elongate filaments in the derivative full-length-optical-waveguide prepreg tow by the resin.

33. The method according to claim 32, wherein the step of creating the feedstock line further comprises a step of:
applying an additional resin to cover the elongate filaments and at least the one full-length optical waveguide such that the elongate filaments and at least the one full-length optical waveguide are covered by the resin and the additional resin in the derivative full-length-optical-waveguide prepreg tow.

34. The method according to claim 33, wherein the additional resin is applied to cover the elongate filaments and at least the one full-length optical waveguide, such that the elongate filaments and at least the one full-length optical waveguide are covered by the resin and the additional resin in the derivative full-length-optical-waveguide prepreg tow, at least one of before or after separating the precursor prepreg tow into the individual ones of the elongate filaments, at least partially covered with the resin, or into the subsets of the elongate filaments, at least partially covered with the resin.

35. The method according to claim 33, wherein the additional resin is applied to cover the elongate filaments and at least the one full-length optical waveguide, such that the elongate filaments and at least the one full-length optical waveguide are covered by the resin and the additional resin in the derivative full-length-optical-waveguide prepreg tow, at least one of before or after combining the individual ones of the elongate filaments, at least partially covered with the resin, or the subsets of the elongate filaments, at least partially covered with the resin, and at least the one full-length optical waveguide into the derivative full-length-optical-waveguide prepreg tow.

36. The method according to claim 33, wherein:
the step of separating the precursor prepreg tow into individual ones of the elongate filaments, at least partially covered with the resin, or into subsets of the elongate filaments, at least partially covered with the resin, comprises imparting a first electrical charge to the elongate filaments or to the resin;
the step of applying the additional resin to cover the elongate filaments and at least the one full-length optical waveguide, such that the elongate filaments and at least the one full-length optical waveguide are covered by the resin and the additional resin in the derivative full-length-optical-waveguide prepreg tow, comprises imparting a second electrical charge to the additional resin; and
the second electrical charge and the first electrical charge have opposite signs.

37. The method according to claim 32, wherein the step of combining the individual ones of the elongate filaments, at least partially covered with the resin, and at least the one full-length optical waveguide or the subsets of the elongate filaments, at least partially covered with the resin, and at least the one full-length optical waveguide into the derivative full-length-optical-waveguide prepreg tow comprises at least one of twisting, weaving, or braiding the individual ones of the elongate filaments, at least partially covered with the resin, and at least the one full-length optical waveguide, or the subsets of the elongate filaments, at least partially covered with the resin, and at least the one full-length optical waveguide, into the derivative full-length-optical-waveguide prepreg tow.

38. The method according to claim 20, wherein:
at least the one optical modifier comprises partial-length optical waveguides;
each of the partial-length optical waveguides comprises a partial-length optical core;
the partial-length optical core of each of the partial-length optical waveguides comprises a first partial-length-optical-core end face, a second partial-length-optical-core end face, opposite the first partial-length-optical-core end face, and a partial-length peripheral surface, extending between the first partial-length-optical-core end face and the second partial-length-optical-core end face; and the step of directing electromagnetic radiation at the exterior surface of the feedstock line after the feedstock line is deposited by the delivery guide along the print path causes the electromagnetic radiation to enter the partial-length optical core via at least one of the first partial-length-optical-core end face, the second partial-length-optical-core end face, or the partial-length peripheral surface, which in turn causes at least a portion of the electromagnetic radiation to exit the partial-length optical core via the partial-length peripheral surface to irradiate, in the interior volume of the feedstock line, the resin that, due at least in part to the elongate filaments, is not directly accessible to the electromagnetic radiation, incident on the exterior surface of the feedstock line.

39. The method according to claim 38, further comprising a step of:
creating the feedstock line prior to depositing the feedstock line along the print path, and wherein the step of creating the feedstock line comprises steps of:
dispensing a precursor tow, comprising the elongate filaments;
separating the precursor tow into individual ones of the elongate filaments or into subsets of the elongate filaments, wherein each of the subsets comprises a plurality of the elongate filaments;
applying the partial-length optical waveguides to the individual ones of the elongate filaments or to the subsets of the elongate filaments;
combining the individual ones of the elongate filaments and the partial-length optical waveguides or the subsets of the elongate filaments and the partial-length optical waveguides into a derivative partial-length-optical-waveguide tow so that the partial-length optical waveguides are interspersed among the elongate filaments; and
applying the resin to cover the elongate filaments and the partial-length optical waveguides such that the elongate filaments and the partial-length optical waveguides are covered with the resin in the derivative partial-length-optical-waveguide tow.

40. The method according to claim 39, wherein the resin is applied to cover the elongate filaments and the partial-length optical waveguides, such that the elongate filaments and the partial-length optical waveguides are covered with the resin in the derivative partial-length-optical-waveguide tow, at least one of before or after separating the precursor tow into the individual ones of the elongate filaments or the subsets of the elongate filaments.

41. The method according to claim 39, wherein the resin is applied to cover the elongate filaments and the partial-length optical waveguides, such that the elongate filaments and the partial-length optical waveguides are covered with the resin in the derivative partial-length-optical-waveguide tow, at least one of before or after combining the individual ones of the elongate filaments and the partial-length optical waveguides or the subsets of the elongate filaments and the partial-length optical waveguides into the derivative partial-length-optical-waveguide tow so that the partial-length optical waveguides are interspersed among the elongate filaments.

42. The method according to claim 39, wherein:
the step of separating the precursor tow into individual ones of the elongate filaments or into subsets of the elongate filaments comprises imparting a first electrical charge to the elongate filaments;
the step of applying the resin to cover the elongate filaments and the partial-length optical waveguides such that the elongate filaments and the partial-length optical waveguides are covered with the resin in the derivative partial-length-optical-waveguide tow comprises imparting a second electrical charge to the resin; and
the second electrical charge and the first electrical charge have opposite signs.

43. The method according to claim 38, further comprising a step of:
creating the feedstock line prior to depositing the feedstock line along the print path, and wherein the step of creating the feedstock line comprises steps of:
dispensing a precursor prepreg tow that comprises the elongate filaments and the resin, covering the elongate filaments;
separating the precursor prepreg tow into individual ones of the elongate filaments, at least partially covered with the resin, or into subsets of the elongate filaments, at least partially covered with the resin, wherein each of the subsets comprises a plurality of the elongate filaments;
applying the partial-length optical waveguides to the individual ones of the elongate filaments, at least partially covered with the resin, or to the subsets of the elongate filaments, at least partially covered with the resin;
combining the individual ones of the elongate filaments, at least partially covered with the resin, and the partial-length optical waveguides, or the subsets of the elongate filaments, at least partially covered with the resin, and the partial-length optical waveguides, into a derivative partial-length-optical-waveguide prepreg tow so that the partial-length optical waveguides are interspersed among the elongate filaments; and
heating at least one of:
the resin in the precursor prepreg tow prior to separating the precursor prepreg tow into the individual ones of the elongate filaments, at least partially covered with the resin, or into the subsets of the elongate filaments, at least partially covered with the resin, to a first threshold temperature to facilitate separating of the precursor prepreg tow;
the resin at least partially covering the individual ones of the elongate filaments or the subsets of the elongate filaments following separating the precursor prepreg tow into the individual ones of the elongate filaments, at least partially covered with the resin, or into the subsets of the elongate filaments, at least partially covered with the resin, and prior to combining the individual ones of the elongate filaments, at least partially covered with the resin, and the partial-length optical waveguides, or the subsets of the elongate filaments, at least partially covered with the resin, and the partial-length optical waveguides, into the derivative partial-length-optical-waveguide prepreg tow, to a second threshold temperature to cause wet-out of the partial-length optical waveguides and the elongate filaments in the derivative partial-length-optical-waveguide prepreg tow by the resin; or
the resin at least partially covering the elongate filaments in the derivative partial-length-optical-waveguide prepreg tow, to a third threshold temperature to cause wet-out of the partial-length optical waveguides and the elongate filaments in the derivative partial-length-optical-waveguide prepreg tow by the resin.

44. The method according to claim 43, wherein the step of creating the feedstock line further comprises a step of:
applying an additional resin to cover the elongate filaments and the partial-length optical waveguides such that the elongate filaments and the partial-length optical waveguides are covered by the resin and the additional resin in the derivative partial-length-optical-waveguide prepreg tow.

45. The method according to claim 44, wherein the additional resin is applied to cover the elongate filaments and the partial-length optical waveguides, such that the elongate filaments and the partial-length optical waveguides are covered by the resin and the additional resin in the derivative partial-length-optical-waveguide prepreg tow, at least one of before or after separating the precursor prepreg tow into the individual ones of the elongate filaments, at least partially covered with the resin, or into the subsets of the elongate filaments, at least partially covered with the resin.

46. The method according to claim 44, wherein the additional resin is applied to cover the elongate filaments and the partial-length optical waveguides, such that the elongate filaments and the partial-length optical waveguides are covered by the resin and the additional resin in the derivative partial-length-optical-waveguide prepreg tow, at least one of before or after combining the individual ones of the elongate filaments, at least partially covered with the resin, or the subsets of the elongate filaments, at least partially covered with the resin, and the partial-length optical waveguides into the derivative partial-length-optical-waveguide prepreg tow.

47. The method according to claim 44, wherein:
the step of separating the precursor prepreg tow into individual ones of the elongate filaments, at least partially covered with the resin, or into subsets of the elongate filaments, at least partially covered with the resin, comprises imparting a first electrical charge to the elongate filaments or to the resin;
the step of applying the additional resin to cover the elongate filaments and the partial-length optical waveguides, such that the elongate filaments and the partial-length optical waveguides are covered by the resin and the additional resin in the derivative partial-length-optical-waveguide prepreg tow, comprises imparting a second electrical charge to the additional resin; and
the second electrical charge and the first electrical charge have opposite signs.

48. The method according to claim 20, wherein:
at least the one optical modifier comprises optical direction-modifying particles; and
the step of directing electromagnetic radiation at the exterior surface of the feedstock line after the feedstock line is deposited by the delivery guide along the print path causes the electromagnetic radiation to strike the outer surface of at least some of the optical direction-modifying particles, which in turn causes the electromagnetic radiation to at least one of reflect, refract, diffract, or Rayleigh-scatter the electromagnetic radiation, to disperse, in the interior volume of the feedstock line, the electromagnetic radiation to irradiate the resin that, due at least in part to the elongate filaments, is not directly accessible to the electromagnetic radiation, incident on the exterior surface of the feedstock line.

49. The method according to claim 48, further comprising a step of:
creating the feedstock line prior to depositing the feedstock line along the print path, and wherein the step of creating the feedstock line comprises steps of:
dispensing a precursor tow, comprising the elongate filaments;
separating the precursor tow into individual ones of the elongate filaments or into subsets of the elongate filaments, wherein each of the subsets comprises a plurality of the elongate filaments;
applying the optical direction-modifying particles to the individual ones of the elongate filaments or to the subsets of the elongate filaments;
combining the individual ones of the elongate filaments and the optical direction-modifying particles or the subsets of the elongate filaments and the optical direction-modifying particles into a derivative particle tow so that the optical direction-modifying particles are interspersed among the elongate filaments; and
applying the resin to cover the elongate filaments and the optical direction-modifying particles such that the elongate filaments and the optical direction-modifying particles are covered with the resin in the derivative particle tow.

50. The method according to claim 49, wherein the resin is applied to cover the elongate filaments and the optical direction-modifying particles, such that the elongate filaments and the optical direction-modifying particles are covered with the resin in the derivative particle tow, at least one of before or after separating the precursor tow into the individual ones of the elongate filaments or the subsets of the elongate filaments.

51. The method according to claim 49, wherein the resin is applied to cover the elongate filaments and the optical direction-modifying particles, such that the elongate filaments and the optical direction-modifying particles are covered with the resin in the derivative particle tow, at least one of before or after combining the individual ones of the elongate filaments and the optical direction-modifying particles or the subsets of the elongate filaments and the optical direction-modifying particles into the derivative particle tow so that the optical direction-modifying particles are interspersed among the elongate filaments.

52. The method according to claim 49, wherein:
the step of separating the precursor tow into individual ones of the elongate filaments or into subsets of the elongate filaments comprises imparting a first electrical charge to the elongate filaments;
the step of applying the resin to cover the elongate filaments and the optical direction-modifying particles, such that the elongate filaments and the optical direction-modifying particles are covered with the resin in the derivative particle tow, comprises imparting a second electrical charge to the resin; and
the second electrical charge and the first electrical charge have opposite signs.

53. The method according to claim 48, further comprising a step of:
creating the feedstock line prior to depositing the feedstock line along the print path, and wherein the step of creating the feedstock line comprises steps of:
dispensing a precursor prepreg tow that comprises the elongate filaments and the resin, covering the elongate filaments;

separating the precursor prepreg tow into individual ones of the elongate filaments, at least partially covered with the resin, or into subsets of the elongate filaments, at least partially covered with the resin, wherein each of the subsets comprises a plurality of the elongate filaments;

applying the optical direction-modifying particles to the individual ones of the elongate filaments, at least partially covered with the resin, or to the subsets of the elongate filaments, at least partially covered with the resin;

combining the individual ones of the elongate filaments, at least partially covered with the resin, and the optical direction-modifying particles, or the subsets of the elongate filaments, at least partially covered with the resin, and the optical direction-modifying particles, into a derivative particle prepreg tow so that the optical direction-modifying particles are interspersed among the elongate filaments; and heating at least one of:
the resin in the precursor prepreg tow prior to separating the precursor prepreg tow into the individual ones of the elongate filaments, at least partially covered with the resin, or into the subsets of the elongate filaments, at least partially covered with the resin, to a first threshold temperature to facilitate separating of the precursor prepreg tow;

the resin at least partially covering the individual ones of the elongate filaments or the subsets of the elongate filaments following separating the precursor prepreg tow into the individual ones of the elongate filaments, at least partially covered with the resin, or into the subsets of the elongate filaments, at least partially covered with the resin, and prior to combining the individual ones of the elongate filaments, at least partially covered with the resin, and the optical direction-modifying particles, or the subsets of the elongate filaments, at least partially covered with the resin, and the optical direction-modifying particles, into the derivative particle prepreg tow, to a second threshold temperature to cause wet-out of the optical direction-modifying particles and the elongate filaments in the derivative particle prepreg tow by the resin; or the resin at least partially covering the elongate filaments in the derivative particle prepreg tow, to a third threshold temperature to cause wet-out of the optical direction-modifying particles and the elongate filaments in the derivative particle prepreg tow by the resin.

54. The method according to claim 53, wherein the step of creating the feedstock line further comprises a step of:
applying an additional resin to cover the elongate filaments and the optical direction-modifying particles such that the elongate filaments and the optical direction-modifying particles are covered by the resin and the additional resin in the derivative particle prepreg tow.

55. The method according to claim 54, wherein the additional resin is applied to cover the elongate filaments and the optical direction-modifying particles, such that the elongate filaments and the optical direction-modifying particles are covered by the resin and the additional resin in the derivative particle prepreg tow, at least one of before or after separating the precursor prepreg tow into the individual ones of the elongate filaments, at least partially covered with the resin, or into the subsets of the elongate filaments, at least partially covered with the resin.

56. The method according to claim 54, wherein the additional resin is applied to cover the elongate filaments and the optical direction-modifying particles, such that the elongate filaments and the optical direction-modifying particles are covered by the resin and the additional resin in the derivative particle prepreg tow, at least one of before or after combining the individual ones of the elongate filaments, at least partially covered with the resin, or the subsets of the elongate filaments, at least partially covered with the resin, and the optical direction-modifying particles into the derivative particle prepreg tow.

57. The method according to claim 54, wherein:
the step of separating the precursor prepreg tow into individual ones of the elongate filaments, at least partially covered with the resin, or into subsets of the elongate filaments, at least partially covered with the resin, comprises imparting a first electrical charge to the elongate filaments or to the resin;

the step of applying the additional resin to cover the elongate filaments and the optical direction-modifying particles, such that the elongate filaments and the optical direction-modifying particles are covered by the resin and the additional resin in the derivative particle prepreg tow, comprises imparting a second electrical charge to the additional resin; and the second electrical charge and the first electrical charge have opposite signs.

58. The system according to claim 3, wherein the feedstock line is configured such that when the electromagnetic radiation enters the interior volume of the feedstock line via the exterior surface of the feedstock line, the electromagnetic radiation enters at least the one full-length optical waveguide via at least one of the full-length peripheral surface, the first full-length-optical-core end face, or the second full-length-optical-core end face.

59. The system according to claim 3, wherein at least the one full-length optical waveguide is configured such that when the electromagnetic radiation enters the first full-length-optical-core end face of the full-length optical core, an initial portion of the electromagnetic radiation exits the full-length optical core via the full-length peripheral surface and a final portion of the electromagnetic radiation, remaining in the full-length optical core after the initial portion of the electromagnetic radiation exits the full-length optical core, exits the full-length optical core via the second full-length-optical-core end face.

60. The system according to claim 59, wherein at least the one full-length optical waveguide is configured such that the initial portion of the electromagnetic radiation, which exits the full-length optical core via the full-length peripheral surface, is greater than or equal to the final portion of the electromagnetic radiation, which exits the full-length optical core via the second full-length-optical-core end face.

61. The system according to claim 3, wherein at least the one full-length optical waveguide is at least one of parallel to, generally parallel to, twisted with, woven with, or braided with the elongate filaments.

62. The system according to claim 3, wherein:
the full-length optical core has a full-length-optical-core refractive index;
at least the one full-length optical waveguide further comprises a full-length-optical-core cladding at least partially covering the full-length optical core;

the full-length-optical-core cladding comprises at least a first full-length-optical-core cladding resin, having a full-length-optical-core first-cladding-resin refractive index;
the full-length-optical-core cladding is non-uniform along at least the one full-length optical waveguide; and
the full-length-optical-core refractive index is greater than the full-length-optical-core first-cladding-resin refractive index.

63. The system according to claim 62, wherein:
the full-length peripheral surface has full-length-peripheral-surface regions, devoid of the first full-length-optical-core cladding resin;
the full-length-optical-core cladding further comprises a second full-length-optical-core cladding resin, having a full-length-optical-core second-cladding-resin refractive index;
the second full-length-optical-core cladding resin covers the full-length-peripheral-surface regions of the full-length peripheral surface; and
the full-length-optical-core second-cladding-resin refractive index is greater than the full-length-optical-core first-cladding-resin refractive index.

64. The system according to claim 63, wherein the second full-length-optical-core cladding resin also covers the first full-length-optical-core cladding resin.

65. The system according to claim 63, wherein:
the resin has a resin refractive index; and
the resin refractive index is greater than the full-length-optical-core second-cladding-resin refractive index.

66. The system according to claim 3, wherein the full-length peripheral surface has a surface roughness that is selected such that when electromagnetic radiation enters the full-length optical core via at least one of the first full-length-optical-core end face, the second full-length-optical-core end face, or the full-length peripheral surface, at least a portion of the electromagnetic radiation exits the full-length optical core via the full-length peripheral surface to irradiate, in the interior volume of the feedstock line, the resin that, due at least in part to the elongate filaments, is not directly accessible to the electromagnetic radiation, incident on the exterior surface of the feedstock line.

67. The system according to claim 66, wherein at least the one full-length optical waveguide is devoid of any cladding that covers the full-length optical core.

68. The system according to claim 3, wherein at least the one full-length optical waveguide is a plurality of full-length optical waveguides, interspersed among the elongate filaments.

69. The system according to claim 68, wherein the elongate filaments are at least one of twisted with, woven with, or braided with the plurality of full-length optical waveguides.

70. The system according to claim 4, wherein:
the filament separator is configured to impart a first electrical charge to the elongate filaments as the precursor tow is separated into the individual ones of the elongate filaments or into the subsets of the elongate filaments;
the resin supply is configured to impart a second electrical charge to the resin when the resin is applied to at least one of the individual ones of the elongate filaments or the subsets of the elongate filaments and originating from the filament separator, or the derivative full-length-optical-waveguide tow, originating from the combiner, such that the elongate filaments and at least the one full-length optical waveguide in the derivative full-length-optical-waveguide tow are covered with the resin; and
the second electrical charge and the first electrical charge have opposite signs.

71. The system according to claim 4, wherein the combiner is configured to at least one of twist, weave, or braid the individual ones of the elongate filaments, originating from the filament separator, and at least the one full-length optical waveguide, dispensed by the full-length-optical-waveguide supply, or the subsets of the elongate filaments, originating from the filament separator, and at least the one full-length optical waveguide, dispensed by the full-length-optical-waveguide supply, into the derivative full-length-optical-waveguide tow.

72. The system according to claim 5, wherein the prepreg-tow full-length-optical-waveguide feedstock-line subsystem further comprises an additional-resin supply, configured to provide additional resin to be applied to at least one of the precursor prepreg tow, dispensed from the prepreg-tow supply, the individual ones of the elongate filaments, at least partially covered with the resin, or the subsets of the elongate filaments, at least partially covered with the resin, originating from the prepreg-tow separator, at least the one full-length optical waveguide, dispensed from the full-length-optical-waveguide supply, or the derivative full-length-optical-waveguide prepreg tow, originating from the combiner, such that the elongate filaments and at least the one full-length optical waveguide in the derivative full-length-optical-waveguide prepreg tow are covered with the resin and the additional resin.

73. The system according to claim 72, wherein:
the prepreg-tow separator is configured to impart a first electrical charge to the elongate filaments or to the resin as the precursor prepreg tow is separated into the individual ones of the elongate filaments, at least partially covered with the resin, or into the subsets of the elongate filaments, at least partially covered with the resin;
the additional-resin supply is configured to impart a second electrical charge to the additional resin when the additional resin is applied to at least one of the individual ones of the elongate filaments, at least partially covered with the resin, or the subsets of the elongate filaments, at least partially covered with the resin and originating from the prepreg-tow separator, or the derivative full-length-optical-waveguide prepreg tow, originating from the combiner, such that the elongate filaments and at least the one full-length optical waveguide in the derivative full-length-optical-waveguide prepreg tow are covered with the resin and the additional resin; and
the second electrical charge and the first electrical charge have opposite signs.

74. The system according to claim 72, wherein the combiner is configured to at least one of twist, weave, or braid the individual ones of the elongate filaments, originating from the prepreg-tow separator, and at least the one full-length optical waveguide, dispensed by the full-length-optical-waveguide supply, or the subsets of the elongate filaments, originating from the prepreg-tow separator, and at least the one full-length optical waveguide, dispensed by the full-length-optical-waveguide supply, into the derivative full-length-optical-waveguide prepreg tow.

75. The system according to claim 6, wherein the feedstock line is configured such that when the electromagnetic radiation enters the interior volume of the feedstock line via the exterior surface of the feedstock line, the electromagnetic radiation enters at least one of the partial-length optical waveguides via at least one of the partial-length peripheral surface, the first partial-length-optical-core end face, or the second partial-length-optical-core end face of at least the one of the partial-length optical waveguides.

76. The system according to claim 6, wherein:
the partial-length optical core has a partial-length-optical-core refractive index;
each of the partial-length optical waveguides further comprises a partial-length-optical-core cladding, at least partially covering the partial-length optical core;
the partial-length-optical-core cladding comprises at least a first partial-length-optical-core cladding resin, having a partial-length-optical-core first-cladding-resin refractive index;
the partial-length-optical-core cladding is non-uniform along each of the partial-length optical waveguides; and
the partial-length-optical-core refractive index is greater than the partial-length-optical-core first-cladding-resin refractive index.

77. The system according to claim 76, wherein:
the partial-length peripheral surface of the partial-length optical core of each of the partial-length optical waveguides has partial-length-peripheral-surface regions, devoid of the first partial-length-optical-core cladding resin;
the partial-length-optical-core cladding further comprises a second partial-length-optical-core cladding resin, having a partial-length-optical-core second-cladding-resin refractive index;
the second partial-length-optical-core cladding resin covers the partial-length-peripheral-surface regions of the partial-length peripheral surface; and
the partial-length-optical-core second-cladding-resin refractive index is greater than the partial-length-optical-core first-cladding-resin refractive index.

78. The system according to claim 77, wherein the second partial-length-optical-core cladding resin also covers the first partial-length-optical-core cladding resin.

79. The system according to claim 77, wherein:
the resin has a resin refractive index; and
the resin refractive index is greater than the partial-length-optical-core second-cladding-resin refractive index.

80. The system according to claim 6, wherein the partial-length peripheral surface of the partial-length optical core of each of the partial-length optical waveguides has a surface roughness that is selected such that when electromagnetic radiation enters the partial-length optical core via at least one of the first partial-length-optical-core end face, the second partial-length-optical-core end face, or the partial-length peripheral surface, at least a portion of the electromagnetic radiation exits the partial-length optical core via the partial-length peripheral surface to irradiate, in the interior volume of the feedstock line, the resin that, due at least in part to the elongate filaments, is not directly accessible to the electromagnetic radiation, incident on the exterior surface of the feedstock line.

81. The system according to claim 80, wherein each of the partial-length optical waveguides is devoid of any cladding that covers the partial-length optical core.

82. The system according to claim 7, wherein:
the filament separator is configured to impart a first electrical charge to the elongate filaments as the precursor tow is separated into the individual ones of the elongate filaments or into the subsets of the elongate filaments;
the resin supply is configured to impart a second electrical charge to the resin when the resin is applied to at least one of the individual ones of the elongate filaments or the subsets of the elongate filaments and originating from the filament separator, or the derivative partial-length-optical-waveguide tow, originating from the combiner, such that the elongate filaments and the partial-length optical waveguides in the derivative partial-length-optical-waveguide tow are covered with the resin; and
the second electrical charge and the first electrical charge have opposite signs.

83. The system according to claim 9, wherein the prepreg-tow partial-length-optical-waveguide feedstock-line subsystem further comprises an additional-resin supply, configured to provide additional resin to be applied to at least one of the precursor prepreg tow, dispensed from the prepreg-tow supply, the individual ones of the elongate filaments, at least partially covered with the resin, or the subsets of the elongate filaments, at least partially covered with the resin, originating from the prepreg-tow separator, the partial-length optical waveguides, dispensed from the partial-length-optical-waveguide supply, or the derivative partial-length-optical-waveguide prepreg tow, originating from the combiner, such that the elongate filaments and the partial-length optical waveguides in the derivative partial-length-optical-waveguide prepreg tow are covered with the resin and the additional resin.

84. The system according to claim 83, wherein the partial-length-optical-waveguide supply and the additional-resin supply together form a combined partial-length-optical-waveguide additional-resin supply, configured to dispense the partial-length optical waveguides together with the additional resin.

85. The system according to claim 83, wherein:
the prepreg-tow separator is configured to impart a first electrical charge to the elongate filaments or to the resin as the precursor prepreg tow is separated into the individual ones of the elongate filaments, at least partially covered with the resin, or into the subsets of the elongate filaments, at least partially covered with the resin;
the additional-resin supply is configured to impart a second electrical charge to the additional resin when the additional resin is applied to at least one of the individual ones of the elongate filaments, at least partially covered with the resin, or the subsets of the elongate filaments, at least partially covered with the resin and originating from the prepreg-tow separator, or the derivative partial-length-optical-waveguide prepreg tow, originating from the combiner, such that the elongate filaments and the partial-length optical waveguides in the derivative partial-length-optical-waveguide prepreg tow are covered with the resin and the additional resin; and
the second electrical charge and the first electrical charge have opposite signs.

86. The system according to claim 10, wherein outer surfaces of at least some of the optical direction-modifying particles are faceted.

87. The system according to claim 10, wherein outer surfaces of at least some of the optical direction-modifying particles have a surface roughness that is selected such that when electromagnetic radiation strikes the outer surfaces, the electromagnetic radiation is scattered in the interior volume of the feedstock line to irradiate the resin that, due at least in part to the elongate filaments, is not directly accessible to the electromagnetic radiation, incident on the exterior surface of the feedstock line.

88. The system according to claim 10, wherein:
the resin has a resin refractive index;
at least some of the optical direction-modifying particles have a particle refractive index; and
wherein the particle refractive index is greater than or less than the resin refractive index.

89. The system according to claim 16, wherein:
the filament separator is configured to impart a first electrical charge to the elongate filaments as the precursor tow is separated into the individual ones of the elongate filaments or into the subsets of the elongate filaments;
the resin supply is configured to impart a second electrical charge to the resin when the resin is applied to at least one of the individual ones of the elongate filaments or the subsets of the elongate filaments, originating from the filament separator, or the derivative particle tow, originating from the combiner, such that the elongate filaments and the optical direction-modifying particles in the derivative particle tow are covered with the resin; and
the second electrical charge and the first electrical charge have opposite signs.

90. The system according to claim 18, wherein the prepreg-tow particle feedstock-line subsystem further comprises an additional-resin supply, configured to provide additional resin to be applied to at least one of the precursor prepreg tow, dispensed from the prepreg-tow supply, the individual ones of the elongate filaments, at least partially covered with the resin, or the subsets of the elongate filaments, at least partially covered with the resin, originating from the prepreg-tow separator, the optical direction-modifying particles, dispensed from the optical-direction-modifying-particle supply, or the derivative particle prepreg tow, originating from the combiner, such that the elongate filaments and the optical direction-modifying particles in the derivative particle prepreg tow are covered with the resin and the additional resin.

91. The system according to claim 90, wherein:
the prepreg-tow separator is configured to impart a first electrical charge to the elongate filaments or to the resin as the precursor prepreg tow is separated into the individual ones of the elongate filaments, at least partially covered with the resin, or into the subsets of the elongate filaments, at least partially covered with the resin;
the additional-resin supply is configured to impart a second electrical charge to the additional resin when the additional resin is applied to at least one of the individual ones of the elongate filaments, at least partially covered with the resin, or the subsets of the elongate filaments, at least partially covered with the resin and originating from the prepreg-tow separator, or the derivative particle prepreg tow, originating from the combiner, such that the elongate filaments and the optical direction-modifying particles in the derivative particle prepreg tow are covered with the resin and the additional resin; and
the second electrical charge and the first electrical charge have opposite signs.

\* \* \* \* \*